(12) United States Patent
Shingu et al.

(10) Patent No.: US 12,309,490 B2
(45) Date of Patent: May 20, 2025

(54) CAMERA SYSTEM, CAMERA BODY

(71) Applicant: Panasonic Intellectual Property Management Co., Ltd., Osaka (JP)

(72) Inventors: Yasuhiro Shingu, Osaka (JP); Tetsuya Uno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 86 days.

(21) Appl. No.: 18/142,145

(22) Filed: May 2, 2023

(65) Prior Publication Data

US 2024/0080553 A1 Mar. 7, 2024

(30) Foreign Application Priority Data

May 6, 2022 (JP) .................................. 2022-076601
Apr. 19, 2023 (JP) .................................. 2023-068541

(51) Int. Cl.
*H04N 23/67* (2023.01)
*G02B 7/10* (2021.01)
*H04N 23/663* (2023.01)

(52) U.S. Cl.
CPC .............. *H04N 23/67* (2023.01); *G02B 7/10* (2013.01)

(58) Field of Classification Search
CPC ......... H04N 23/67; H04N 23/663; G02B 7/10
See application file for complete search history.

(56) References Cited

U.S. PATENT DOCUMENTS

| | | | |
|---|---|---|---|
| 8,878,974 B2 * | 11/2014 | Kamimura | H04N 23/667 348/340 |
| 9,933,690 B2 | 4/2018 | Hatakeyama | |
| 11,212,446 B2 * | 12/2021 | Nomura | H04N 23/6811 |
| 2013/0021514 A1 * | 1/2013 | Kamimura | H04N 23/663 348/340 |
| 2017/0003576 A1 | 1/2017 | Hatakeyama | |

FOREIGN PATENT DOCUMENTS

| | | |
|---|---|---|
| JP | 2007-108373 A | 4/2007 |
| JP | 2012-203142 A | 10/2012 |
| JP | 2015-040909 A | 3/2015 |
| JP | 2017-015850 A | 1/2017 |
| JP | 2017-085438 A | 5/2017 |

* cited by examiner

*Primary Examiner* — Ahmed A Berhan
(74) *Attorney, Agent, or Firm* — Renner, Otto, Boisselle & Sklar, LLP

(57) ABSTRACT

A camera system includes a camera body, a lens barrel that is mounted to the camera body and includes at least one movable lens, and a zoom ring drive device that is mounted to the camera body. A first control unit of the camera body controls a second control unit of the lens barrel and a third control unit of the zoom ring drive device so as to move a zoom lens with a DC motor on the basis of information about the characteristic of the zoom lens and an optical characteristic value inputted to an input unit.

17 Claims, 35 Drawing Sheets

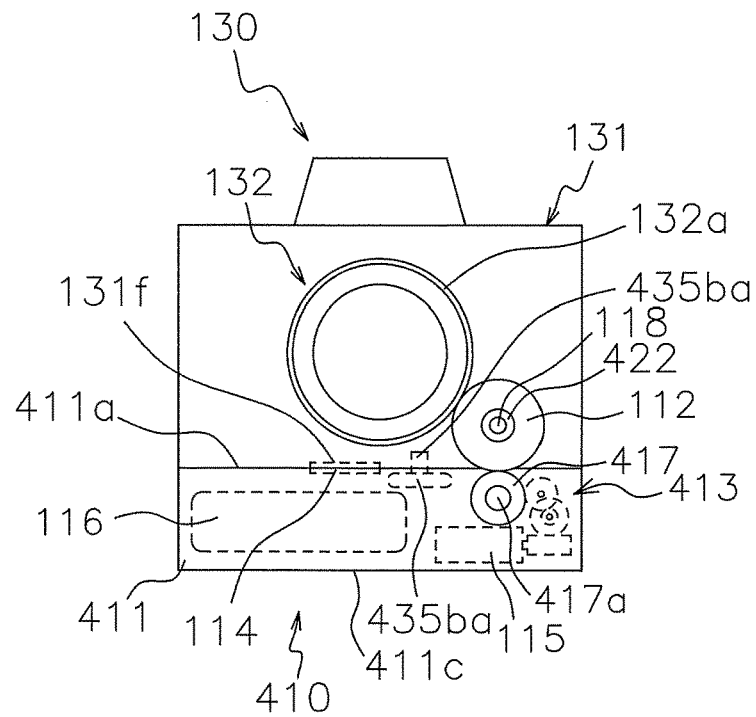
FIG. 33A1
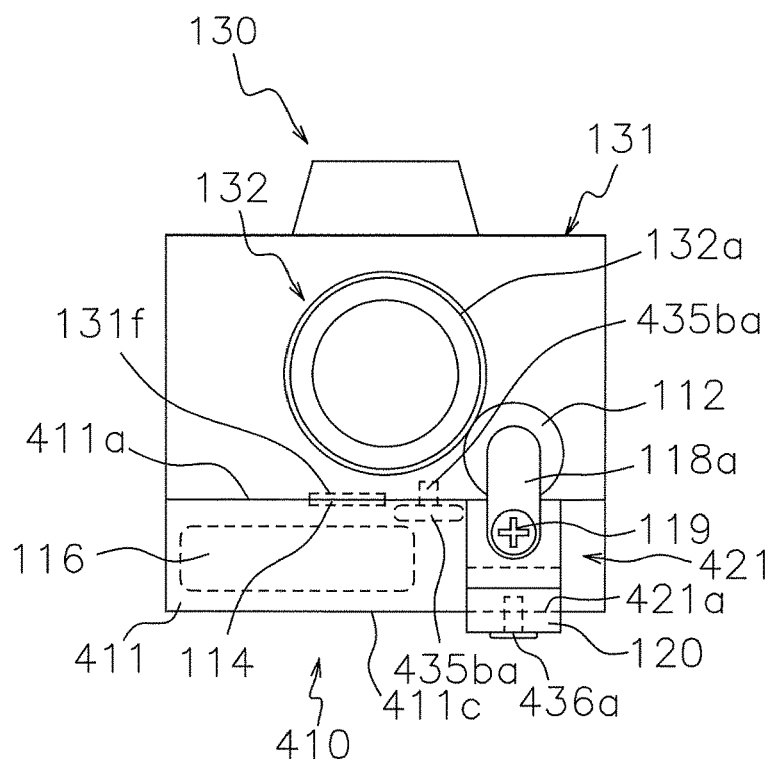
FIG. 33A2

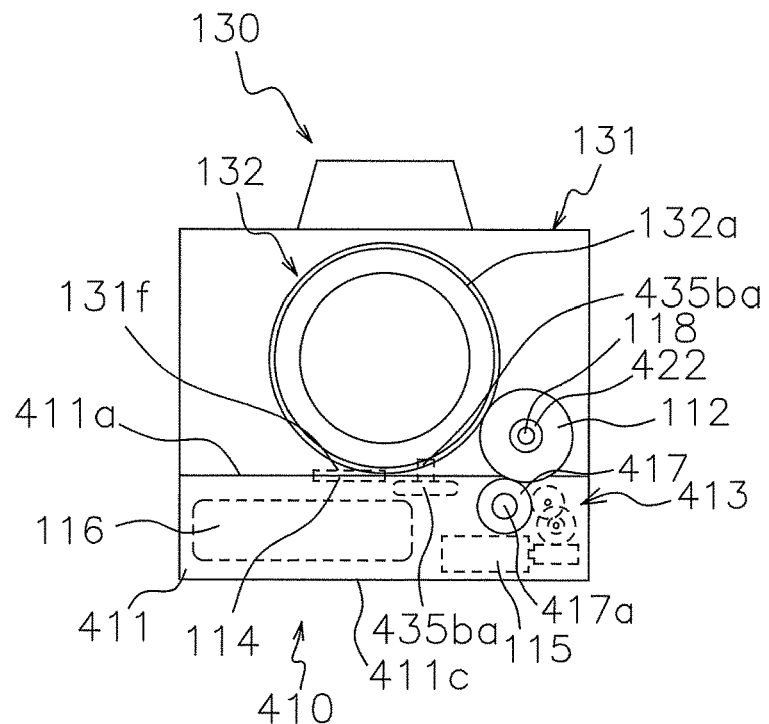
FIG. 33B1
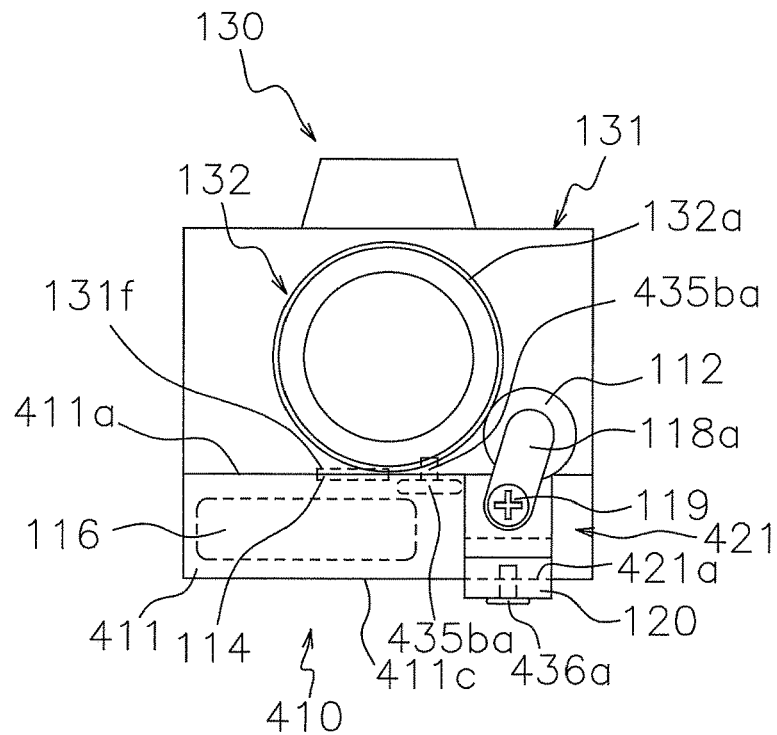
FIG. 33B2

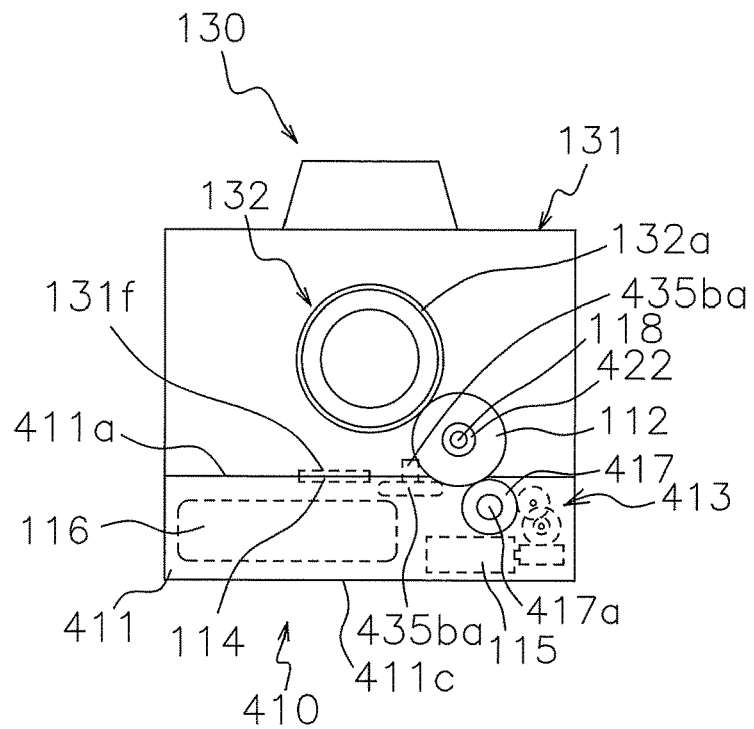
FIG. 33C1
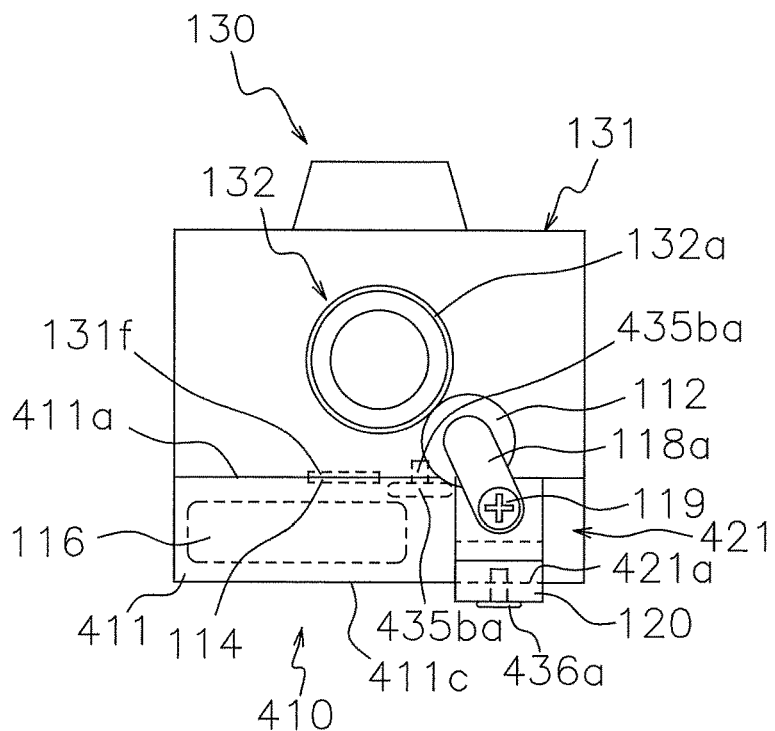
FIG. 33C2

CAMERA SYSTEM, CAMERA BODY

BACKGROUND

Technical Field

The present disclosure relates to a camera system and a camera body that drive a manually operated ring such as a zoom ring or a focus ring of a lens barrel mounted to the camera body.

Description of the Related Art

Recent years have seen the use of camera systems including includes a lens barrel in which a gear is provided around the outer periphery of a manually operated ring such as a zoom ring, and accessories having a coupling member that couples the gear of the lens barrel to a rotation handle.

For instance, Patent Literature 1 discloses an accessory coupling device including a ring portion and three or more support arms that are supported at one end so as to be able to pivot toward the inside diameter side of the ring portion and to the other end of which is pivotably supported a lens fixing portion that is fixed to a lens barrel. This accessory coupling device can be used regardless of the outside diameter of the lens barrel.

CITATION LIST

Patent Literature

Patent Literature 1: JP-A 2015-040909

SUMMARY

Problem to be Solved by the Disclosure

However, the following problem is encountered with the conventional accessory coupling device described above.

That is, with the accessory coupling device disclosed in the above publication, information about the characteristics of a movable lens included in the mounted lens barrel cannot be recognized. Accordingly, there is a risk that the accessory coupling device will rotate the manually operated ring beyond the movable range of the movable lens included in the lens barrel, for example.

It is an object of the present disclosure to provide a camera system and a camera body with which drive control can be performed according to the characteristics of the movable lens included in the lens barrel that is mounted.

Means for Solving Problem

The camera system according to the present disclosure includes a camera body, a lens barrel that is mounted to the camera body and includes at least one movable lens, and a manually operated ring drive device that is mounted to the camera body. The camera body has an input unit for inputting at least one optical characteristic value for the lens barrel, and a first control unit for controlling the input unit. The lens barrel has a manually operated ring for moving the movable lens in the optical axis direction in order to vary the optical characteristics, a lens position sensor for sensing the position of the movable lens, a storage unit for storing information about the characteristics of the movable lens, and a second control unit for controlling the lens position sensor and the storage unit. The manually operated ring drive device has a transmission part that transmits rotation to the manually operated ring, a drive unit that rotationally drives the transmission part, and a third control unit that controls the drive unit. The camera body and the lens barrel each have a first mechanical connection portion that allows the two to be mechanically connected to each other and a first electrical connection portion that allows the two to be electrically connected to each other. The camera body and the manually operated ring drive each have a second mechanical connection portion that allows the two to be mechanically connected to each other and a second electrical connection portion that allows the two to be electrically connected to each other. The first control unit controls the second control unit and the third control unit such that the drive unit moves the movable lens on the basis of the optical characteristic value inputted to the input unit and information about the characteristics of the movable lens.

Effects

With the camera system of the present disclosure, drive control can be performed according to the characteristics of the movable lens included in the lens barrel that is mounted.

BRIEF DESCRIPTION OF THE DRAWINGS

FIG. 33A1 is a front view showing a state in which a camera to which a lens barrel has been mounted is set in the zoom ring drive device in FIG. 30, in which a plate member, a fixing member, a holding portion, and a fixing screw are not depicted;

FIG. 33A2 is a front view showing a state in which a camera to which a lens barrel has been mounted is set in the zoom ring drive device in FIG. 30;

FIG. 33B1 is a front view showing a state in which a camera to which a lens barrel having a zoom ring outside diameter greater than that in FIG. 33A1 has been mounted is set on the zoom ring drive device in FIG. 30, in which the plate member, fixing member, holding portion, and fixing screw are not depicted;

FIG. 33B2 is a front view showing a state in which a camera to which a lens barrel having a zoom ring outside diameter greater than that in FIG. 33A2 has been mounted is set on the zoom ring drive device in FIG. 30;

FIG. 33C1 is a front view showing a state in which a camera to which a lens barrel having a zoom ring outside diameter less than that in FIG. 33A1 has been mounted is set on the zoom ring drive device in FIG. 30, in which the plate member, fixing member, holding portion, and fixing screw are not depicted;

FIG. 33C2 is a front view showing a state in which a camera to which a lens barrel having a zoom ring outside diameter less than that in FIG. 33A2 has been mounted is set on the zoom ring drive device in FIG. 30.

DETAILED DESCRIPTION OF THE EMBODIMENT

Embodiments will now be described in detail through reference to the drawings. However, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The applicant has provided the appended drawings and the following description so that a person skilled in the art might fully understand this disclosure, but does not intend for these to limit what is discussed in the patent claims.

Embodiment 1

A zoom ring drive device (manually operated ring drive device) 10 according to an embodiment of the present disclosure will be now described with reference to FIGS. 1 to 14B.

Figure 1:
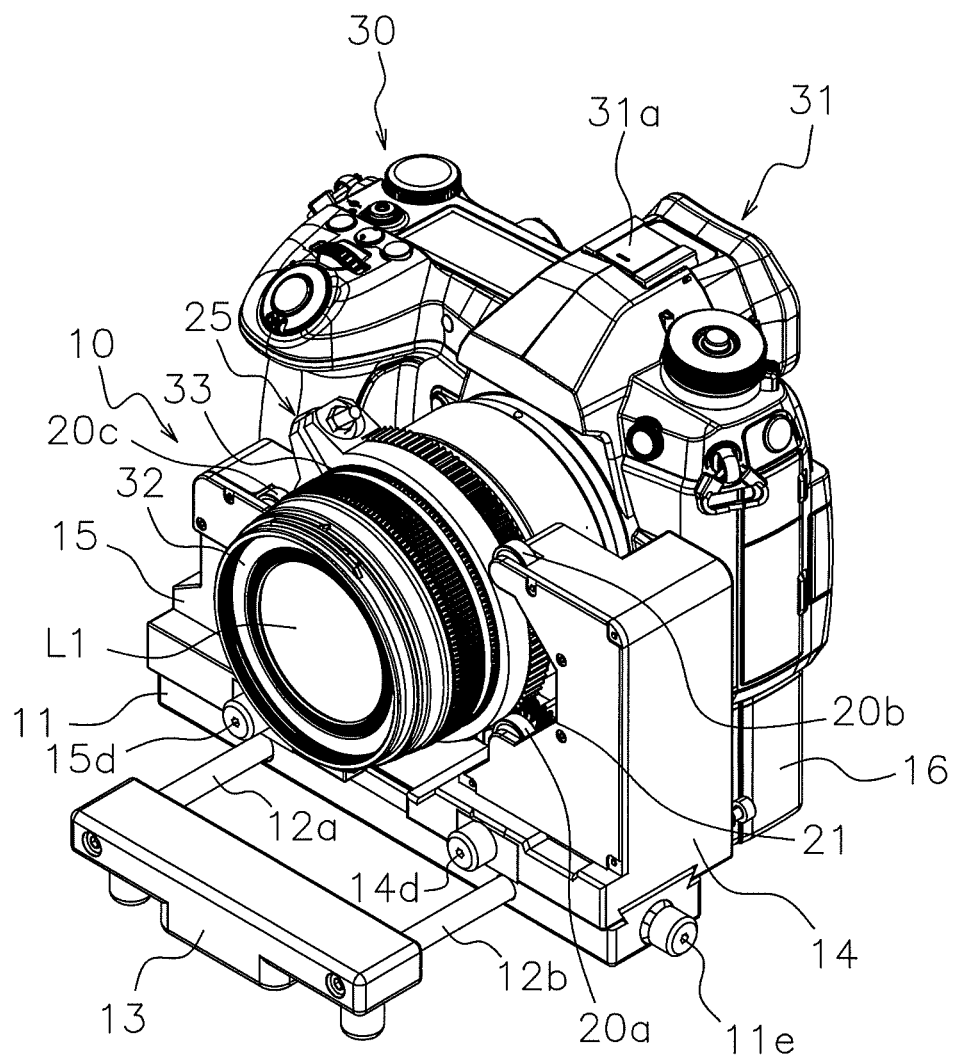
FIG. 1 is an overall oblique view showing a state in which a camera has been set on a zoom ring drive device according to an embodiment of the present disclosure.

The zoom ring drive device 10 according to this embodiment is used, for example, to control the rotational operation of a zoom ring (manually operated ring) 33 when continuously shooting video with a camera 30. The zoom ring drive device 10 controls the rotation of the zoom ring 33, which is rotatably operated on the outer peripheral surface of a lens barrel 32 mounted to a camera body 31, and is used in a state in which the camera 30 has been put in place as shown in FIG. 1.

(1) Configuration of Camera 30

The camera 30 is capable of capturing still images or moving images, and includes the camera body 31 and the lens barrel 32.

The camera body 31 converts light that is incident through the lens barrel 32 into a signal using a built-in imaging element (not shown) to form an image.

The lens barrel 32 is detachably mounted to the camera body 31, and includes a plurality of lenses L1, etc., along the optical axis direction. Light that comes in from the lens L1 side exits from the camera body 31 side. The lens barrel 32 includes a zoom ring 33 whose drive is controlled by the zoom ring drive device 10 of this embodiment.

Figure 2A:
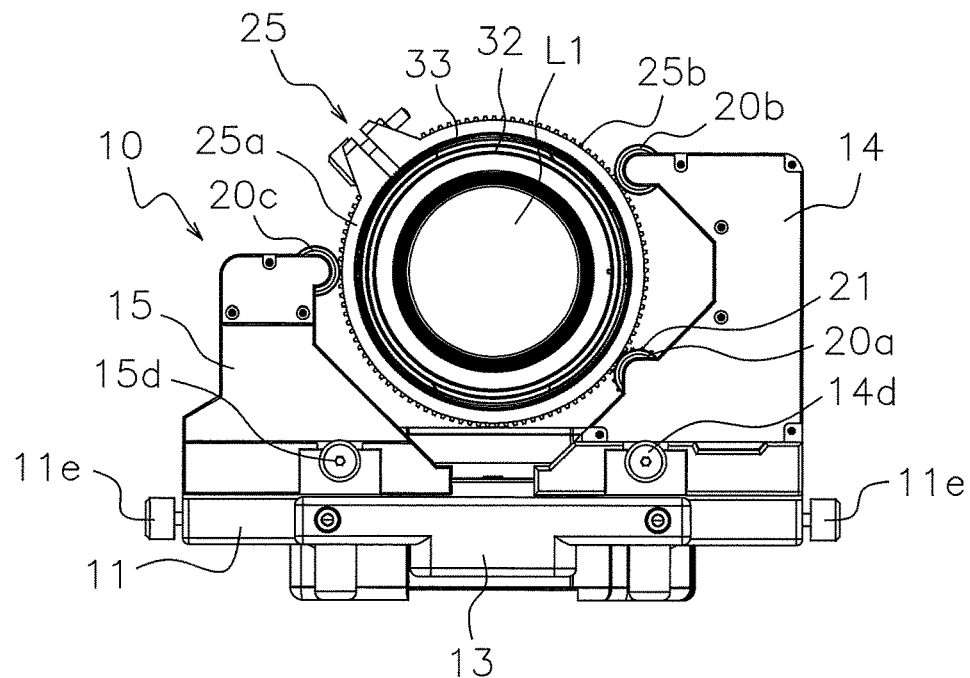
FIG. 2A is a front view showing the state on the lens barrel side on which the camera has been set on the zoom ring drive device in FIG. 1.

Also, as shown in FIG. 2A, the outer peripheral surface of the lens barrel 32 is indirectly supported at three points on its via a ring gear 25 by three rollers 20a, 20b, and 20c included in the zoom ring drive device 10.

To simplify the description, only the lens barrel 32 is shown in FIG. 2A, but let us assume that the lens barrel 32 is actually mounted to the camera body 31. The same applies to FIGS. 7A and 7B below.

Figure 2B:
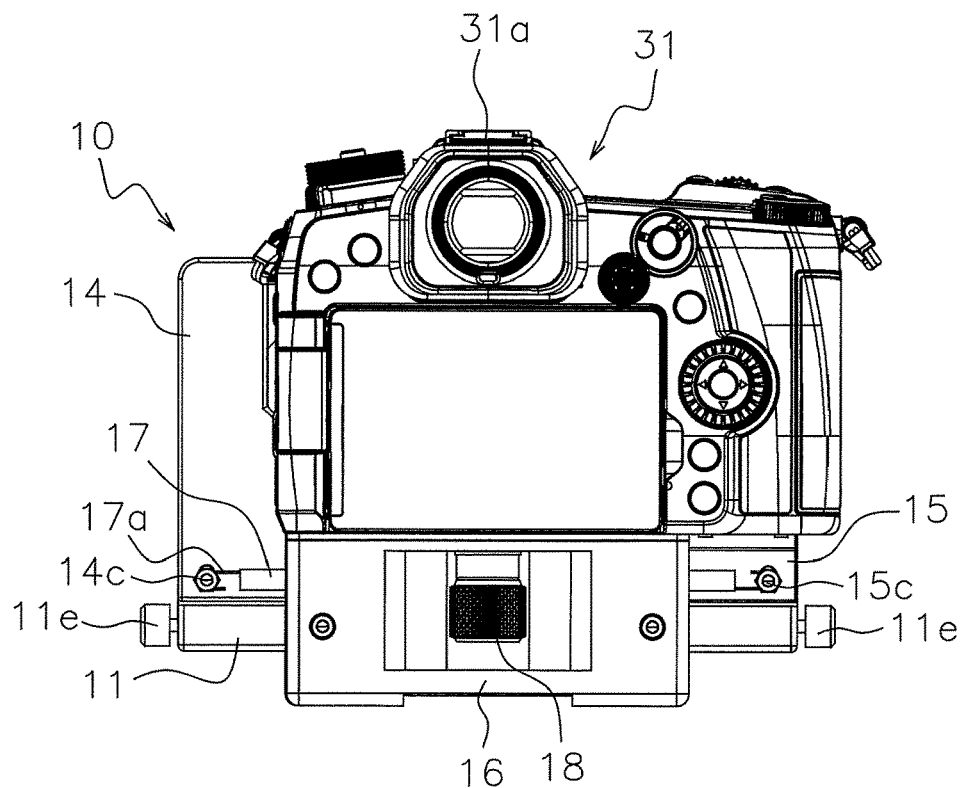
FIG. 2B is a rear view showing the state on the camera body side on which the camera has been set on the zoom ring drive device in FIG. 1.

At this point, as shown in FIG. 2B, the camera body 31 is fixed by threading a fixing screw 18, which is provided to the base part 16 of the zoom ring drive device 10, into a screw hole provided in the bottom surface of the camera body 31.

The zoom ring 33 is an annular member that is provided in order to move a zoom lens (movable lens; not shown), out of the plurality of lenses built into the lens barrel 32, back and forth in the optical axis direction to perform a zooming operation, and is rotated on the outermost peripheral surface of the lens barrel 32. As shown in FIGS. 1, 2A, etc., a ring gear 25 that rotates while meshed with a drive gear 21 of the zoom ring drive device 10 is mounted to the outer peripheral side of the zoom ring 33 in a state of being incapable of relative rotation.

(2) Configuration of Zoom Ring Drive Device 10

In order to control the drive of the zoom ring 33 of the lens barrel 32, the zoom ring drive device 10 includes the drive gear 21, a reduction gear 22, a DC motor (drive unit) 23, a third control unit 24, a power receiving unit 26, a rotational speed sensor 27, and a storage unit 28.

The drive gear 21 is a gear member that drives the rotation of the zoom ring 33 of the lens barrel 32 of the camera 30 set on the zoom ring drive device 10, and drives the rotation of the zoom ring 33 via a ring gear 25 mounted on the outer peripheral surface of the zoom ring 33.

The reduction gear 22 is a mechanism that transmits the rotational torque of the DC motor 23 to the drive gear 21 while reducing the rotational speed, and is made up of a plurality of reduction gears.

The DC motor 23 is a drive source that imparts rotational torque to the drive gear 21 through the reduction gear 22, is rotated by power supplied through the power receiving unit 26, and is controlled by the third control unit 24.

The third control unit 24 receives information about the characteristics of the zoom lens (movable lens) from the camera body 31 via a second mechanical and electrical connection portion 35b, and controls the DC motor 23 on the basis of the characteristics of the zoom lens.

Figure 3:
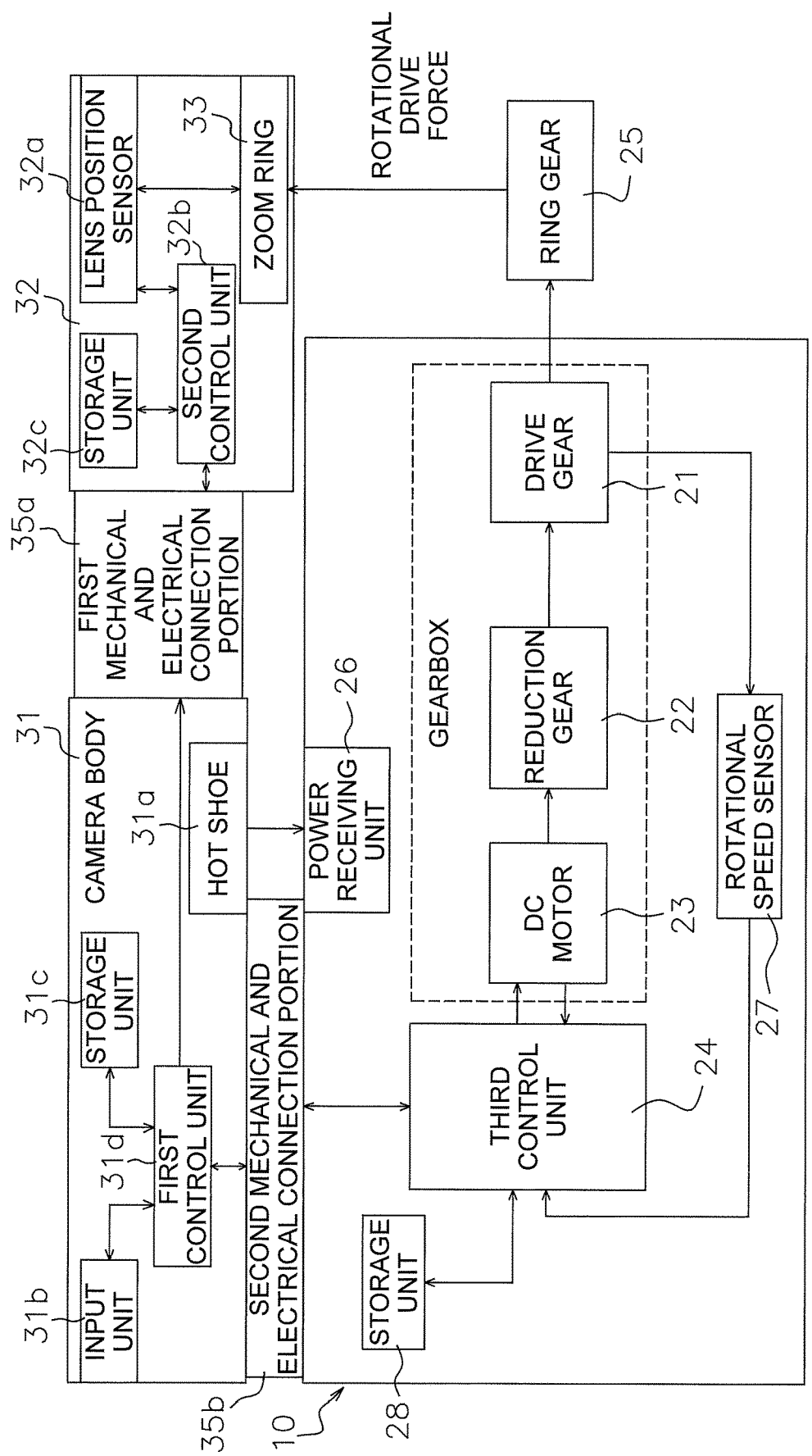
FIG. 3 is a control block diagram of the zoom ring drive device in FIG. 1.

As shown in FIG. 3, the lens barrel 32 mounted to the camera body 31 includes a zoom ring 33, a lens position sensor 32a that senses the position of the zoom lens, a second control unit 32b that controls the drive of the zoom lens or other such movable lenses included the lens barrel 32, and a storage unit 32c that stores information about the zoom lens, etc.

When the lens barrel 32 is mounted, the camera body 31 acquires information about the characteristics of the zoom lens from the second control unit 32b of the lens barrel 32 via the first mechanical and electrical connection portion 35a. Then, the first control unit 31d causes the storage unit 31c to store the information about the characteristics of the zoom lens received via the second mechanical and electrical connection portion 35b.

Here, the information about the zoom lens characteristics received by the third control unit 24 via the second mechanical and electrical connection portion 35b includes, for example, information about the movable range of the zoom lens within the lens barrel 32.

In this case, the third control unit 24 controls the DC motor 23 so that the constituent parts of the lens barrel 32 at the end of the movable range of the movable lens are not objected to a load exceeding a specific value.

More precisely, the third control unit 24 receives information about the position of the zoom lens included in the lens barrel 32 from the camera body 31 via the second mechanical and electrical connection portion 35b, and performs control to stop the drive of the DC motor 23 once the zoom lens moves to the end of its movable range.

Consequently, the zoom ring drive device 10 rotates the zoom ring 33 that drives the zoom lens back and forth in the optical axis direction, and thereby prevents any further movement out of the range of motion at the end of the range of motion of the zoom lens.

The power receiving unit 26 receives power supplied from the camera body 31 and supplies this power to the DC motor 23, the third control unit 24, and so forth of the zoom ring drive device 10.

Consequently, the DC motor 23 and the third control unit 24 are driven by the power supplied from the camera body 31, so the zoom ring drive device 10 does not need to have its own power supply, which means that the zoom ring drive device 10 can be smaller and lighter.

Two-way communication between the zoom ring drive device 10 side and the camera body 31 side is performed via the second mechanical and electrical connection portion 35b. More specifically, the second mechanical and electrical connection portion 35b transmits information about the characteristics of the zoom lens, such as its range of motion and its current position, from the camera body 31 to the zoom ring drive device 10, and also transmits information such as drive errors in the zoom ring drive device 10 to the camera body 31 side.

In this embodiment, to simplify the description, the first mechanical and electrical connection portion 35a and the second mechanical and electrical connection portion 35b are depicted as a single component, but it is to be assumed that the connection part and the electrical part are actually provided separately.

Also, the first mechanical and electrical connection portion 35a functions as a communication unit that performs two-way communication between the camera body 31 and the lens barrel 32. Similarly, the second mechanical and electrical connection portion 35b functions as a communication portion that performs two-way communication between the zoom ring drive device 10 and the camera body 31.

The detailed configuration of the zoom ring drive device 10 in this embodiment will now be described with reference to the drawings.

Figure 4:
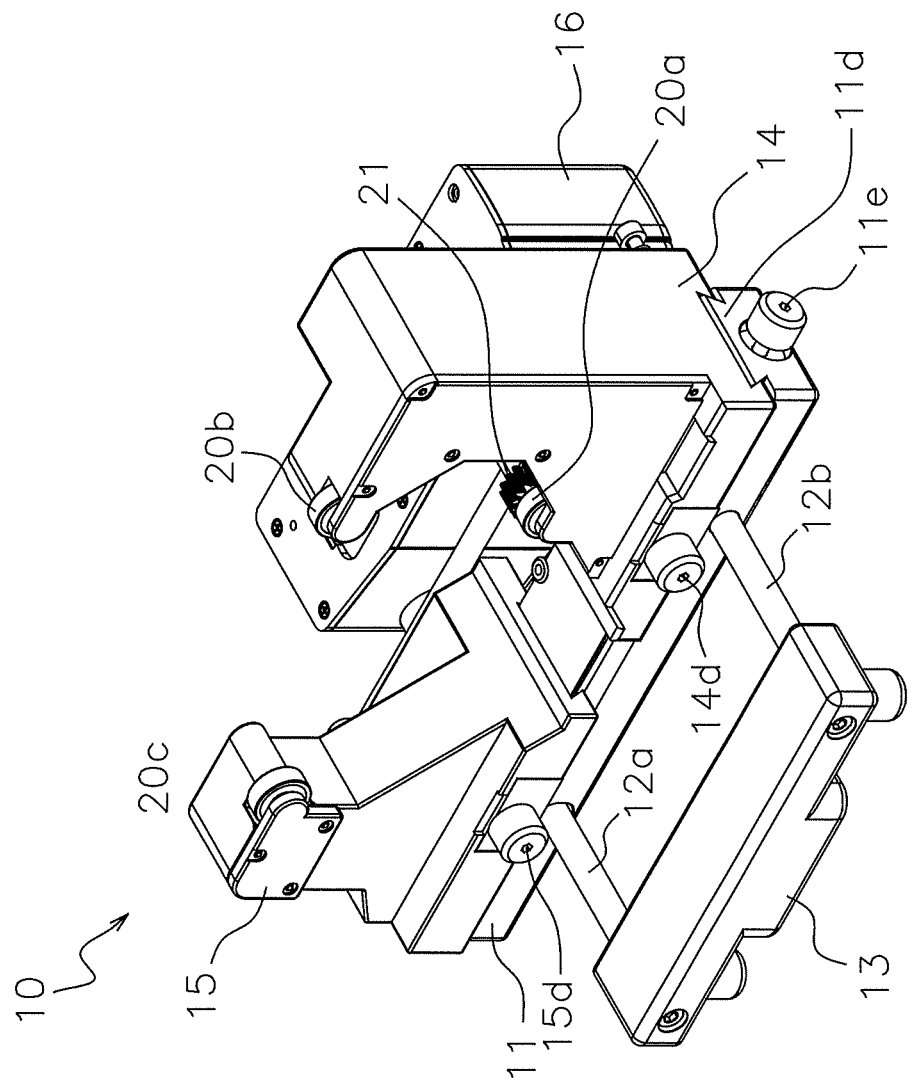
FIG. 4 is an oblique view of the configuration of the zoom ring drive device in FIG. 3.
Figure 5:
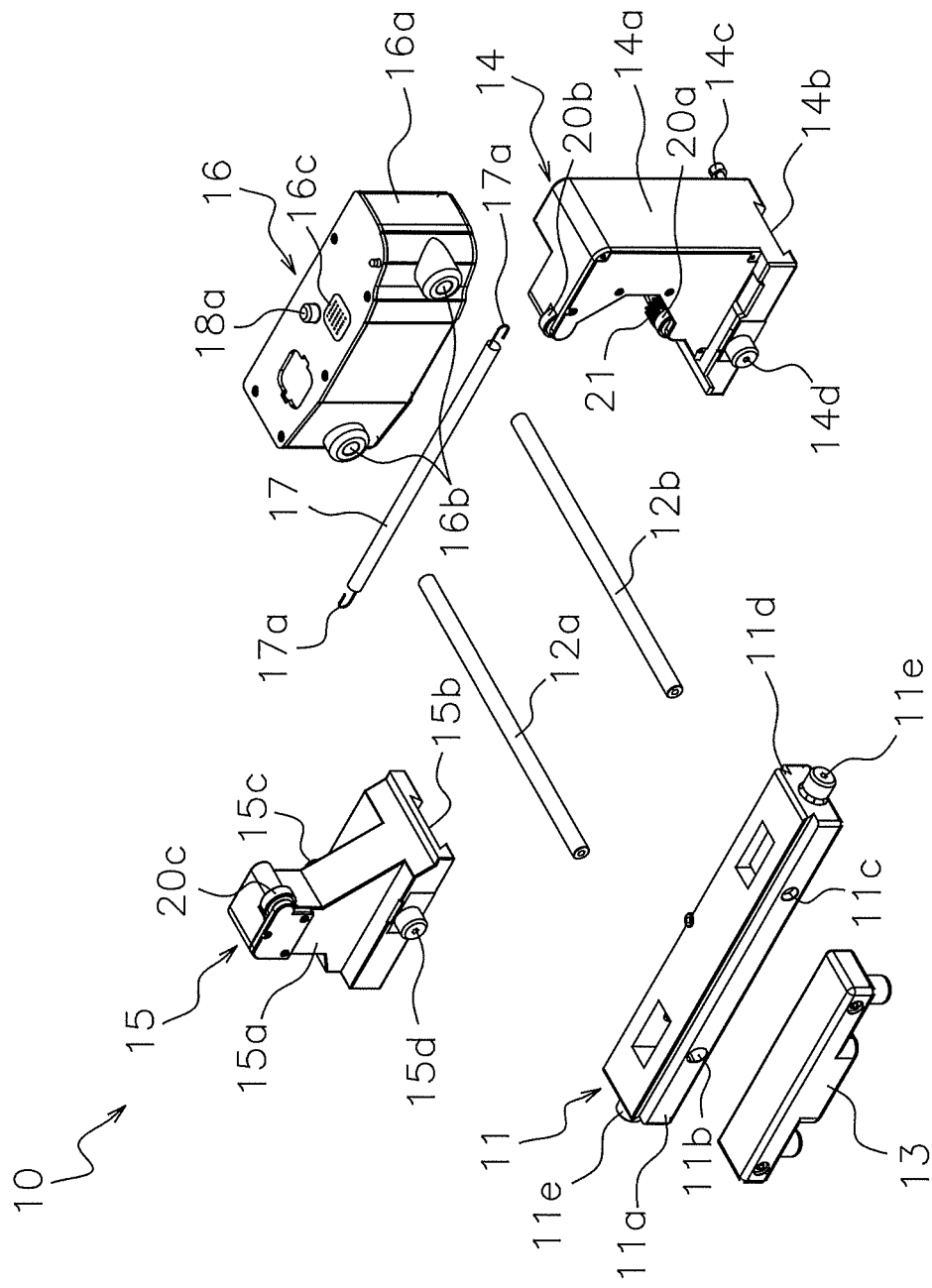
FIG. 5 is an exploded oblique view of the zoom ring drive device in FIG. 4.

As shown in FIGS. 4 and 5, the zoom ring drive device 10 of this embodiment includes a guide portion (first guide portion) 11, guide shafts 12a and 12b, a front portion 13, a guide portion (second guide portion) 14, a guide portion (third guide portion) 15, a base part 16, a spring (biasing member) 17, a fixing screw 18, three rollers 20a, 20b, and 20c, a drive gear 21, a reduction gear 22, a DC motor 23, and a ring gear 25.

The two guide shafts 12a and 12b, whose ends are respectively fixed to the front portion 13 and the base part 16, are inserted into the guide portion (first guide portion) 11, and the guide portion 11 is provided so as to be able to slide back and forth between the front portion 13 and the base part 16. As shown in FIG. 5, the guide portion 11 has a main body portion 11a, a slot 11b, a through-hole 11c, rail portions 11d, fixing screws (first fixing portions) 11e, and fixing members (first fixing portions) 11f.

As shown in FIG. 5, the main body portion 11a is a substantially cuboid member, and has two through-holes (the slot 11b and the through-hole 11c) that pass through the longer surface side.

As shown in FIG. 5, the slot 11b has a guide shaft 12a inserted therein and is formed as a hole that is longer in the up and down direction. The support structure for the guide shaft 12a in the slot 11b will be described below in detail.

As shown in FIG. 5, the through-hole 11c is formed as a substantially circular hole into which the guide shaft 12b is inserted.

As shown in FIG. 5, the rail portions 11d are convex portions provided at both ends on the upper surface side, and the guide portions 14 and 15 are slid in a direction substantially perpendicular to the optical axis direction in a state of being engaged with the rail portions 14b and 15b on the guide portions 14 and 15 side.

Figure 6A:
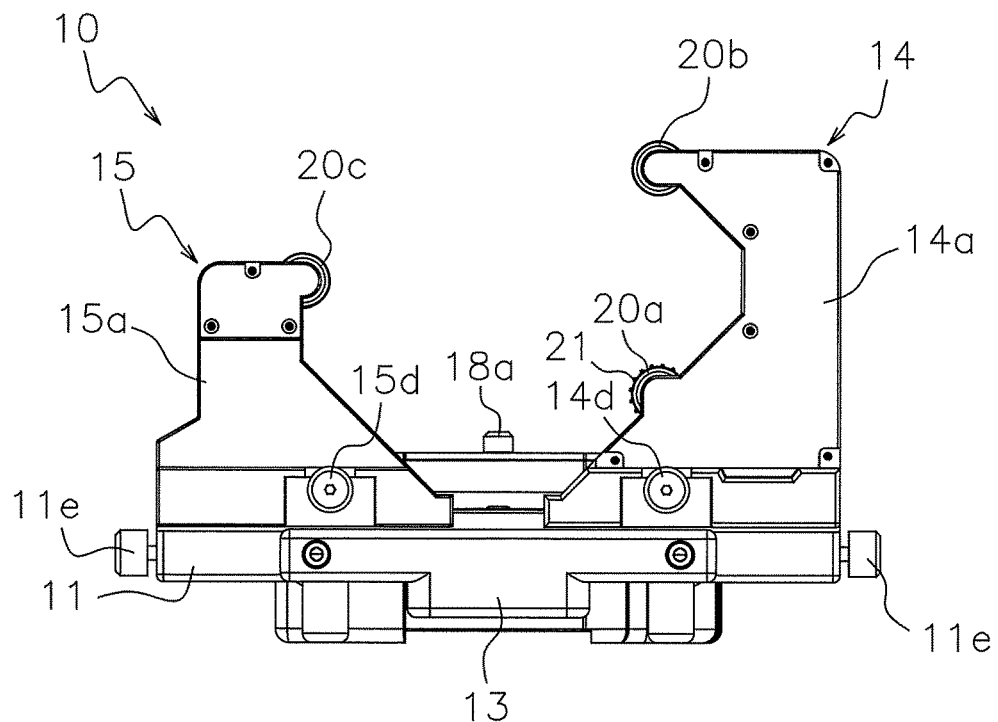
FIG. 6A is a front view of the zoom ring drive device in FIG. 4.
Figure 6B:
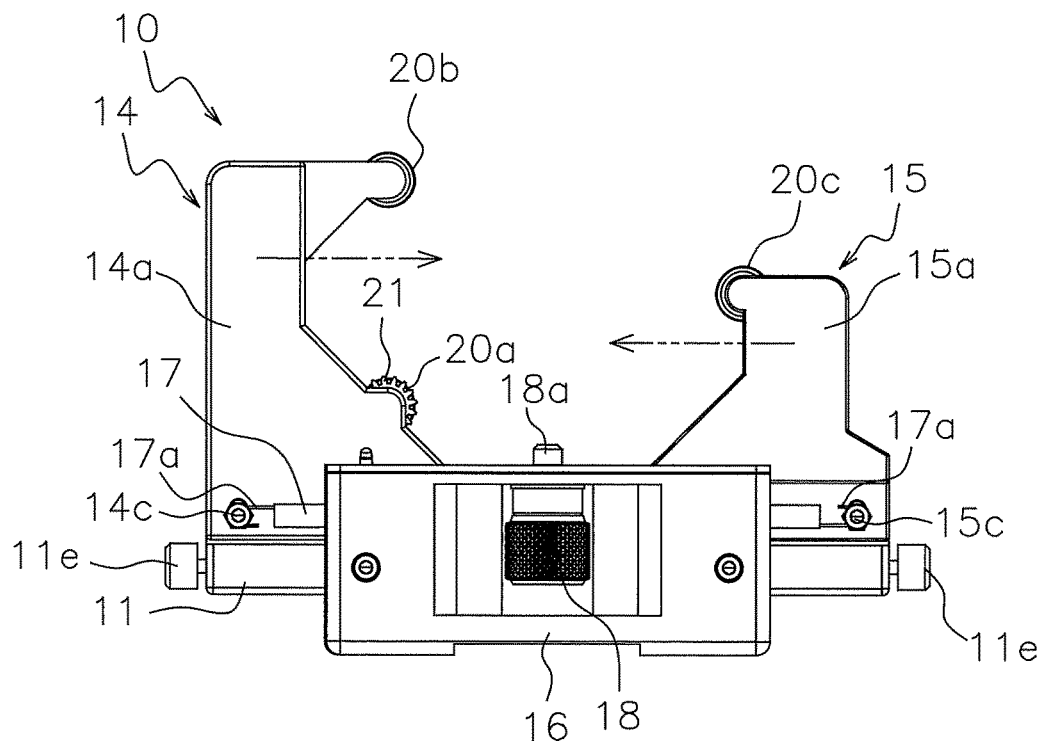
FIG. 6B is a rear view of the zoom ring drive device in FIG. 4.

As shown in FIGS. 6A and 6B, the fixing screws 11e are provided on both short side surfaces of the main body portion 11a, and when turned clockwise, restrict movement along the guide shafts 12a and 12b of the guide portions 14 and 15.

Figure 7A:
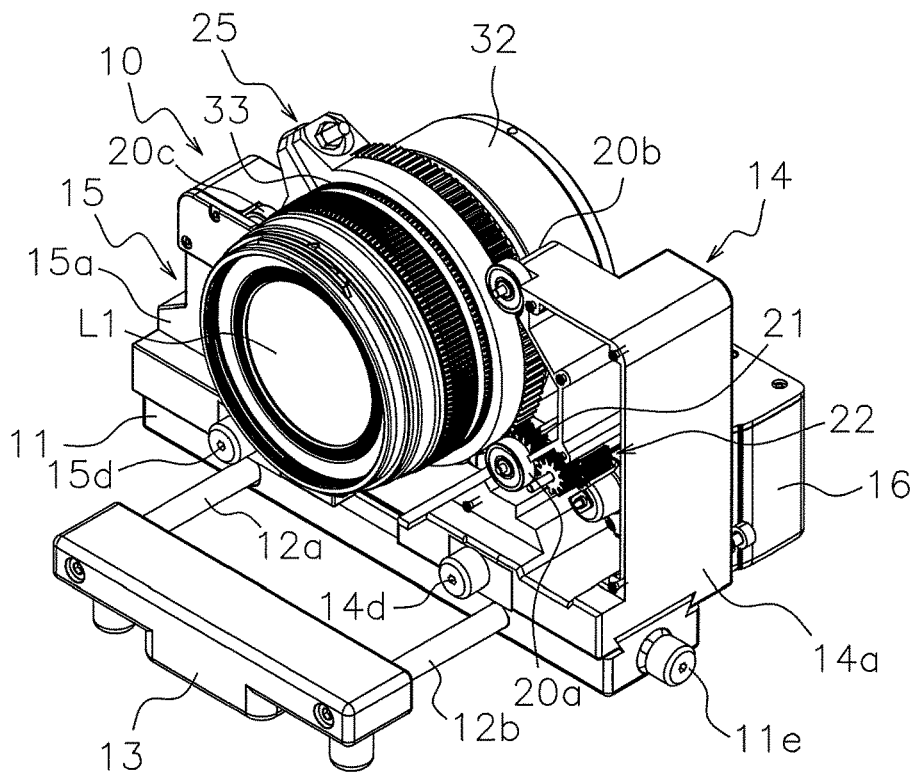
FIG. 7A is an oblique view of the state when the lens barrel has been set in the zoom ring drive device in FIG. 4.
Figure 7B:
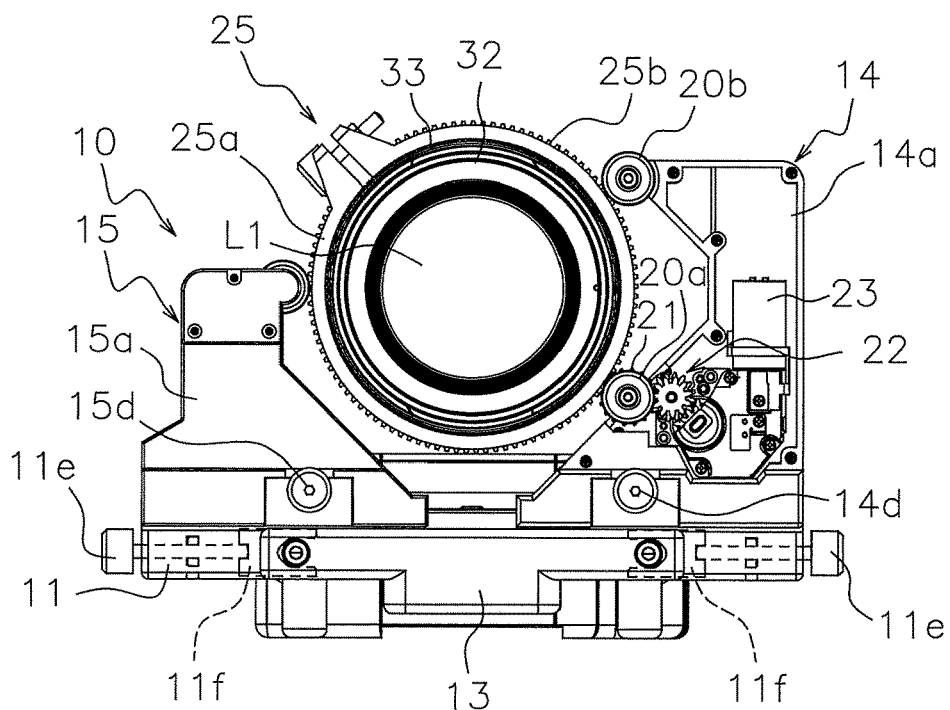
FIG. 7B front view of FIG. 7A.

As shown in FIG. 7B, the fixing members 11f are provided inside the main body portion 11a at positions where they can come into contact with the guide shafts 12a and 12b. When the fixing screws 11e are rotated clockwise, the fixing members 11f are pressed against the guide shafts 12a and 12b by the tips of the fixing screws 11e.

This restricts the movement of the guide portions 14 and 15 back and forth in the optical axis direction along the guide shafts 12a and 12b due to the rotational operation of the fixing screws 11e, allowing temporary positioning of the guide portions 14 and 15 to be performed.

As shown in FIG. 5, the guide shafts 12a and 12b are provided substantially parallel to each other in the optical axis direction. The guide shafts 12a and 12b are each fixed at a first end on the front portion 13 side, and at a second end (on the opposite side from the first end) on the base part 16 side. The guide shafts 12a and 12b are respectively inserted into the slot 11b and the through-hole 11c so as to pass through the guide portion 11 (described above).

As shown in FIG. 1, etc., the front portion 13 is disposed closer to the object than anything else in the zoom ring drive device 10 when the camera 30 is put in place. The front portion 13 supports the first end sides of the guide shafts 12a and 12b so that the guide portion 11 can move along the guide shafts 12a and 12b between and the base part 16 and the front portion 13.

As shown in FIGS. 6A and 6B, the guide portion (second guide portion) 14 is provided so as to be able to slide along the upper surface of the guide portion 11 in a direction substantially perpendicular to the optical axis direction, and is disposed to the side of the lens barrel 32 when the camera 30 is put in place. As shown in FIG. 5, the guide portion 14 has a main body portion 14a, a rail portion 14b, a latched portion 14c, and a fixing screw (second fixing portion) 14d.

As shown in FIG. 5, the main body portion 14a is a substantially cuboid member, and rotatably supports the rollers 20a and 20b on the lower portion and the upper portion, respectively, of the surface on the side where the lens barrel 32 is held. The rail portion 14b, which engages with the rail portion 11d of the guide portion 11, is provided on the bottom side of the main body portion 14a. As shown in FIGS. 7A and 7B, the main body portion 14a is provided with a gearbox including the reduction gear 22, the DC motor 23, and so on in its internal space.

As shown in FIG. 5, the rail portion 14b is a concave portion formed on the bottom surface side of the main body portion 14a, and engages with the convex rail portion 11d of the guide portion 11 (described above). This allows the guide portion 14 to move along the lengthwise direction of the guide portion 11 in a direction substantially perpendicular to the optical axis direction.

As shown in FIGS. 5 and 6B, the latched portion 14c is a projecting portion provided on the side surface of the main body portion 14a that is opposite the base part 16, and one end of the spring 17 (latching portion 17a) (discussed below) is latched thereto.

As shown in FIG. 5, the fixing screw 14d is provided on the side surface of the main body portion 14a on the opposite side from the latched portion 14c. When rotated clockwise, the fixing screw 14d restricts the movement of the guide portion 14 in the lengthwise direction of the guide portion 11.

This temporarily fixes the position of the guide portion 14 where the lens barrel 32 is sandwiched from both sides along with the guide portion 15 in a well-balanced manner.

The guide portion (third guide portion) 15 is disposed opposite the guide portion 14 and supports the outer peripheral surface of the lens barrel 32 between itself and the guide portion 14. As shown in FIGS. 6A and 6B, the guide portion 15 is provided in a state of being able to slide along the upper surface of the guide portion 11 in a direction substantially perpendicular to the optical axis direction, and is disposed to the side of the lens barrel 32 when the camera 30 is in place. As shown in FIG. 5, the guide portion 15 has a main body portion 15a, a rail portion 15b, a latched portion 15c, and a fixing screw 15d.

As shown in FIG. 5, the main body portion 15a is a substantially cuboid member, and rotatably supports the roller 20c at the upper part of the surface on the side where the lens barrel 32 is held. Also, the rail portion 15b, which engages with the rail portion 11d of the guide portion 11 (discussed above), is provided on the bottom side of the main body portion 15a.

As shown in FIG. 5, the rail portion 15b is a concave portion formed on the bottom side of the main body portion 15a, and engages with the convex rail portion 11d of the guide portion 11 (discussed above). This allows the guide portion 15 to move along the lengthwise direction of the guide portion 11 in a direction substantially perpendicular to the optical axis direction.

As shown in FIG. 6B, the latched portion 15c is a projecting portion provided on the side surface of the main body portion 15a that is opposite the base part 16, and one end of the spring 17 (latching portion 17a) (discussed below) is latched thereto.

Consequently, since the ends of the spring 17 are latched to the main body portions 14a and 15a, when the guide portions 14 and 15 are moved away from each other, there is a counter force, that is, a biasing force is exerted in the direction of moving these toward each other.

As shown in FIG. 5, the fixing screw 15d is provided on the side surface of the main body portion 15a on the opposite side from the latched portion 15c. When rotated clockwise, the fixing screw 15d restricts the movement of the guide portion 15 along the lengthwise direction of the guide portion 11.

This temporarily fixes the position of the guide portion 14 where the lens barrel 32 is sandwiched from both sides along with the guide portion 15 in a well-balanced manner.

The base part 16 is connected in a state that allows relative movement of the guide portion 11 in the optical axis direction, and the camera body 31 is placed on the upper surface thereof, as shown in FIG. 2B, etc.

As shown in FIG. 5, a main body portion 16a has a substantially cuboid shape, and the front side thereof is provided with insertion holes 16b into which one end of the guide shafts 12a and 12b is inserted and fixed.

As shown in FIG. 5, the insertion holes 16b are provided near the left and right ends of the front surface of the main body portion 16a, and the guide shafts 12a and 12b are inserted and fixed therein.

The spring (spring member) 17 has a first end (latching portion 17a) that is connected to the guide portion 14, and a second end (latching portion 17a) that is connected to the guide portion 15. The spring 17 applies a pulling force to move the guide portion 14 and the guide portion 15 in the direction of sandwiching the lens barrel 32.

The latching portions 17a are provided at the ends of the spring 17, and are latched to the latched portions 14c and 15c provided on the side surfaces of the guide portions 14 and 15.

Here, in a steady state before the lens barrel 32 is sandwiched between the guide portions 14 and 15, the length of the spring 17 is less than the spacing of the latched portions 14c and 15c in a state in which the lens barrel 32 is sandwiched between the guide portions 14 and 15.

Consequently, in a state in which the camera 30 has been put in place on the zoom ring drive device 10 and the outer peripheral surface of the lens barrel 32 is indirectly supported by the rollers 20a, 20b, and 20c at three points via the ring gear 25, the spring 17 is in its stretched state, and a biasing force is applied in the direction of bringing the guide portions 14 and 15 closer together. Therefore, when the camera 30 is put in place on the zoom ring drive device 10, the lens barrel 32 is stably supported at three points so that the ring gear 25 wound around the outer peripheral surface thereof is pressed by the three rollers 20a, 20b, and 20c by the biasing force of the spring 17.

As shown in FIG. 5, the fixing screw 18 is inserted from the bottom side of the main body portion 16a of the base part 16, and is disposed so that the threaded part 18a at the distal end thereof protrudes from the upper surface of the base part 16.

The threaded part 18a is screwed into a screw hole (not shown) provided in the bottom surface of the camera body 31 in a state in which the camera body 31 has been placed on the upper surface of the base part 16, thereby fixing the camera body 31 to the base part 16.

As shown in FIGS. 7A and 7B, the three rollers 20a, 20b, and 20c are provided to the guide portion 14 and the guide portion 15 so as to be rotatable around their rotational axes, and provided three-point support in a state of being in contact with the outer peripheral surface of the ring gear 25 wound around the outer peripheral surface of the lens barrel 32 in a state that does not permit relative rotation. That is, the three rollers 20a, 20b, and 20c indirectly support the outer peripheral surface of the lens barrel 32 via the ring gear 25.

As shown in FIGS. 7A and 7B, the roller (first roller) 20a is disposed at the lower part of the guide portion 14 coaxially with the drive gear 21 in the guide portion 14 and in a rotatable state. The roller 20a supports the outer peripheral surface of the lens barrel 32 via the ring gear 25.

As shown in FIGS. 7A and 7B, the roller (second roller) 20b is disposed at the upper part of the guide portion 14, sandwiching a horizontal plane including the optical axis of the lens L1 included in the lens barrel 32, on the opposite side from the roller 20a, and in a rotatable state. The roller 20b supports the outer peripheral surface of the lens barrel 32 via the ring gear 25.

As shown in FIGS. 7A and 7B, the roller (third roller) 20c is disposed at the upper part of the guide portion 15, on the opposite side from the first roller with the lens barrel 32 interposed therebetween, and in a rotatable state. The roller 20c supports the outer peripheral surface of the lens barrel 32 via the ring gear 25.

As shown in FIG. 5, the drive gear 21 is disposed at a position adjacent to the roller 20a so as to be coaxial with the roller 20a provided in a rotatable state in the guide portion 14. As shown in FIGS. 7A and 7B, the drive gear 21 is provided at a position in the guide portion 14 of engagement with the gear portion 25b of the ring gear 25 wound around the outer peripheral surface of the zoom ring 33. The drive gear 21 rotates the zoom ring 33 by rotating in a state in which the rotational drive force from the DC motor 23 is transmitted via the reduction gear 22, it a state in which its gear portion is meshed with the gear portion 25b of the ring gear 25 wound around the zoom ring 33.

That is, the drive gear 21 is indirectly connected to the zoom ring 33 via the ring gear 25, and rotational drive force is transmitted via the ring gear 25 to the zoom ring 33.

As shown in FIGS. 7A and 7B, the reduction gear 22 is provided inside a gearbox in the internal space of the guide portion 14, and includes a plurality of reduction gears that transmit to the drive gear 21 the rotational drive force applied from the DC motor 23.

As shown in FIGS. 7A and 7B, the DC motor 23 is provided in a gearbox in the internal space of the guide portion 14, and is controlled by the third control unit 24 so as to rotationally drive the drive gear 21 (see FIG. 3).

Figure 8A:
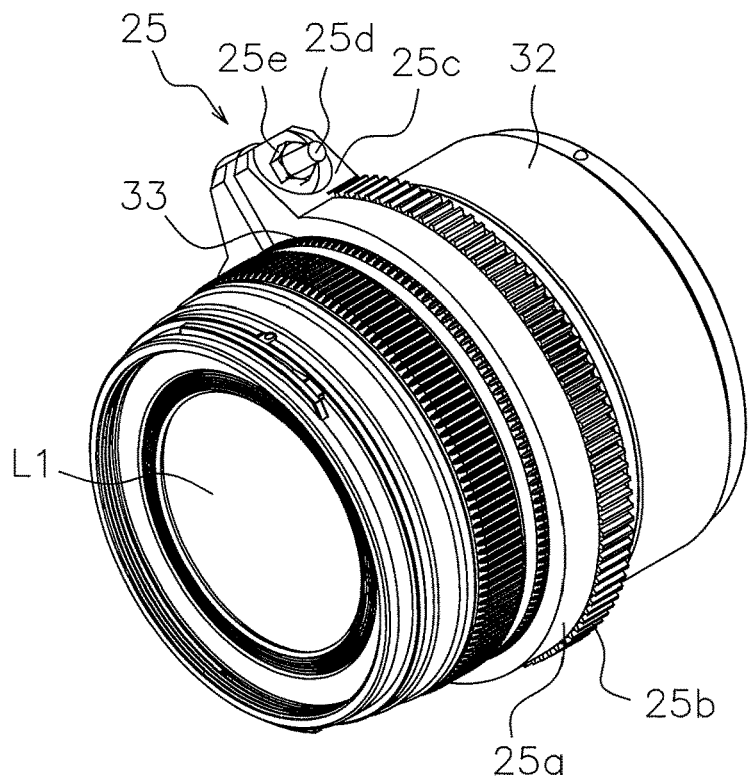
FIG. 8A is an oblique view of the state when a ring gear has been mounted to the outer peripheral surface of the zoom ring of the lens barrel mounted to the camera body of the camera in FIG. 1, etc.
Figure 8B:
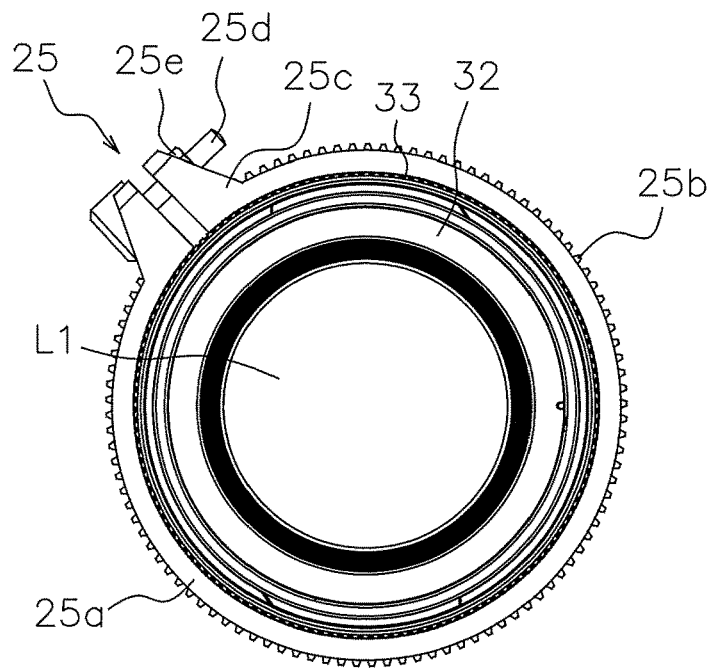
FIG. 8B is a front view of FIG. 8A.
Figure 9A:
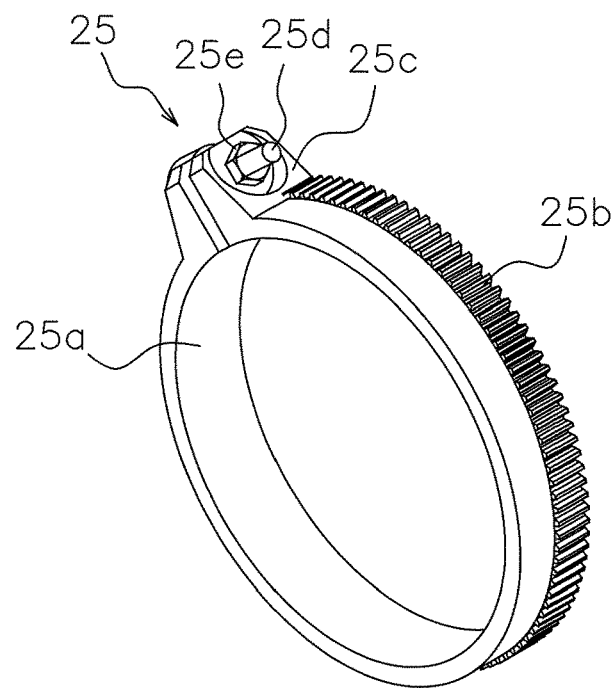
FIG. 9A is an oblique view of the configuration of the ring gear mounted to the outer peripheral surface of the zoom ring of the lens barrel in FIG. 8A.
Figure 9B:
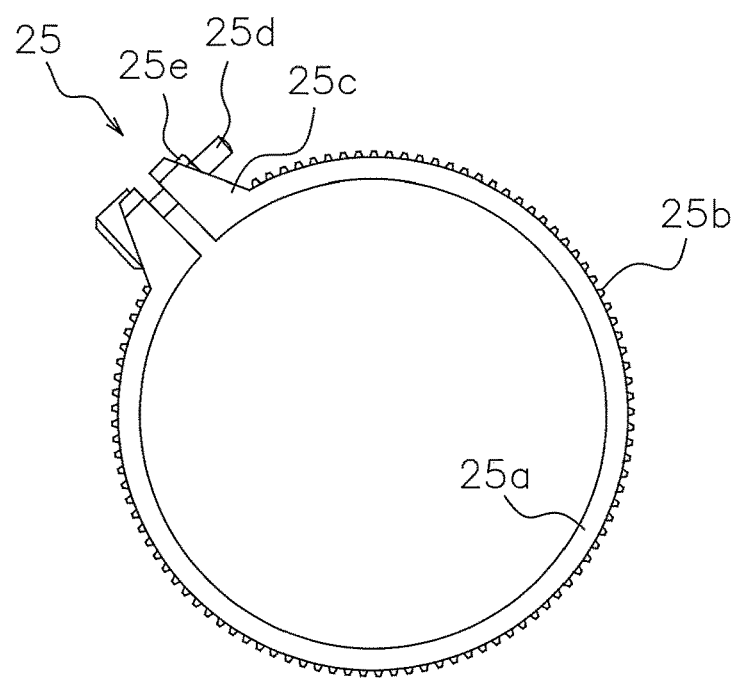
FIG. 9B is a front view of FIG. 9A.

As shown in FIGS. 8A and 8B, the ring gear 25 is detachably mounted to the outer circumference of the zoom ring 33 of the lens barrel 32 in a state of being incapable of relative rotation with respect to the zoom ring 33. As shown in FIGS. 9A and 9B, the ring gear 25 has a main body portion 25a, a gear portion 25b, a fastening portion 25c, a bolt 25d, and a nut 25e.

As shown in FIGS. 9A and 9B, the main body portion 25a is a substantially annular member, and is molded from a resin such as PC (polycarbonate) or ABS (acrylonitrile butadiene styrene). The main body portion 25a has on its outer peripheral surface side a gear portion 25b with which the drive gear 21 meshes. Also, the main body portion 25a has contact surfaces, with which the three rollers 20a, 20b, and 20c respectively come into contact, at positions adjacent to the gear portion 25b on the outer peripheral surface side thereof.

Texturing may be applied to the substantially annular inner peripheral surface of the main body portion 25a. In this case, the frictional force generated between the inner peripheral surface of the ring gear 25 and the outer peripheral surface (gear portion 25b) of the zoom ring 33 increases because of the texturing, so the ring gear 25 can be attached in a state of being less likely to rotate relative to the zoom ring 33.

As shown in FIGS. 9A and 9B, the gear portion 25b is formed at a portion of the outer peripheral surface of the substantially annular main body portion 25a, and in a state of being meshed with the drive gear 21, rotates along with the zoom ring 33 when the drive gear 21 rotates.

As shown in FIGS. 9A and 9B, the fastening portion 25c is provided in order to couple and fasten the split ends of the substantially annular main body portion 25a. The fastening portion 25c fixes the ring gear 25 to the outer peripheral surface of the zoom ring 33 when the bolt 25d is threaded into the nut 25e and tightened.

As shown in FIGS. 9A and 9B, the bolt 25d is inserted into a through-hole provided in the fastening portion 25c, and its threaded portion is screwed into the nut 25e.

As shown in FIGS. 9A and 9B, the nut 25e is provided on the opposite side from the bolt head of the bolt 25d in the fastening portion 25c, and tightens the fastening portion 25c when the threaded portion of the bolt 25d is threaded into the nut 25e.

(3) Communication with Camera Body 31

As discussed above, the zoom ring drive device 10 of this embodiment acquires information about the movable range, current position, etc., of the zoom lens included in the lens barrel 32 from the camera body 31 side via the second mechanical and electrical connection portion 35b (see FIG. 3).

Figure 12A:
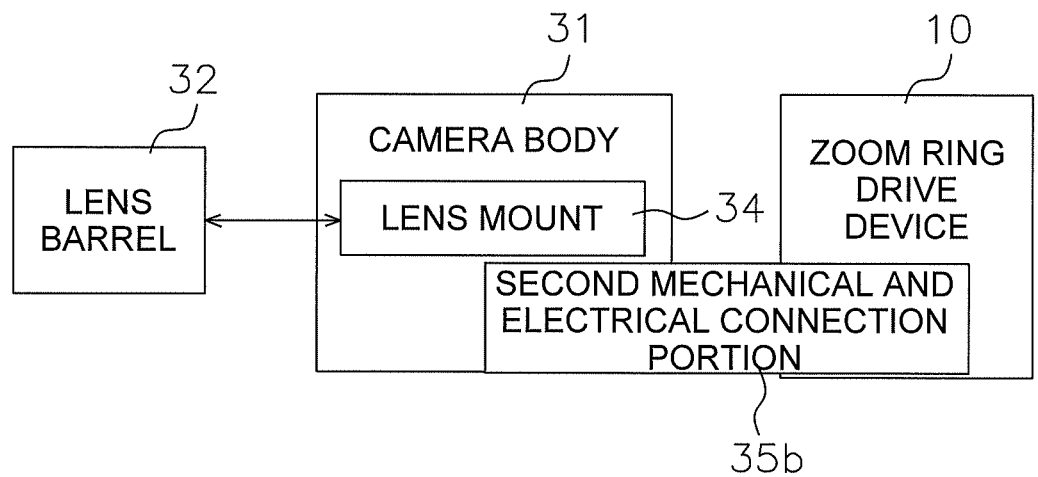
FIG. 12A is a block diagram of wireless communication between the zoom ring drive device, and the camera body, and between the camera body and the lens barrel in FIG. 1, etc.

At this time, as shown in FIG. 12A, the zoom ring drive device 10 is capable of two-way communication with the camera body 31 via the second mechanical and electrical connection portion 35b. Consequently, for example, when the camera 30 is installed in the zoom ring drive device 10, information about the zoom lens is transmitted from the camera body 31 to the zoom ring drive device 10. Furthermore, if a drive error occurs during rotation control in which the zoom ring 33 is rotated by the zoom ring drive device 10, drive error occurrence information or the like is transmitted from the zoom ring drive device 10 to the camera body 31.

Here, information about the zoom lens can be received via the lens mount 34 when the lens barrel 32 is mounted to the camera body 31, as shown in FIG. 12A. Communication between the camera body 31 and the lens barrel 32 may be performed through wireless communication.

Also, communication between the zoom ring drive device 10 side and the camera body 31 side is not limited to wireless communication, and may be performed by wire.

Figure 10:
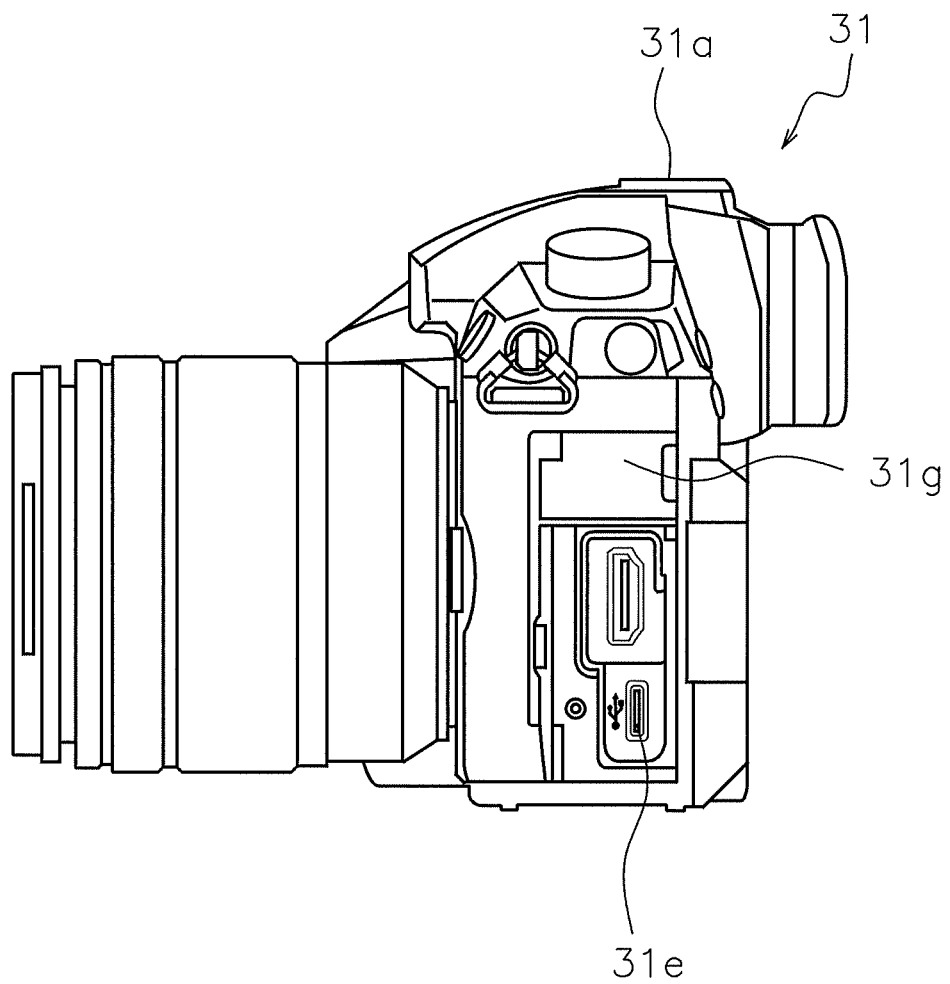
FIG. 10 is a side view of a USB terminal provided on the side surface of the camera body of the camera in FIG. 1, etc.
Figure 13A:
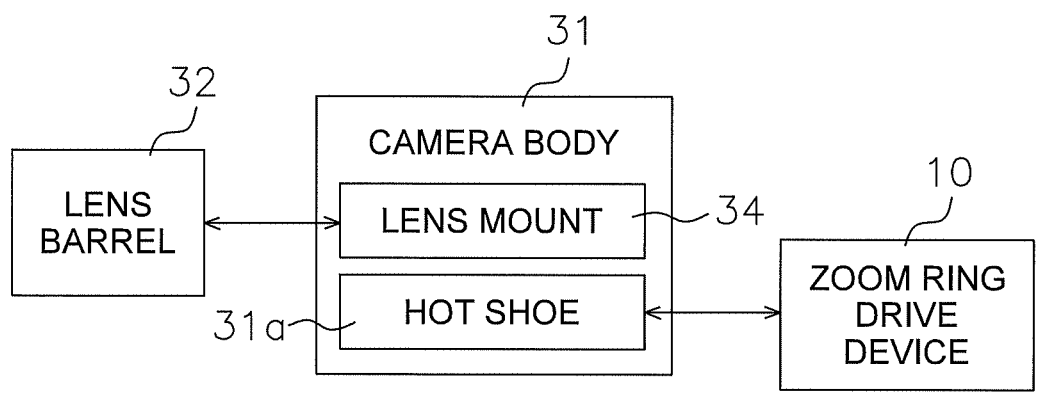
FIG. 13A is a block diagram of communication via a hot shoe between the zoom ring drive device and the camera body, and between the camera body and the lens barrel in FIG. 1, etc.
Figure 14A:
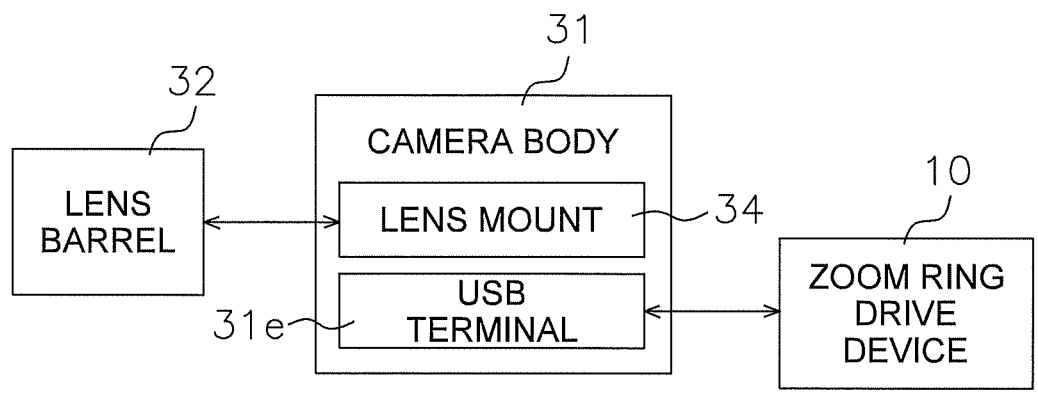
FIG. 14A is a block diagram of communication via a USB terminal between the zoom ring drive device and the camera body, and between the camera body and the lens barrel in FIG. 1, etc.

In the case of wired communication, as shown in FIG. 13A, the zoom ring drive device 10 may communicate via a hot shoe 31a on the camera body 31 side. Alternatively, as shown in FIGS. 10 and 14A, communication may be performed via a USB terminal 31e or an expansion port 31g provided on the side surface of the camera body 31.

Figure 11:
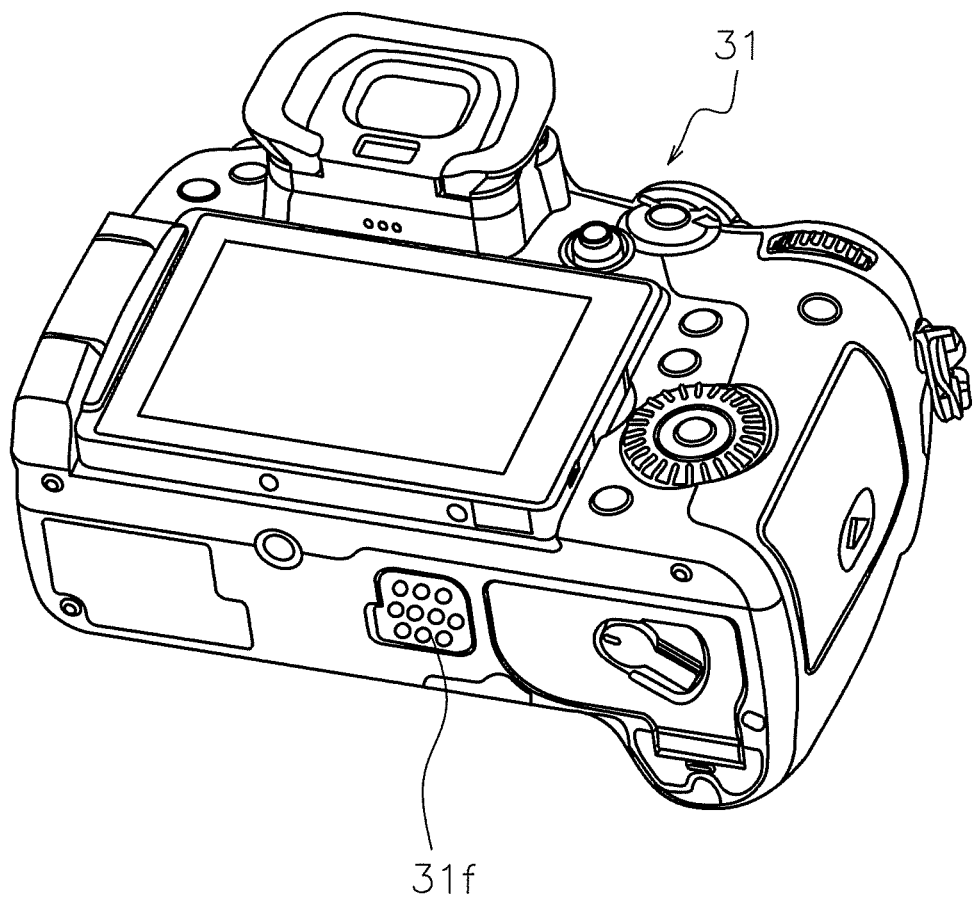
FIG. 11 is an oblique view of a contact terminal provided on the bottom surface of the camera body in FIG. 10.

Furthermore, in a state in which the camera 30 has been installed, the zoom ring drive device 10 may communicate via a contact terminal 31f provided on the bottom surface of the camera body 31, as shown in FIG. 11. In this case, two-way communication of information, etc., is possible if the contact terminal 16c of the zoom ring drive device 10 (see FIG. 5) and the contact terminal 31f of the camera body 31 are electrically connected while in contact with each other.

(4) Power Supply from Camera Body 31

Figure 13B:
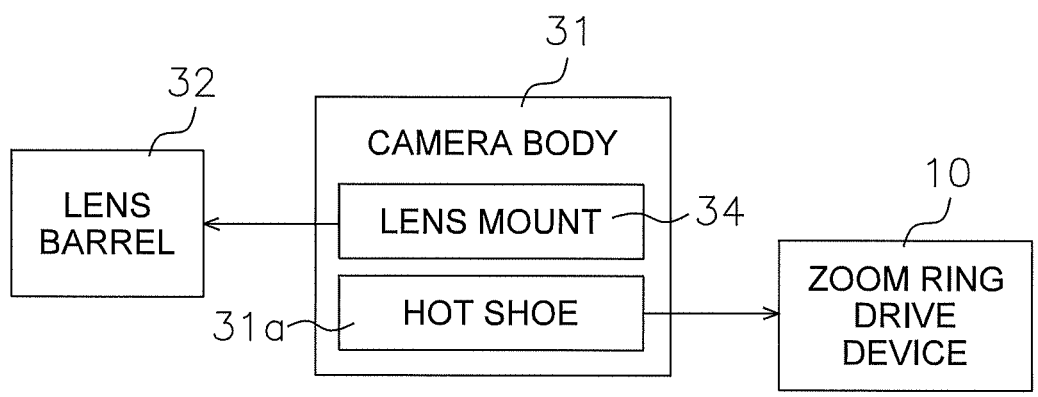
FIG. 13B is a block diagram of power supply via a hot shoe between the zoom ring drive device and the camera body, and between the camera body and the lens barrel in FIG. 1, etc.

As discussed above, with the zoom ring drive device 10 of this embodiment, power is supplied from the hot shoe 31a provided on the top of the camera body 31, as shown in FIG. 13B, via the power receiving unit 26 (see FIG. 3).

In this case, the power receiving unit 26 may be connected to the hot shoe 31a by an electrical wire (not shown).

Figure 12B:
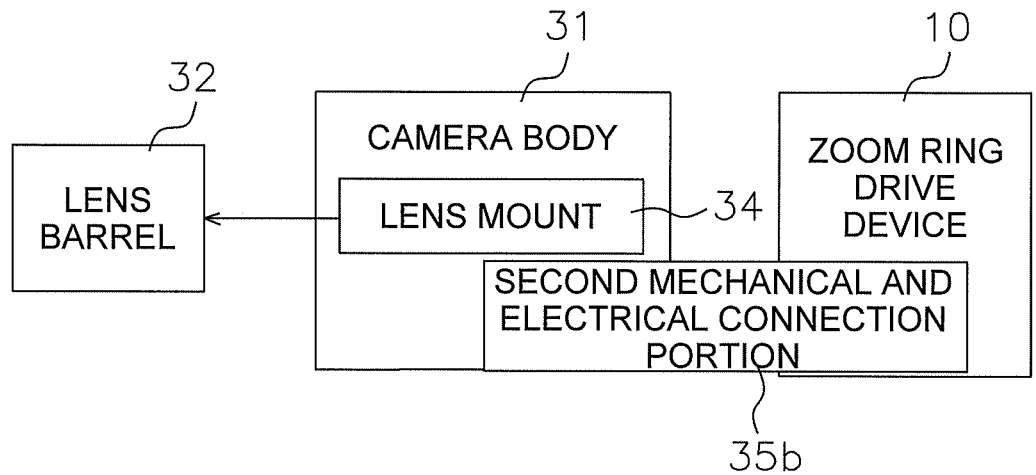
FIG. 12B is a block diagram of wireless power supply between the zoom ring drive device, and the camera body, and between the camera body and the lens barrel in FIG. 1, etc.

Here, power is supplied from the camera body 31 to the lens barrel 32 via the lens mount 34 when the lens barrel 32 has been mounted to the camera body 31, as shown in FIG. 12B.

Figure 14B:
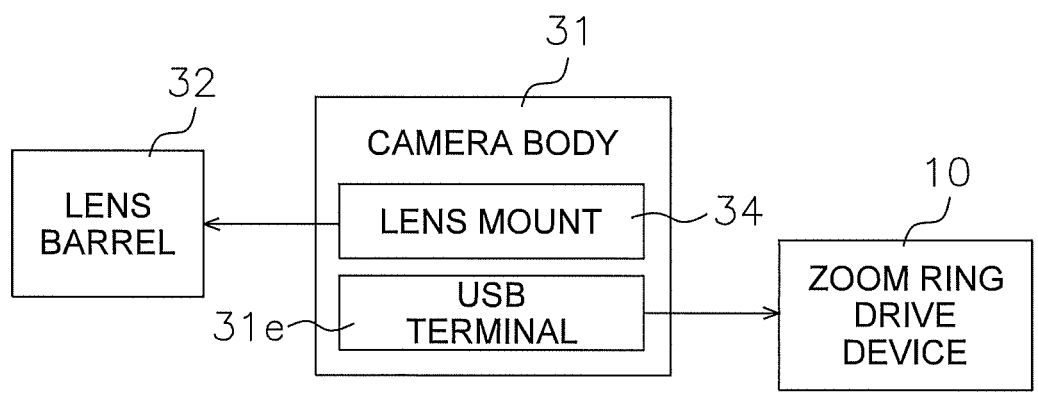
FIG. 14B is a block diagram of power feed via a USB terminal between the zoom ring drive device and the camera body, and between the camera body and the lens barrel in FIG. 1, etc.

Also, when power is supplied from the camera body 31 to the zoom ring drive device 10 by wire, the power may be supplied via the USB terminal 31e shown in FIGS. 10 and 14B, instead of the hot shoe 31a. Also, power may be supplied via the expansion port 31g (see FIG. 10) provided on the side surface of the camera body 31.

Furthermore, the zoom ring drive device 10 may be configured such that in a state in which the camera 30 has been installed, power is supplied via the contact terminal 31f provided on the bottom surface of the camera body 31, as shown in FIG. 11. In this case, power can be supplied from the camera body 31 side to the zoom ring drive device 10 if the contact terminal 16c on the zoom ring drive device 10 side (see FIG. 5) and the contact terminal 31f on the camera body 31 side are electrically connected while in contact with each other.

Also, in this embodiment the configuration is such that the zoom ring drive device 10 is electrically connected to the camera body 31 and has no electrical contact to the lens barrel 32.

Consequently, the zoom ring 33 of the lens barrel 32 of the camera 30 can be rotationally driven using the zoom ring drive device 10 even when lens barrels 32 of different sizes, shapes, and so forth are put in place.

Main Feature 1

As shown in FIG. 3, the zoom ring drive device 10 of this embodiment is a device for rotationally driving the zoom ring 33 that moves a zoom lens included in the lens barrel 32 mounted to the camera body 31 back and forth in the optical axis direction, and includes the drive gear 21, the DC motor 23, the second mechanical and electrical connection portion 35b, and the third control unit 24. The drive gear 21 is provided at a position where it directly or indirectly makes contact with the zoom ring 33, which changes the optical characteristics of the zoom lens included in the lens barrel 32, and rotates while in contact with the zoom ring 33 to rotate the zoom ring 33. The DC motor 23 rotationally drives the drive gear 21. The zoom ring drive device 10 communicates with the camera body 31 via the second mechanical and electrical connection portion 35b. The third control unit 24 receives information about the characteristics of the zoom lens from the camera body 31 via the second mechanical and electrical connection portion 35b, and controls the DC motor 23 on the basis of the characteristics of the zoom lens.

Consequently, the zoom ring drive device 10 can perform drive control according to the characteristics of the movable lens included in the lens barrel 32 that is mounted, on the basis of the information (movable range of the zoom lens, etc.) about the zoom lens (movable lens) acquired from the camera body 31 to which the lens barrel 32 is mounted.

As a result, even if a different lens barrel is mounted, it will still be possible to perform drive control according to the characteristics of the zoom lens included in the lens barrel 32.

Also, the camera body 31 of this embodiment is a camera body to which the lens barrel 32 is mounted in an interchangeable state, and as shown in FIG. 3, includes the storage unit 31c that acquires information about the lens barrel 32 via the first mechanical and electrical connection portion 35a when the lens barrel 32 is mounted, and stores the received information about the lens barrel 32, and the first control unit 31d that controls the first mechanical and electrical connection portion 35a so as to transmit the information about the lens barrel 32 stored in the storage unit 31c to an external device (such as the zoom ring drive device 10).

Consequently, the camera body 31 can receive information about the interchangeable lens barrel 32 from the lens barrel 32, and transmit that information to an external device (such as the zoom ring drive device 10).

This means that the external device that receives this information can acquire information about the movable range, focal length, aperture, and the like of the movable lens included in the lens barrel 32, for example, as information about the lens barrel 32, and can be utilized to control the camera 30 appropriately, etc.

Embodiment 2

The zoom ring drive device (manually operated ring drive device) 110 according to another embodiment of the present disclosure will now be described with reference to FIGS. 15 to 18B.

The zoom ring drive device 110 externally controls the rotation of a zoom ring 132a that moves a zoom lens (movable lens) included in a lens barrel 132 mounted to a camera body 131 back and forth in the optical axis direction.

Normally, with an external device such as this that controls the rotation of a zoom ring by rotating the zoom ring of the lens barrel while a drive gear is in contact with the zoom ring from the outside, a problem was that the external device tended to be large because it included members such as the housing that accommodated a DC motor or other such drive source.

Figure 15:
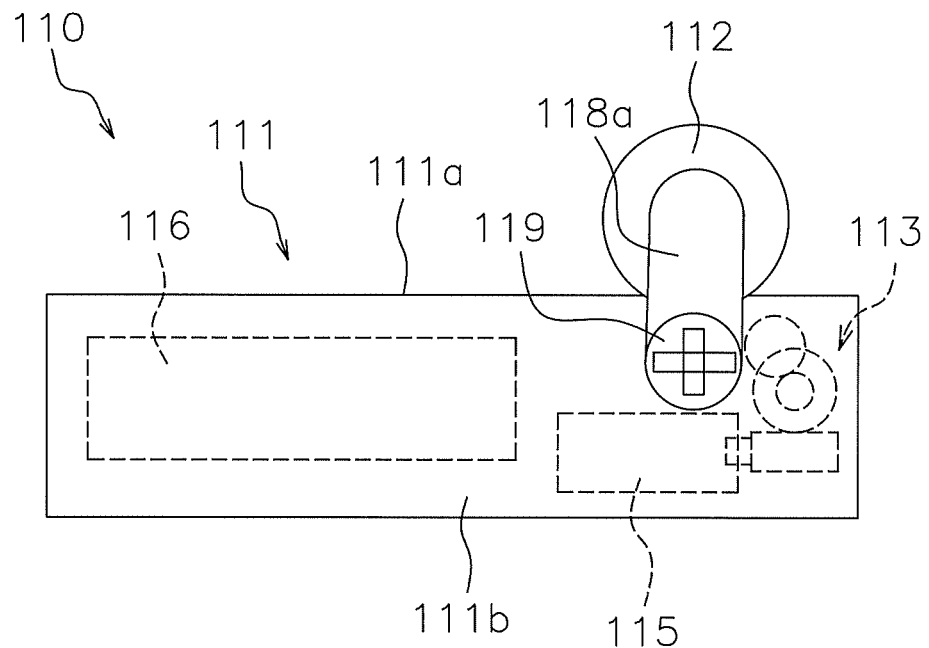
FIG. 15 is a schematic diagram of the configuration of a zoom ring drive device according to another embodiment of the present disclosure.

As shown in FIG. 15, the zoom ring drive device 110 according to this embodiment includes a base part 111, a drive gear 112, a reduction gear 113, a contact terminal 114, a motor (drive unit) 115, a second power supply unit 116, a long gear (rotary gear) 117 (see FIG. 17), a support member 118, a fixing member 119, and a holding portion 120.

Figure 16:
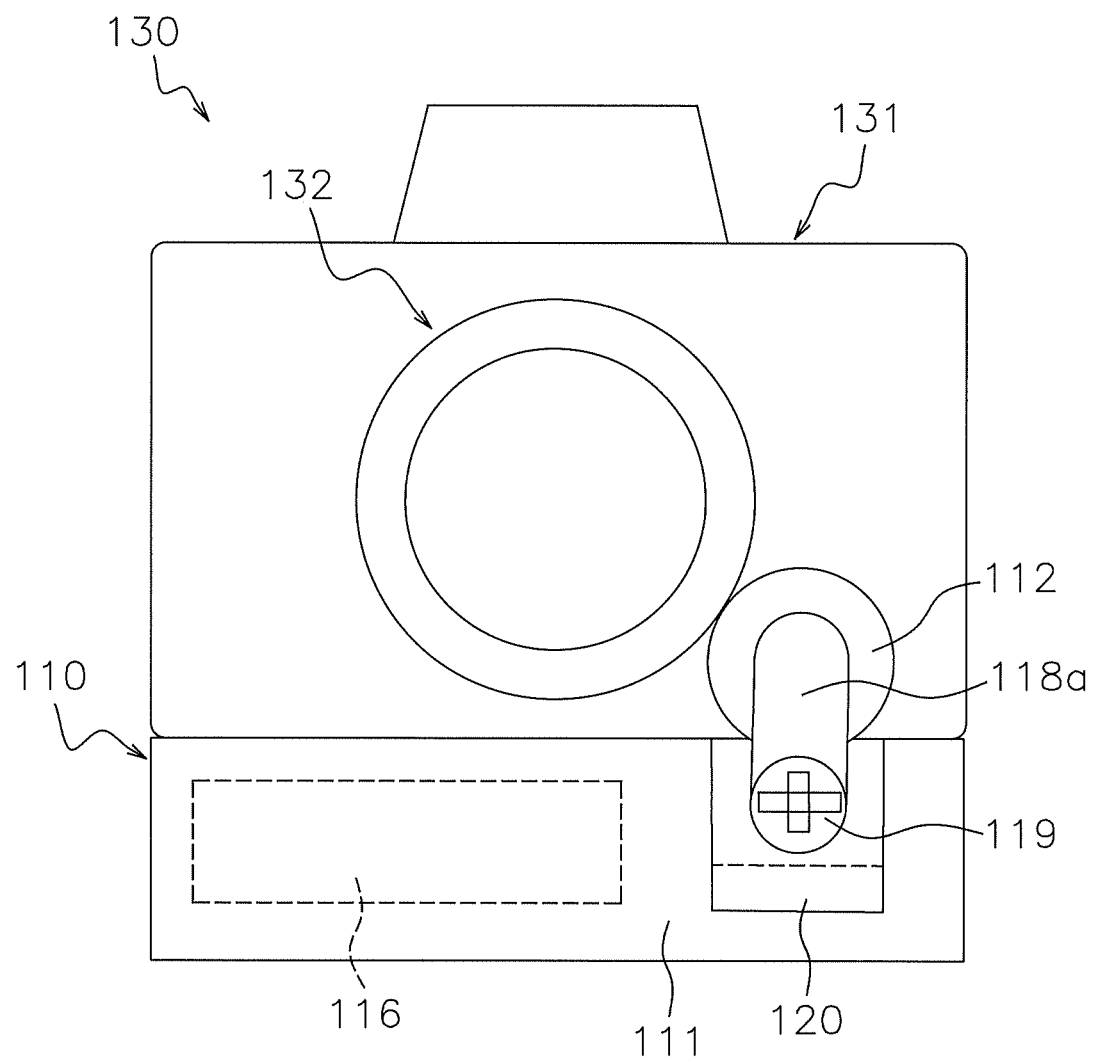
FIG. 16 is a front view showing a state in which a camera has been set on the zoom ring drive device in FIG. 15.

As shown in FIG. 16, the base part 111 is a box-shaped member constituting a foundational portion on the surface 111a of which the camera body 131 is placed, has the motor 115 and the second power supply unit 116 (discussed below) in an internal space, and accommodates the long gear 117 and the like.

The drive gear 112 is provided at a position in contact with the zoom ring 132a that changes the optical characteristics of the zoom lens included in the lens barrel 132, and rotates while in contact with the zoom ring 132a to rotate the zoom ring 132a. Also, the drive gear 112 is able to move back and forth in the optical axis direction (see the arrow in the drawing) along a support member 118 (discussed below), and is rotationally driven to rotate while positioned appropriately according to the length of the lens barrel 32, etc.

The reduction gear 113 is connected to the rotation shaft of the motor 115 and transmits the rotational drive force of the motor 115 to the drive gear 112.

Figure 17:
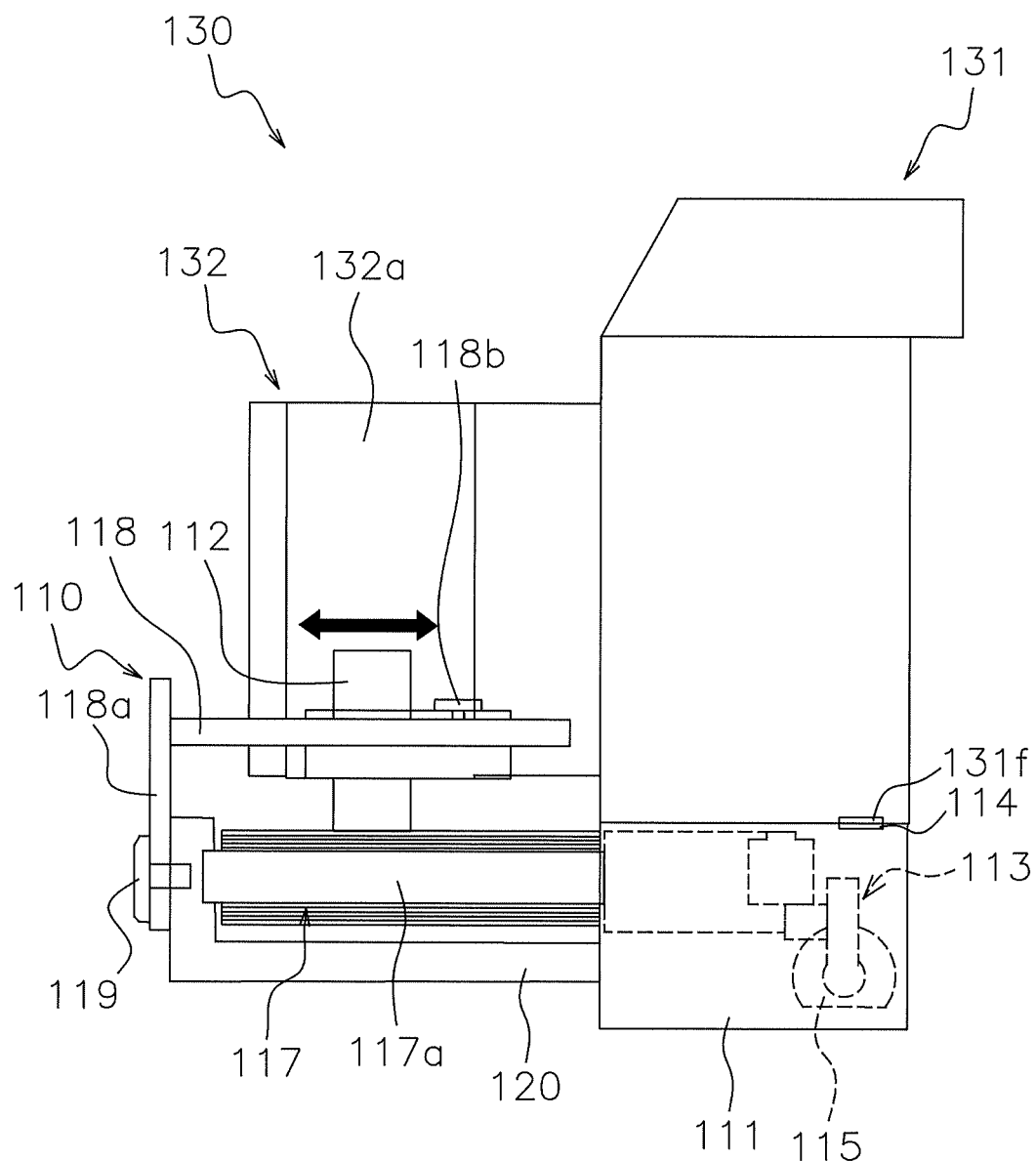
FIG. 17 is a side view of FIG. 15.

As shown in FIG. 17, the contact terminal 114 is provided on the surface 111a of the base part 111, and makes contact with the contact terminal 131f on the camera body 131 side to establish an electrical connection between the camera body 131 and the zoom ring drive device 10.

Consequently, for example, power is supplied from the camera body 131 to the zoom ring drive device 110 via the contact terminals 114 and 131f, or two-way communication is performed between the camera body 131 and the zoom ring drive device 110.

The motor (drive unit) 115 is a drive source that rotationally drives the drive gear 112 via the reduction gear 113, and is rotated by electric power supplied from the second power supply unit 116.

The second power supply unit 116 is, for example, a secondary battery that can be repeatedly charged, and is provided in the base part 111 as a power supply for the zoom ring drive device 110.

The power supplied by the second power supply unit 116 may be supplied to the camera body 131 side via the contact terminals 114 and 131f along with being supplied to the motor 115, etc., of the zoom ring drive device 110.

As shown in FIG. 17, the long gear (rotary gear) 117 is disposed such that its rotational axis runs along the optical axis direction of the lens barrel 132 in a state in which the camera 130 has been put in place on the surface 111a of the base part 111. The long gear 117 is connected to the motor 115 side at one end (first end) on the opposite side from the object in the optical axis direction, and transmits rotational drive force from the motor 115 to the drive gear 112. The long gear 117 has a gear tooth portion 117a formed on the outer peripheral surface around the rotation shaft.

The gear tooth portion 117a is an uneven portion formed on the outer peripheral surface of the long gear 117, and transmits the rotational drive force of the motor 115 to the drive gear 112 via the reduction gear 113. Also, the gear tooth portion 117a is formed to match a specific range in the optical axis direction over which the drive gear 112 can move.

The support member 118 is a rod-shaped member that supports the drive gear 112 so that the drive gear 112 can move within a specific range in the optical axis direction, and is supported from below by the holding portion 120. The support member 118 has a plate member 118a and a set screw (positioning member) 118b.

As shown in FIG. 17, the plate member 118a is a plate-like member provided at the end on the object side in the optical axis direction, and connects the support member 118 to the holding portion 120.

The set screw (positioning member) 118b is able to move in the optical axis direction along with the drive gear 112 that can move in the optical axis direction along the support member 118, and positions the drive gear 112 when threaded in at the desired position to suit the size of the lens barrel 132.

That is, the set screw 118b is provided in order to position the drive gear 112 at the position where the drive gear 112 movable along the support member 118 makes contact with the zoom ring 132a of the lens barrel 132.

The fixing member 119 is provided in order to fix the plate member 118a to the end face of the holding portion 120.

The holding portion 120 is provided so as to protrude from the base part 111 toward the object side in the optical axis direction, and supports the support member 118, etc., from below.

As discussed above, the zoom ring drive device 110 of this embodiment incorporates the motor 115, the reduction gear 113, etc., in the interior of the base part 111 on which the camera body 131 is placed.

Consequently, the zoom ring drive device 110 can be smaller in size while still allowing control of the operation of the zoom ring 132a from the outside.

Figure 18A:
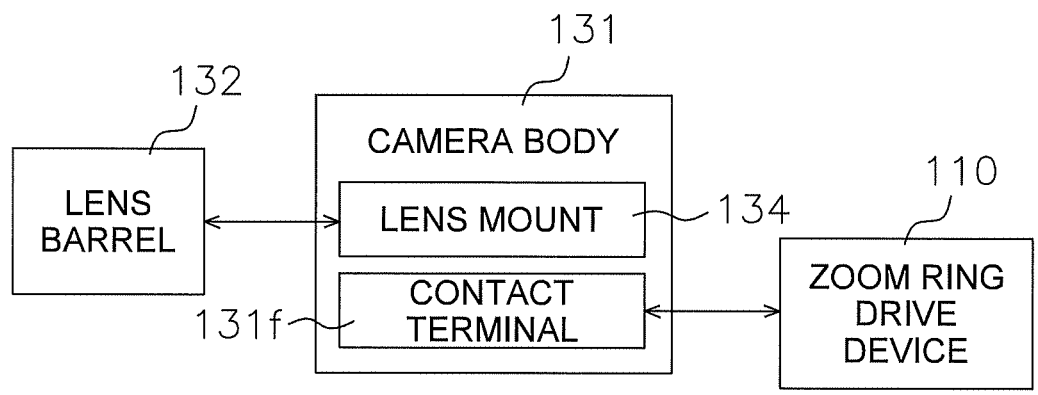
FIG. 18A is a block diagram of communication via a contact terminal between the zoom ring drive device and the camera body, and between the camera body and the lens barrel in FIG. 15, etc.

Also, with the zoom ring drive device 110 of this embodiment, two-way communication between the camera body 131 and the zoom ring drive device 110 is performed via the contact terminal 131f on the camera body 131 side, as shown in FIG. 18A.

Here, communication between the camera body 131 and the lens barrel 132 can be performed via the lens mount 134 when the lens barrel 132 has been mounted to the camera body 131 as shown in FIG. 18A. Communication between the camera body 131 and the lens barrel 132 may be performed wirelessly.

The contact terminal 131f on the camera body 131 side is provided on the bottom surface of the camera body 131, as shown in FIG. 17. The contact terminal 114 of the zoom ring drive device 110 electrically connected to the contact terminal 131f is provided on the installation surface on which the camera body 131 is installed, as shown in FIG. 17.

Consequently, when the camera 130 is placed on the zoom ring drive device 110, information about the zoom lens is transmitted from the camera body 131 side to the zoom ring drive device 110 side. If a drive error should occur while the zoom ring 132a is being rotated by the zoom ring drive device 110, information such as the drive error that occurred is transmitted from the zoom ring drive device 110 side to the camera body 131 side.

Figure 18B:
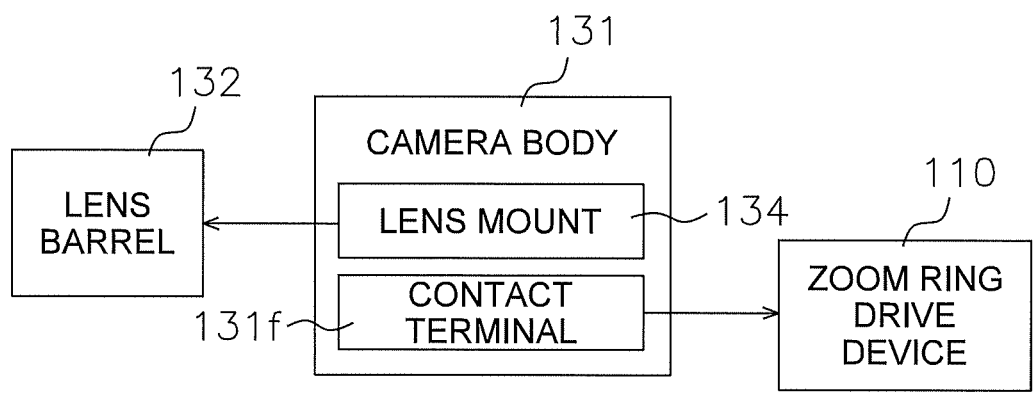
FIG. 18B is a block diagram of power supply via a contact terminal between the zoom ring drive device and the camera body, and between the camera body and the lens barrel in FIG. 1, etc.
Figure 19:
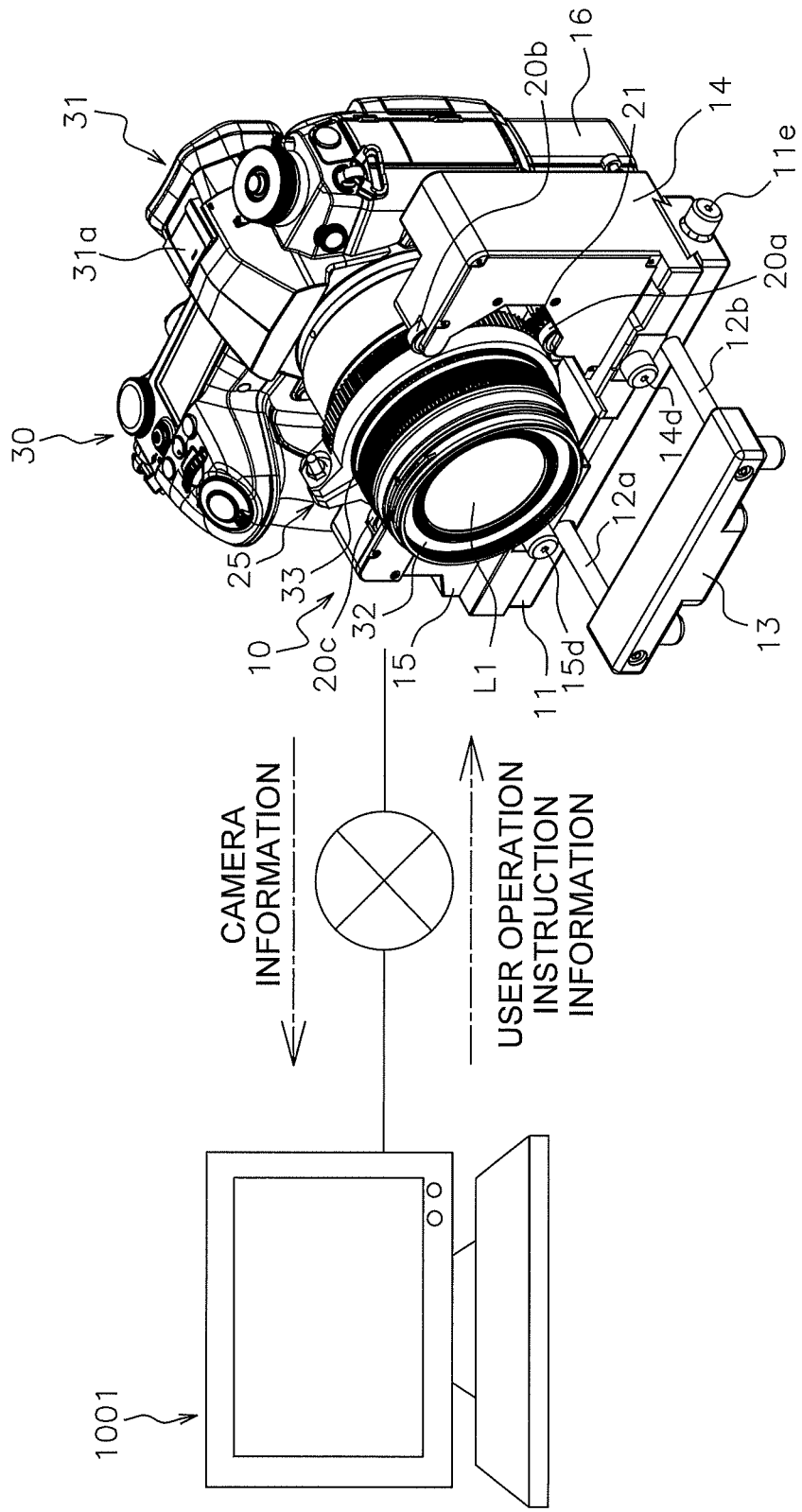
FIG. 19 is a schematic diagram illustrating remote zoom ring operation by the user according to yet another embodiment of the present disclosure.

Power is supplied from the camera body 131 to the zoom ring drive device 110 via the contact terminal 131f provided on the bottom surface of the camera body 131, as shown in FIG. 18B.

In this case, power can be supplied by attaching the camera body 131 to the zoom ring drive device 110 in a state in which the contact terminal 114 on the zoom ring drive device 110 side and the contact terminal 131f on the camera body 131 side are in contact with each other.

Power is supplied from the camera body 131 to the lens barrel 132 via the lens mount 134 when the lens barrel 132 has been mounted to the camera body 131, as shown in FIG. 18B.

Power supply between the camera body 131 and the zoom ring drive device 110 may be performed in the opposite direction from that given above. That is, when the zoom ring drive device 110 holds a power supply such as a battery as in this embodiment, it is also possible to supply power from the zoom ring drive device 110 to the camera body 131.

Consequently, power is also supplied from the zoom ring drive device 110 in addition to the battery already built into the camera body 131, so extended video recording is possible.

Main Feature 2

The zoom ring drive device 110 of this embodiment is a device for moving a zoom lens included in the lens barrel 132 mounted to the camera body 131 back and forth in the optical axis direction, and includes the drive gear 112, the motor 115, and the base part 111. The drive gear 112 is provided at a position in contact with the zoom ring 132a that changes the optical characteristics of the zoom lens included in the lens barrel 132, and rotates while in contact with the zoom ring 132a to rotate the zoom ring 132a. The motor 115 rotationally drives the drive gear 112. The base part 111 has a surface 111a to which the camera body 131 is connected and on which the motor 115 is disposed.

Since the motor 115, etc., are accommodated inside the foundational portion (base part 111) on which the camera body 131 is placed, the zoom ring drive device 110 can be made smaller in size while still rotating the zoom ring 132a from the outside.

Embodiment 3

Zoom ring remote operation performed by the user in the camera system according to an embodiment of the present disclosure will be described below with reference to FIGS. 19 to 26.

An external device 1001 such as a PC (personal computer) is connected to a LAN port within the camera body 31 via a network.

This allows the user to operate the camera 30 remotely by inputting instructions from the external device 1001.

The camera body 31 transmits information about the camera 30 and the lens barrel 32 to the external device 1001 over the network.

This information includes information about the focal length from the wide-angle end to the telephoto end of the lens barrel 32 mounted to the camera body 31, information about the current focal length, and so forth.

The information transmitted from the camera body 31 to the external device 1001 may include current setting information about the camera 30 and information about lens focus and aperture, in addition to the information discussed above. The external device 1001 can display such information to the user on a display or the like.

Meanwhile, the external device 1001 transmits operation instruction information for the zoom ring 33 to the camera body 31 over the network.

This information includes information about the target focal length position and the zoom ring rotational speed. In addition to this, setting information for the camera body 31 and setting information for the focus position and aperture value of the lens barrel 32 may be included.

In this embodiment, a wired connection using a LAN port is described, but the external device 1001 and the camera body 31 may be connected via wireless communication, such as Wifi (registered trademark) or Bluetooth (registered trademark).

The information transmitted and received between the lens barrel 32 and the camera body 31 in this embodiment will be described below with reference to FIG. 20. Those components appearing in the following description that have the same function as the components appearing in the first embodiment will be numbered the same, and will not be described again in detail.

Figure 20:
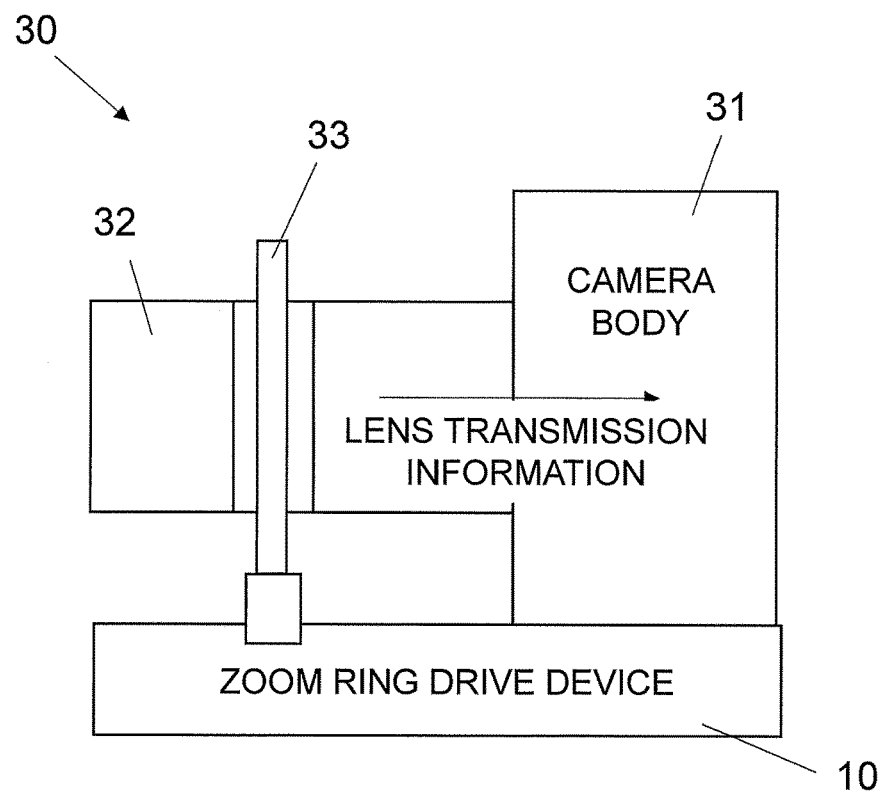
FIG. 20 is a schematic diagram showing the flow of information transmitted from the lens barrel to the camera body in the zoom ring remote control in FIG. 19.

With the interchangeable-lens camera 30, initial communication is performed at the stage when the lens barrel 32 is mounted to the camera body 31, as shown in FIG. 20.

Lens transmission information transmitted from the storage unit 32d in the lens barrel 32 to the camera body 31 in this initial communication includes focal length information (for example, wide-angle end 14 mm, telephoto end 100 mm), zoom ring angle information (for example, 75 degrees from wide-angle end to telephoto end), zoom detection position resolution information (for example, wide-angle end 0 pos, telephoto end 1500 pos), zoom ring drive torque information (for example, 50 Ncm), and the like.

The information transmitted from the lens barrel 32 to the camera body 31 may include information about focus, aperture, etc., in addition to the above information.

The first control unit 31d in the camera body 31 causes the storage unit 31c in the camera body 31 to store the information received from the lens barrel 32 via the first mechanical and electrical connection portion 35a.

Regular Communication

With the interchangeable-lens camera 30, after the above-mentioned initial communication is performed between the lens barrel 32 and the camera body 31, the lens barrel 32 and the camera body 31 continuously perform regular communication.

A second control unit 32b in the lens barrel 32 continuously acquires the position information sensed by the lens position sensor 32a.

The second control unit 32b calculates current focal length information from the sensed position information. The lens barrel 32 transmits current focal length information (such as 60 mm) and current zoom detection position information (such as 800 pos) to the camera body 31.

The information transmitted from the lens barrel 32 to the camera body 31 may include information about focus, aperture, etc., in addition to the above information.

The first control unit 31d in the camera body 31 causes the storage unit 31c in the camera body 31 to store the information received from the lens barrel 32 via the first mechanical and electrical connection portion 35a.

The information transmitted between the camera body 31 and the zoom ring drive device 10 in this embodiment will now be described with reference to FIG. 21.

Figure 21:
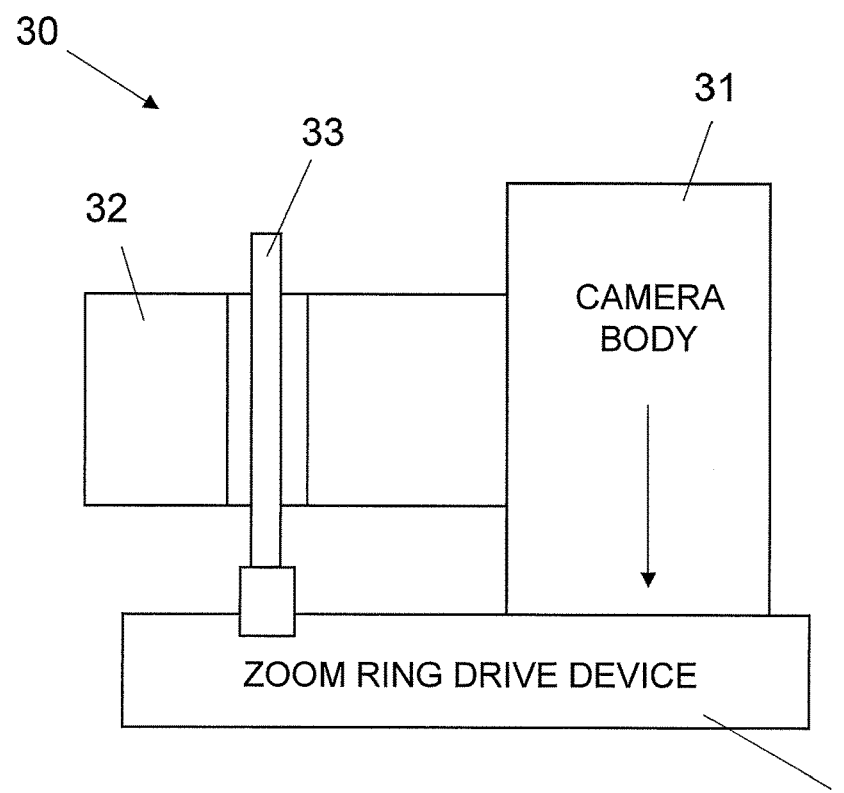
FIG. 21 is a schematic diagram showing the flow of information transmitted from the camera body to the zoom ring drive device in the zoom ring remote control in FIG. 19.

When the camera body 31 and the zoom ring drive device 10 are electrically connected, initial communication is performed as shown in FIG. 21 (see the direction of the arrow in the drawing).

The information transmitted from the storage unit 31c in the camera body 31 to the zoom ring drive device 10 in this initial communication includes zoom ring angle information (for example, 75 degrees from wide-angle end to telephoto end), zoom detection position resolution information (for example, wide-angle end 0 pos, telephoto end 1500 pos), zoom ring drive torque information (for example, 50 Ncm), and the like.

The information transmitted from the camera body 31 to the zoom ring drive device 10 may include information about focus, aperture, etc., in addition to the above information.

The third control unit 24 in the zoom ring drive device 10 causes the storage unit 28 in the zoom ring drive device 10 to store the information received from the camera body 31 via the second mechanical and electrical connection portion 35b.

Regular Communication

After the above-mentioned initial communication is performed, the camera body 31 and the zoom ring drive device 10 continuously perform regular communication.

The first control unit 31d in the camera body 31 continuously acquires information about the target focal length position and the zoom ring rotational speed from the input unit 31b in the camera body 31 that has received an operation instruction from the external device 1001.

Also, the first control unit 31d continuously acquires the current focal length information and the current zoom detection position information contained in the storage unit 31c. The first control unit 31d calculates the current zoom detection position information (for example, 800 pos), the zoom position drive target position (1500 pos), and the zoom ring drive target speed (150 pos/sec), which is information that is continuously transmitted to the zoom ring drive device 10, from this continuously acquired information. The first control unit 31d then continuously transmits this information to the zoom ring drive device 10.

The zoom ring drive device 10 receives the information transmitted from the first control unit 31d of the camera body 31 and stores it in the storage unit 28.

Figure 22:
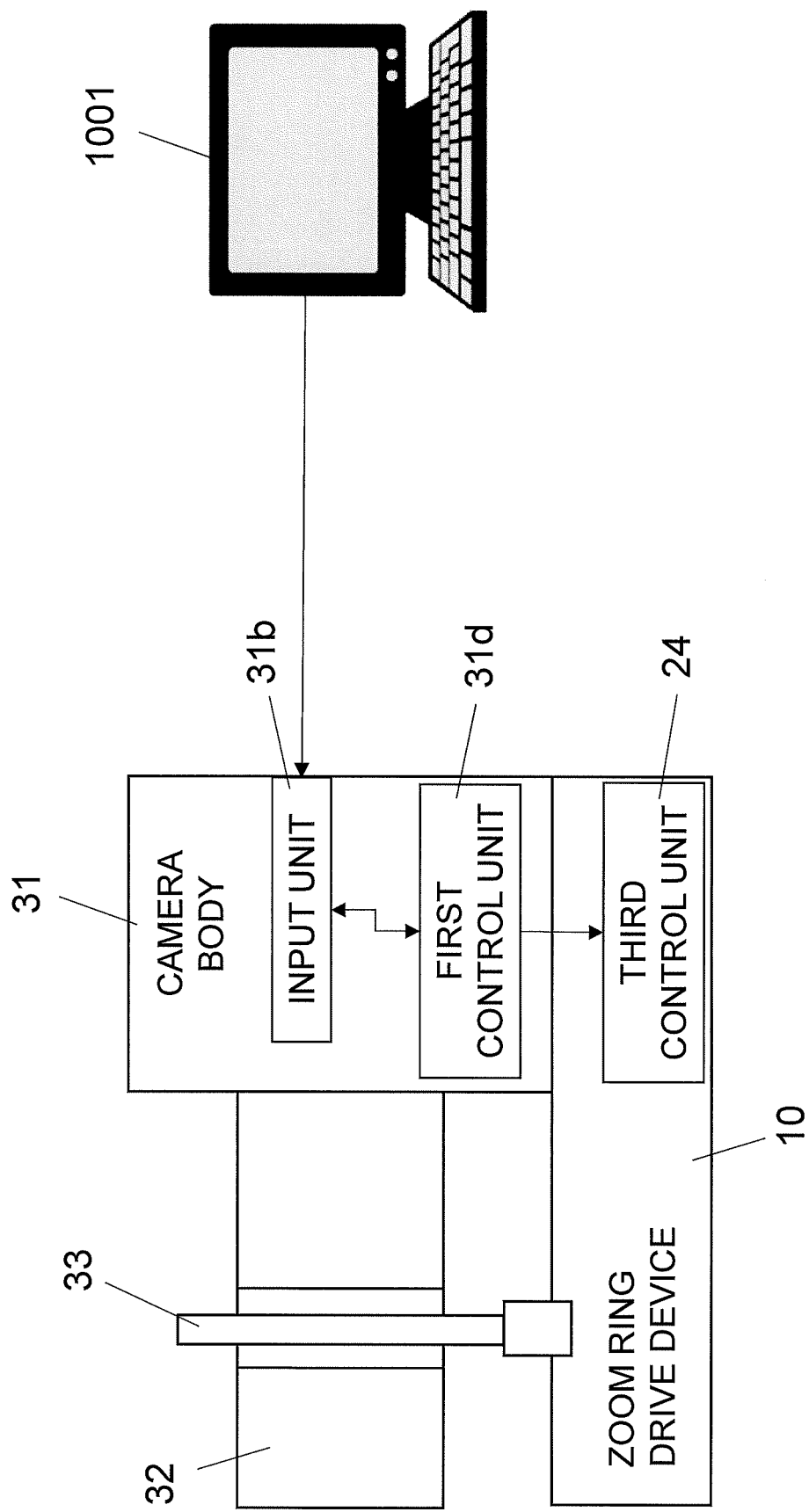
FIG. 22 is a schematic diagram showing the flow of zoom ring drive instructions from an external device to the camera body in the zoom ring remote control in FIG. 19.

In the camera system of this embodiment, the control system for instructing the zoom ring drive device 10 to operate the zoom ring via the camera body 31 from a user operation instruction will now be described with reference to FIG. 22.

(1) Control Example 1

A specific example of the calculation and transmission in this embodiment will be described with reference to FIG. 22.

The user uses the external device 1001 to set:
(a) an operation instruction for the drive target position, to drive the zoom ring 33 from the current focal length of 60 mm to the target focal length of 100 mm, and
(b) an instruction for the rotational speed of the zoom ring 33, specifying the speed at which it is driven from the wide-angle end to the telephoto end in 10 seconds,
and these instructions are transmitted to the camera body 31.

With the camera body 31, the user instruction information from the external device 1001 is received by the input unit 31b.

The first control unit 31d in the camera body 31 continuously acquires user instruction information and calculates drive control information to be transmitted to the zoom ring drive device 10.

In response to the above operation instruction, the first control unit 31d calculates a zoom position drive target value of 1500 pos from the set focal length information of 100 mm.

In this calculation, the difference in focal length (mm) from the wide-angle end to the telephoto end may be found by dividing by the total number of positions, or lens data for linking the zoom position and the focal length may be used.

The information for a target drive speed instruction is found by the first control unit 31d by calculating 150 pos/sec as the drive speed because the total number of positions moved from the wide-angle end to the telephoto end in 10 seconds is 1500.

This information is transmitted from the first control unit 31d in the camera body to the third control unit 24 in the zoom ring drive device 10. The first control unit 31d also transmits the current zoom detection position information acquired from the lens barrel 32 to the third control unit 24.

The third control unit 24 in the zoom ring drive device 10 continuously controls the voltage applied to the DC motor 23 in the zoom ring drive device 10 based on this information.

(2) Control Example 2

Another specific example of calculation and transmission in this embodiment will be described with reference to FIG. 22.

The user uses the external device 1001 to set:
(a) an operation instruction for the drive target position, to drive the zoom ring 33 from the current focal length of 100 mm to the target focal length of 18 mm, and (b) an instruction for the rotational speed of the zoom ring 33, specifying the speed at which it is driven from the wide-angle end to the telephoto end in 480 seconds, and these instructions are transmitted to the camera body 31.

With the camera body 31, the user instruction information from the external device 1001 is received by the input unit 31b.

The first control unit 31d in the camera body 31 continuously acquires user instruction information and calculates drive control information to be transmitted to the zoom ring drive device 10.

In response to the above operation instruction, a zoom position drive target value of 100 pos is calculated from the set focal length information of 18 mm. In this calculation, the difference in focal length (mm) from the wide-angle end to the telephoto end may be found by dividing by the total number of positions, or lens data for linking the zoom position and the focal length may be used.

Also, the information for a target drive speed instruction is found by the first control unit 31d by calculating 3.125 pos/sec as the drive speed because the total number of positions moved from the wide-angle end to the telephoto end in 480 seconds is 1500.

This information is transmitted from the first control unit 31d in the camera body 31 to the third control unit 24 in the zoom ring drive device 10. The first control unit 31d also transmits the current zoom detection position information acquired from the lens barrel 32 to the third control unit 24.

The third control unit 24 in the zoom ring drive device 10 continuously controls the voltage applied to the DC motor 23 in the zoom ring drive device 10 based on this information.

Next, the initial communication according to this embodiment will be described with reference to FIG. 23.

Figure 23:
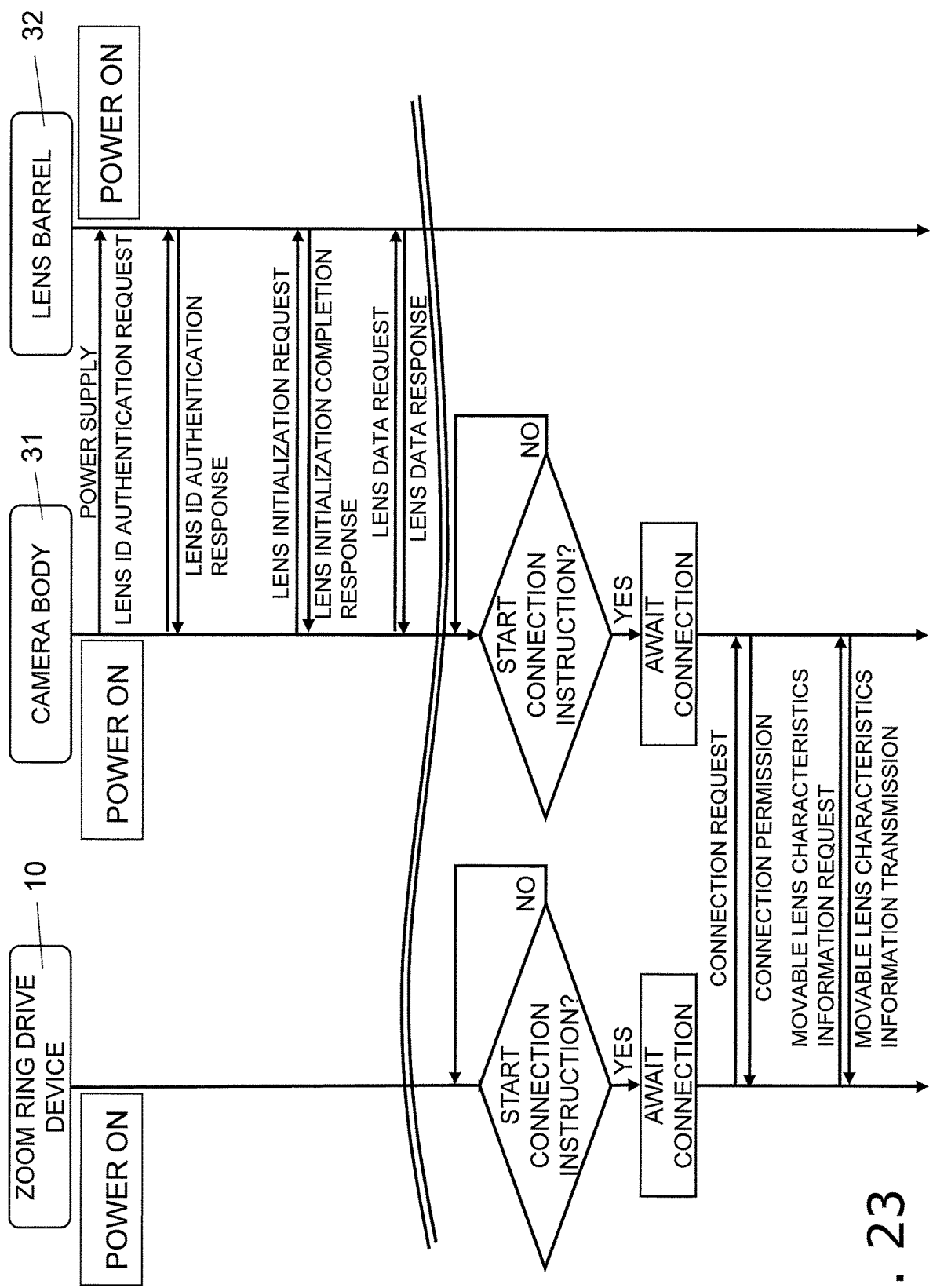
FIG. 23 is a diagram showing the flow of initial communication between the zoom ring drive device, the camera body, and the lens barrel in the zoom ring remote control in FIG. 19.

As shown in FIG. 23, the camera body 31 and the lens barrel 32 start communicating once they are electrically connected to each other after being activated (power ON).

The camera body 31 issues a lens ID authentication request to the mounted lens barrel 32, and the lens barrel 32 handles this ID authentication. After this, the camera body 31 issues a lens initialization request to the lens barrel 32, and the lens barrel 32 performs lens initialization.

After this, the camera body 31 issues a lens data request to the mounted lens barrel 32, and the lens barrel 32 handles the lens data acquisition.

After this, the camera body 31 and the zoom ring drive device 10 start connection as soon as preparations are completed for both, if they are electrically connected.

The zoom ring drive device 10 sends a request for communication connection to the camera body 31, and the camera body 31 permits communication connection. After this, the zoom ring drive device 10 issues a request for characteristic information about the movable lens, and the camera body 31 transmits the characteristic information of the movable lens.

Figure 24:
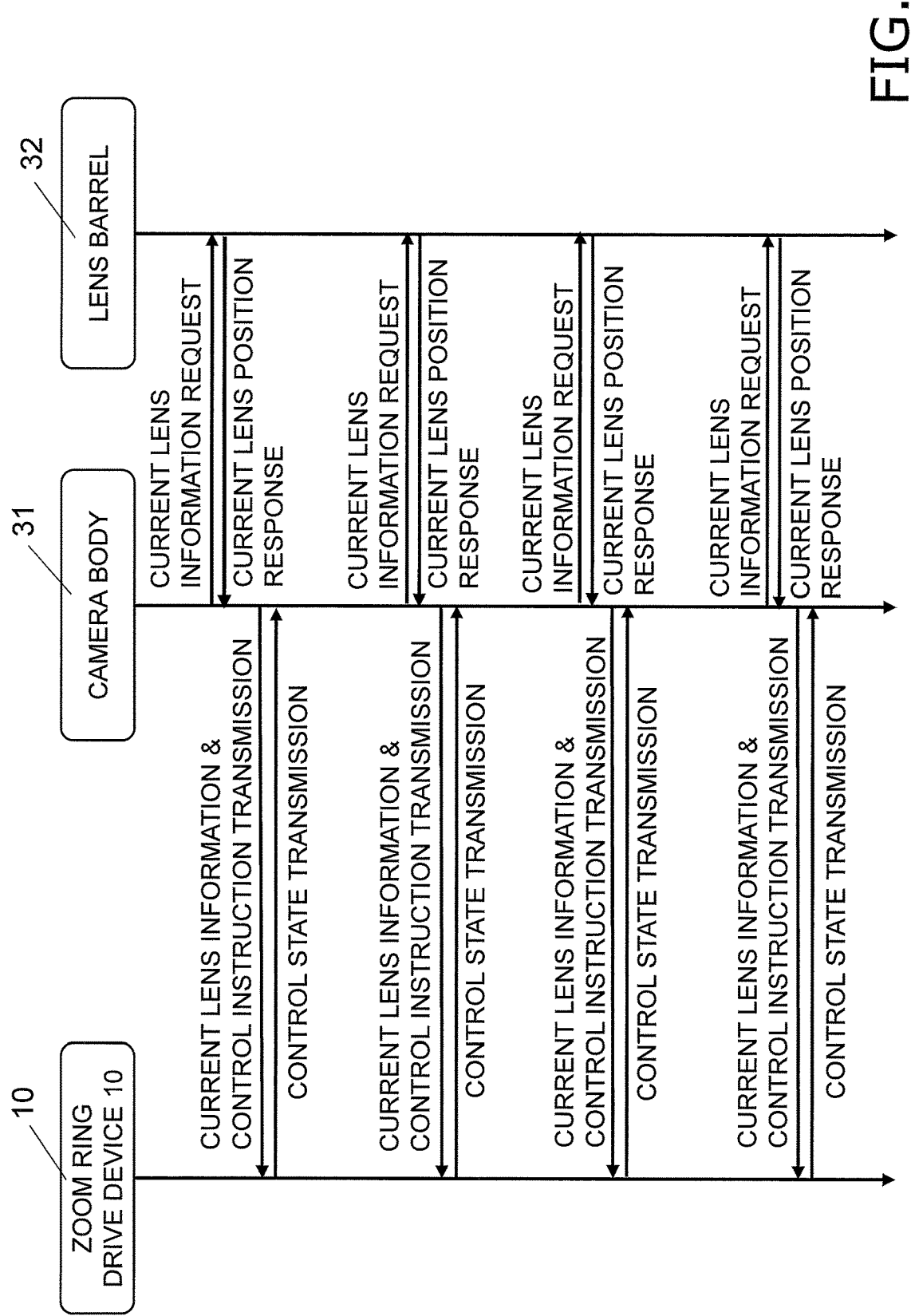
FIG. 24 is a diagram showing the flow of regular communication between the zoom ring drive device, the camera body, and the lens barrel in the zoom ring remote control in FIG. 19.

Next, the regular communication according to this embodiment will be described with reference to FIG. 24.

The camera body 31 periodically requests the lens barrel 32 to transmit the current lens information, and the lens barrel 32 transmits the current lens information to the camera body 31.

The camera body 31 periodically transmits lens current information and control instructions to the zoom ring drive device 10. The zoom ring drive device 10 periodically transmits the control state to the camera body 31.

Next, the control system in the zoom ring drive device 10 according to this embodiment will be described using FIG. 25.

Figure 25:
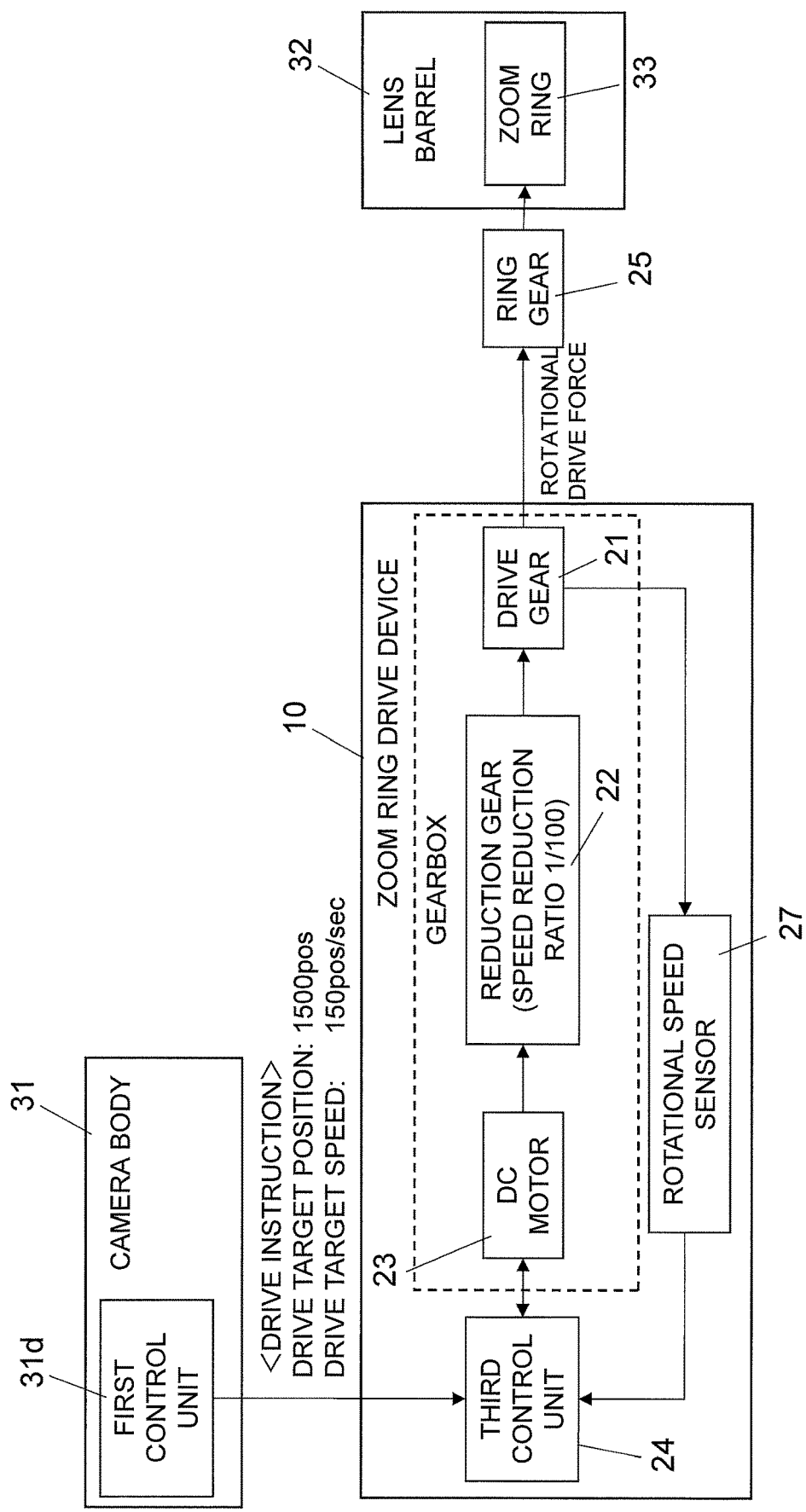
FIG. 25 is a control block diagram of the configuration of the zoom ring drive device in FIG. 19.

As shown in FIG. 25, the first control unit 31d in the camera body 31 transmits the contents of the drive instruction (drive target position and drive target speed) to the zoom ring drive device 10.

The third control unit 24 in the zoom ring drive device 10 calculates the rotational angular velocity of the zoom ring 33 on the basis of this information. Then, the DC motor rotation angular velocity in the zoom ring drive device 10 is calculated by converting the speed reduction ratio (1/100) of the reduction gear 22 included in the gearbox in the zoom ring drive device 10.

The third control unit 24 performs servo control of the DC motor 23 using information about the DC motor rotational speed sensed by the rotation sensor so as to establish the calculated DC motor rotation angular speed.

Next, the control system related to the initial voltage applied to the DC motor 23 in the zoom ring drive device 10 according to this embodiment will be described with reference to FIG. 26.

Figure 26:
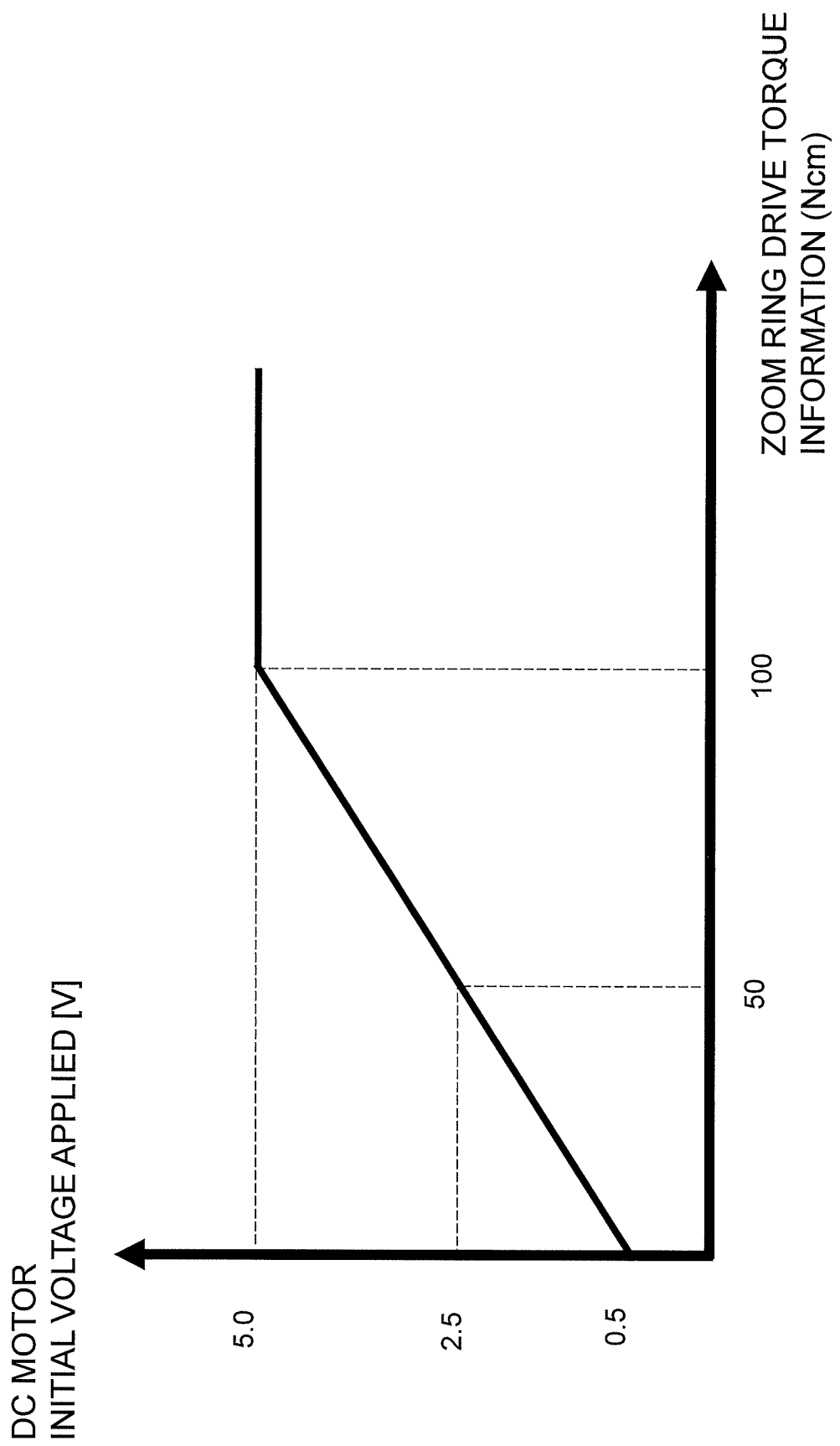
FIG. 26 is a graph of the relation between the initial voltage applied to a DC motor in the zoom ring drive device, and zoom ring drive torque information.

If the initial voltage applied to the DC motor 23 is too high, as shown in FIG. 26, the zoom ring drive torque will increase, causing the zoom ring 33 to start rotating all at once, which may adversely affect the quality of the image captured by the camera 30.

Conversely, if the initial voltage applied to the DC motor 23 is too low, the zoom ring driving torque will be too low, as shown in FIG. 26, which may mean that it will take longer for the zoom ring 33 to start rotating, which can diminish the responsiveness to user operations.

In view of this, the zoom ring drive device 10 uses the zoom ring drive torque information transmitted from the camera body 31 to the zoom ring drive device 10 to determine the initial voltage to be applied to the DC motor 23.

In this embodiment, an example was given in which, as a drive instruction from the camera body 31 to the zoom ring drive device 10, an instruction was given for the zoom position drive target position, and the drive voltage of the DC motor 23 was controlled by the second control unit 32b in the zoom ring drive device 10, but some other method may be employed for controlling the drive instruction.

For instance, information such as the reduction ratios of the DC motor 23, the drive gear 21, and the reduction gear 22 in the zoom ring drive device 10 may be transmitted from the zoom ring drive device 10 to the camera body 31 in the initial communication, and in the regular communication the camera body 31 may directly calculate the drive voltage of the DC motor 23 in the zoom ring drive device 10 and send a drive instruction to the zoom ring drive device 10.

In this embodiment, for convenience of description, it is stated that the zoom ring 33 of the lens barrel 32 is operated, but the lens operation in the present disclosure is not limited to the zoom ring 33, and an aperture ring, a focus ring, or some other manually operated ring may be operated instead.

Embodiment 4

A zoom ring drive device (manually operated ring drive device) 410 according to yet another embodiment of the present disclosure will now be described with reference to FIGS. 27 to 34.

In this embodiment, those components that are the same as the components in the embodiments given above will be numbered the same, and will not be described again in detail.

The zoom ring drive device 410 externally controls the rotation of a zoom ring 132*a* that moves a zoom lens (movable lens) included in the lens barrel 132 mounted to the camera body 131 back and forth in the optical axis direction.

The "optical axis" referred to here means the optical axis of a lens that is an optical element included in the lens barrel 132, and the "optical axis direction" means the direction running along the optical axis. The "approximate optical axis direction" means that it is roughly the same direction as the optical axis, but in actual practice, it is difficult to define this in a strict sense if the optical axis direction includes manufacturing errors and so forth, so herein, both the optical axis direction and approximate optical axis direction shall refer to a direction running roughly along the optical axis.

Also, the "rotation axis direction of the zoom ring 132*a*" referred to here means a direction running along the axis of rotation of the zoom ring 132*a*, and more or less coincides with the optical axis direction in most lens barrels 132, but the two terms are both used because there will be lens barrels 132 in which the two do not match due to manufacturing errors. Therefore, even when either "the optical axis direction" or "the rotational axis direction of the zoom ring 132*a*" is mentioned alone, it can be interchanged with the "optical axis direction of the lens barrel 132 or the rotation axial direction of the zoom ring 132*a*." Also, in actual practice, it is difficult to strictly define the rotation axis direction of the zoom ring 132*a* if manufacturing errors, etc., are included, so herein this shall be considered to be a direction running roughly along the rotation axis direction of the zoom ring 132*a*.

Normally, with an external device such as this that controls the rotation of a zoom ring of a lens barrel by rotating the zoom ring while the drive gear is in contact with the zoom ring from the outside, a problem has been that the device ends up being larger because it includes members such as a housing that accommodates a motor or another such electromagnetic drive source.

Figure 27:
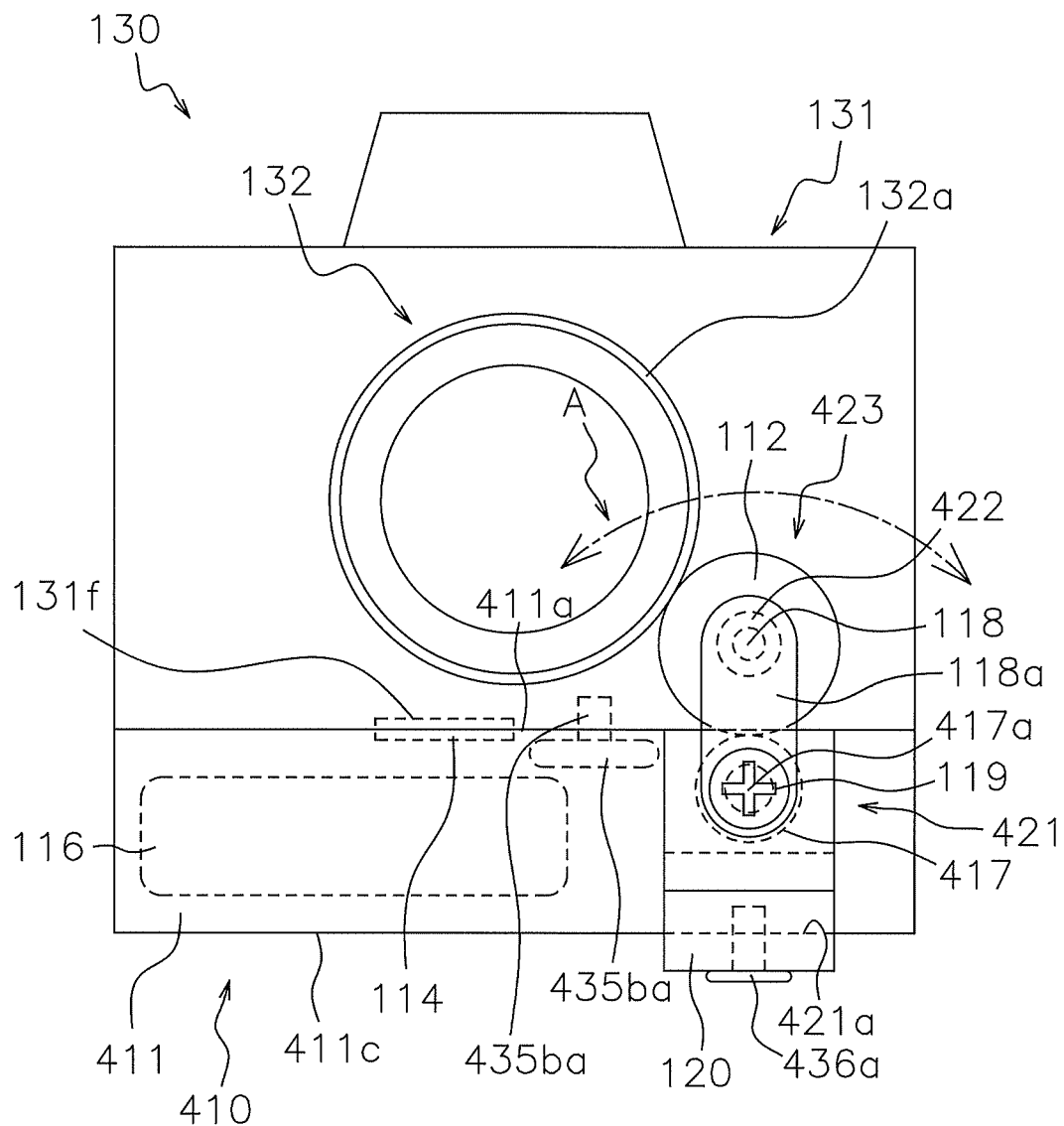
FIG. 27 is a front view of the configuration of the zoom ring drive device according to yet another embodiment of the present disclosure.
Figure 28:
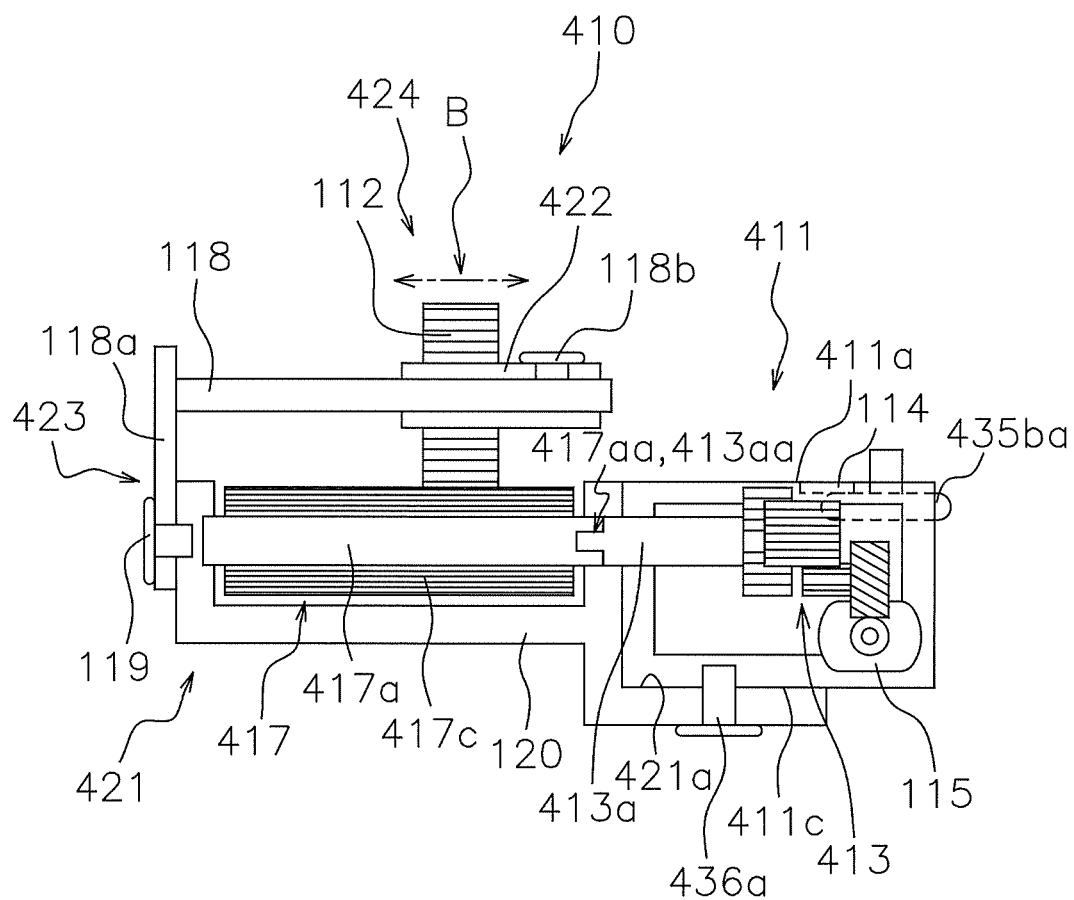
FIG. 28 is a cross-sectional view showing a cross section including the axis of the rotary gear of the zoom ring drive device in FIG. 27.

The zoom ring drive device 410 according to this embodiment includes a base part 411 and a lateral part 421, as shown in FIGS. 27 and 28.

The camera body 131 is formed as a three-dimensional structure made up of a plurality of surfaces, and has a front surface (first surface) to which the lens barrel 132 is connected, and a bottom surface (second surface) to which the base part 411 (discussed below) is connected. The front surface (first surface) to which the lens barrel 132 is connected and the bottom surface (second surface) to which the base part 411 is connected are adjacent to each other.

Here, the first surface is defined as the front surface, but the term "front surface" is used only for the purpose of description, and will vary depending on the position where this surface is disposed and the viewing direction, and the first surface need not be the front surface, and may instead be the rear surface, back or the side surface. Here, the surface to which the lens barrel 132 is connected is termed the front surface simply for the sake of description. Similarly, "bottom surface" is also a term of convenience and may instead be termed the front, back, or side surface. Here, the surface adjacent to the surface to which the lens barrel 132 is connected is termed the bottom surface simply for the sake of description.

Figure 32:
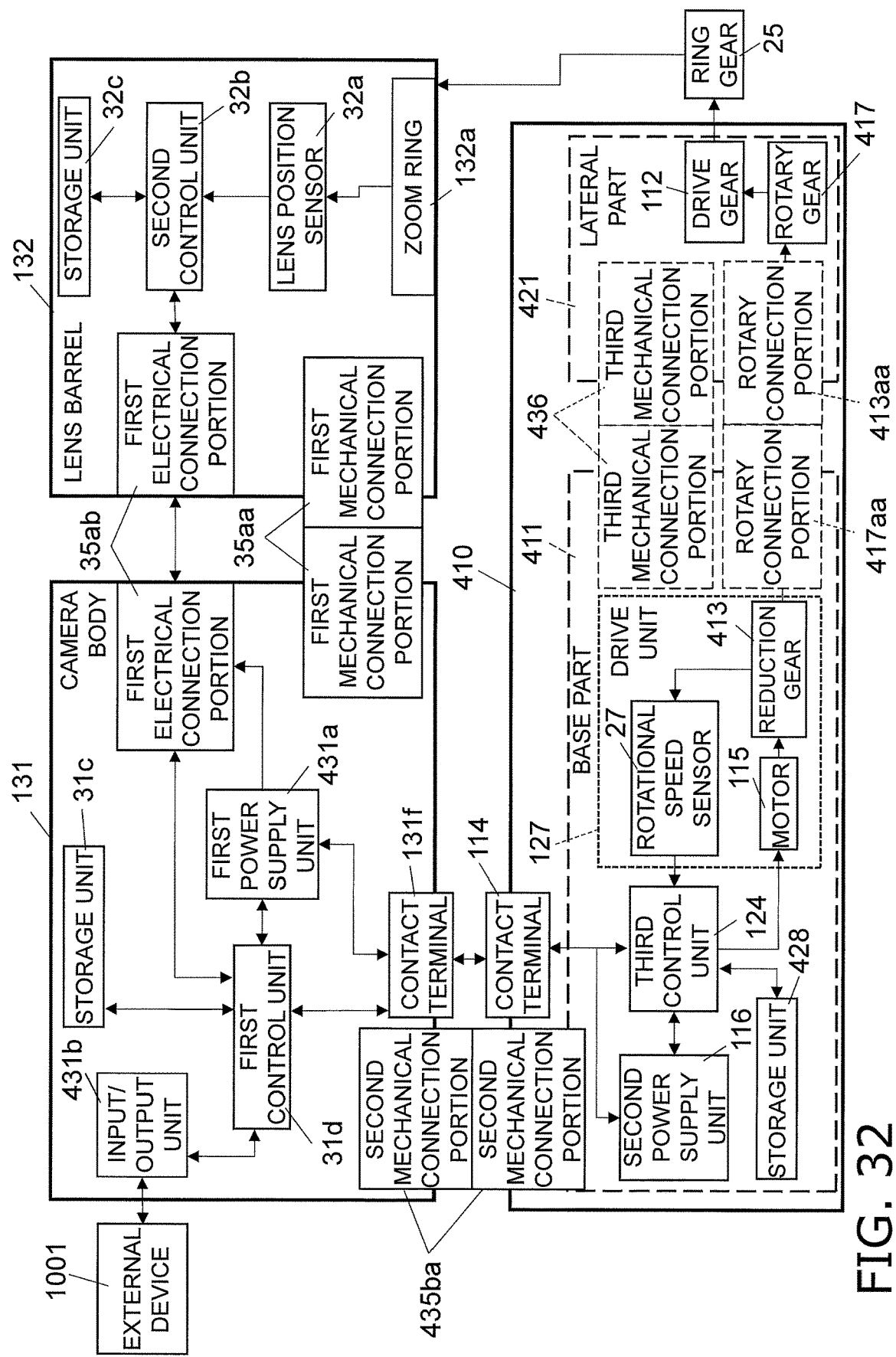
FIG. 32 is a control block diagram of the configuration of the zoom ring drive device in FIG. 27.

A first mechanical connection portion 35*aa* and a first electrical connection portion 35*ab*, which are detachable from the lens barrel 132, are provided on the front surface of the camera body 131 (see FIG. 32). A second mechanical connection portion 435*ba* and a second electrical connection portion 35*bb*, which are detachable from the base part 411, are provided on the bottom surface of the camera body 131 (see FIG. 32).

A screw hole (second mechanical connection portion 435*ba*), into which is threaded a fixing screw (second mechanical connection portion 435*ba*) provided to the upper surface 411*a* of the base part 411 (discussed below), is provided in the bottom surface (second surface) of the camera body 131, and these two components (the fixing screw and the screw hole) serve as the components of the second mechanical connection portion 435*ba*.

A contact terminal 131*f* (second electrical connection portion), to which is connected a contact terminal 114 (second electrical connection portion) provided on the upper surface 411*a* (third surface) of a base part 411 (discussed below), is provided to the bottom surface (second surface) of the camera body 131, and these two components (the contact terminal 114 and the contact terminal 131*f*) serve as the second electrical connection portion.

As shown in FIG. 32, the base part 411 includes a drive unit 127, a third control unit 124, a third storage unit 428, a second power supply unit 116 (second power supply unit), a fixing screw (second mechanical connection portion 435*ba*), and a contact terminal 114 (second electrical connection portion).

The drive unit 127 includes the motor 115 (an electromagnetic drive source), a reduction gear 413, a rotational speed sensor 27, and rotary connection portions 417*aa* and 413*aa*, and generates a rotational drive force for rotating the zoom ring 132*a*.

FIG. 27 shows a first adjustment A made by a first adjustment unit 423 (adjustment unit; discussed below), and FIG. 28 shows a second adjustment B made by a second adjustment unit 424 (adjustment unit).

The first adjustment made by the first adjustment unit 423 (adjustment unit) and the second adjustment made by the second adjustment unit 424 (adjustment unit) (discussed below) are performed in a state in which the motor 115, the rotational speed sensor 27, the third control unit 124, the third storage unit 428, the second power supply unit 116 (second power supply unit), and other such electrical members that require electrical connection have been fixed to the base part 411 or the camera body 131. In other words, in the first adjustment and the second adjustment (discussed below), the electrical members requiring electrical connection do not change their relative positions with respect to the base part 411 or the camera body 131.

As shown in FIGS. 27 and 28, the motor 115 is a rotary drive source that generates rotation to drive (that is, rotationally drives) a rotary gear 417 on the lateral part 421 side (discussed below) via a reduction gear 413. The motor 115 is rotated by electric power supplied from the second power supply unit 116 (second power supply unit) or the battery of the camera body 131 (first power supply unit 431*a*).

As shown in FIGS. 27 and 28, the reduction gear 413 has a plurality of gears including a gear connected to the rotation shaft of the motor 115, and a rotary connection portion 413*aa* constituted by the distal end of the rotation shaft of the gear at the final stage of the plurality of gears (in other words, at one end of the zoom ring 132*a* on the object side in the rotation axis direction). The reduction gear 413 increases the rotational drive force of the motor 115 by speed reduction through gears, and transmits this force to the rotary gear 417 via a rotary connection portion 417*aa* on the lateral part 421 side and a rotary connection portion 413*aa* on the base part 411 side (discussed below). Since the rotary gear 417 transmits the rotational drive force to the drive gear 112 (discussed below), this means that the rotational drive force of the motor 115 is transmitted to the drive gear 112. That is, the motor 115 generates rotational drive force for driving the drive gear 112.

The rotational speed sensor 27 senses the rotational speed of the motor 115 by sensing the rotational speed of the gear of the reduction gear 413, and feeds this back to the third control unit 124.

The third control unit 124 controls the drive unit 127 on the basis of a control signal from the first control unit 31d of the camera body 131, which is communicated with the camera body 131 via the contact terminal 114 (second electrical connection unit). The third control unit 124 controls the rotational position and rotational speed of the motor 115 on the basis of the rotational speed sensed by the rotational speed sensor 27.

The third storage unit 428 stores parameters used by the third control unit 124 to control the motor 115.

The second power supply unit 116 (second power supply unit) is, for example, a secondary battery that can be repeatedly charged, and as shown in FIG. 27, is provided to the base part 411 as a power supply for the zoom ring drive device 410.

The power supplied by the second power supply unit 116 is supplied to the motor 115, etc., of the zoom ring drive device 410, and may also be supplied to the camera body 131 side via the contact terminal 114 and the contact terminal 131f (discussed below).

The rotary connection portions 417aa and 413aa transmit the drive force produced by the motor 115 from the final gear closest to the rotary gear 417, which is disposed on the rearmost side among the gears of the reduction gear 413 disposed in the base part 411, to the rotary gear 417 of the lateral part 421 (discussed below).

Figure 29:
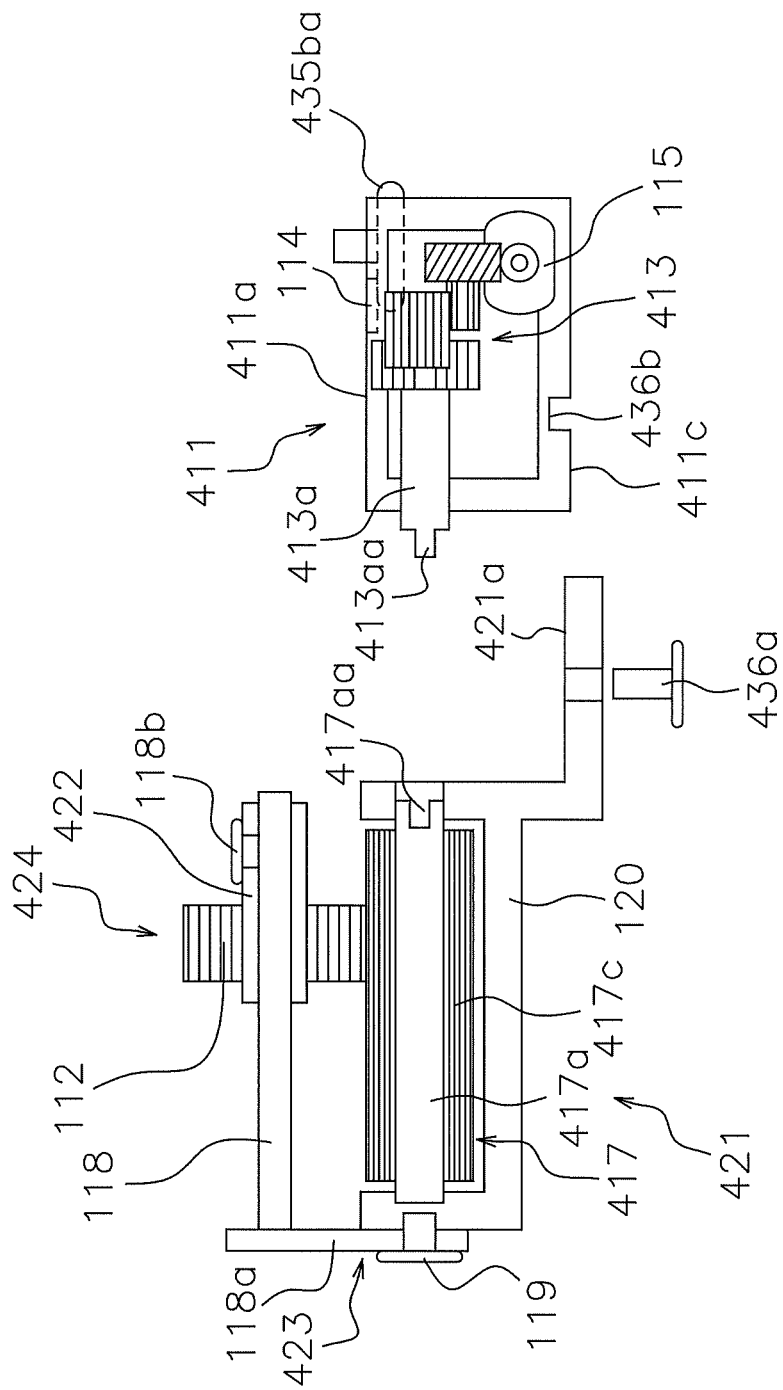
FIG. 29 is a cross-sectional view showing a state in which the zoom ring drive device in FIG. 28 has been split.

As shown in FIG. 29, the rotary connection portions 417aa and 413aa include a rotary connection portion 413aa disposed on the base part 411 side and a rotary connection portion 417aa disposed on the lateral part 421 side (discussed below).

As shown in FIG. 29, the rotary connection portions 417aa and 413aa detachably connect the base part 411 and the lateral part 421, which means that the transmission of rotational drive force can also be disconnected between these two, allowing drive force to be transmitted even when the two are disconnected.

As shown in FIG. 29, at the portion that transmits the rotational drive force from the base part 411 to the lateral part 421, the rotary connection portion 413aa and the rotary connection portion 417aa are respectively disposed at the end closest to the lateral part 421 side of the shaft 413a of the reduction final gear, which is disposed on the rearmost side of the reduction gear 413, and the end closest to the base part 411 side of the shaft 417a of the rotary gear 417. The rotation shaft of the reduction gear 413 and the rotation shaft of the rotary gear 417 are detachably connected by the rotary connection portions 413aa and 417aa, and in a state in which the rotary connection portions 413aa and 417aa are connected, rotation is transmitted and drive force can also be transmitted.

More specifically, the rotary connection portion 413aa on the base part 411 side has a negative (−) shape when viewed in the axial direction or from the front surface of the shaft 413a at the distal end of the rotation shaft 413a of the final stage of the reduction gear 413, that is, the shaft 413a of the speed reduction final gear, or in other words, at one end of the zoom ring 132a on the object side in the rotation axis direction. Also, the rotary connection portion 413aa has a convex shape when viewed from the side surface of the shaft 413a or in a direction substantially perpendicular to the shaft 413a.

Meanwhile, the rotary connection portion 417aa on the lateral part 421 side has a negative (−) shape when viewed in the direction of the shaft 417a or from the front surface of the shaft 417a at shaft 417a rotating at the very front, that is, the distal end of the shaft 417a of the rotary gear 417 (discussed below), or in other words, the end (first end) on the opposite side of the zoom ring 132a from the object in the rotational axis direction. The rotary connection portion 417aa has a concave shape when viewed from the side surface of the shaft 417a or in a direction substantially perpendicular to the shaft 417a.

The convex shape of the rotary connection portion 413aa on the base part 411 side and the concave shape of the rotary connection portion 417aa on the lateral part 421 side are shapes that do not catch in the axial direction, that is, shapes that do not have any undercut. Consequently, the rotary connection portion 413aa and the rotary connection portion 417aa are detachably connected to each other in the axial direction.

Also, the convex shape of the rotary connection portion 413aa on the base part 411 side and the concave shape of the rotary connection portion 417aa on the lateral part 421 side are shapes that do have a catch in the rotation direction of the shaft, that is, shapes that have an undercut. Consequently, the rotary connection portion 413aa and the connection portion 417aa can be connected in a state in which the rotational force can be transmitted in the rotational direction of the shaft.

The shape of the rotary connection portions 413aa and 417aa may instead be a positive (+) shape, rather than a negative (−) shape, when viewed from the front of the shaft 413a or the shaft 417a. Here again, the rotary connection portions 413aa and 417aa are such that the convex shape of the rotary connection portion 413aa on the base part 411 side and the concave shape of the rotary connection portion 417aa on the lateral part 421 side can be detachably connected, so the shaft 413a of the reduction final gear and the shaft 417a of the rotary gear 417 can be detachably connected to each other in a state in which the rotational drive force can be transmitted.

Also, the shape of the rotary connection portions 413aa and 417aa may be a shape having a surface forming an angle with the circumferential direction centered on the connected shafts, rather than a negative (−) shape when viewed from the front of the shaft. Here again, the rotary connection portions 413aa and 417aa are such that the convex shape of the rotary connection portion 413aa on the base part 411 side and the concave shape of the rotary connection portion 417aa on the lateral part 421 side can be detachably connected. Consequently, the shaft 413a of the reduction final gear and the shaft 417a of the rotary gear 417 are detachably connected to each other in a state in which the rotational drive force can be transmitted.

Also, the shape of the rotary connection portions 413aa and 417aa may be a shape having a surface that does not include a circle centered on the shafts to be connected, rather than a negative (−) shape when viewed from the front of the shaft. Here again, the rotary connection portions 413aa and 417aa are such that the convex shape of the rotary connection portion 413aa on the base part 411 side and the concave shape of the rotary connection portion 417aa on the lateral part 421 side can be detachably connected, so the shaft 413a of the reduction final gear and the shaft 417a of the rotary gear 417 are detachably connected to each other in a state in which the rotational drive force can be transmitted.

Also, the rotary connection portions 413aa and 417aa may be configured such that the final gear at the very last stage of the reduction gear 413 on the base part 411 side, the foremost gear at the very front on the lateral part 421 side (discussed below), and, for example, the rotary gear 417 (discussed below) are directly connected. Here again, the rotary connection portions 413aa and 417aa are detachably connected to each other in a state in which the rotational drive force can be transmitted.

Figure 30:
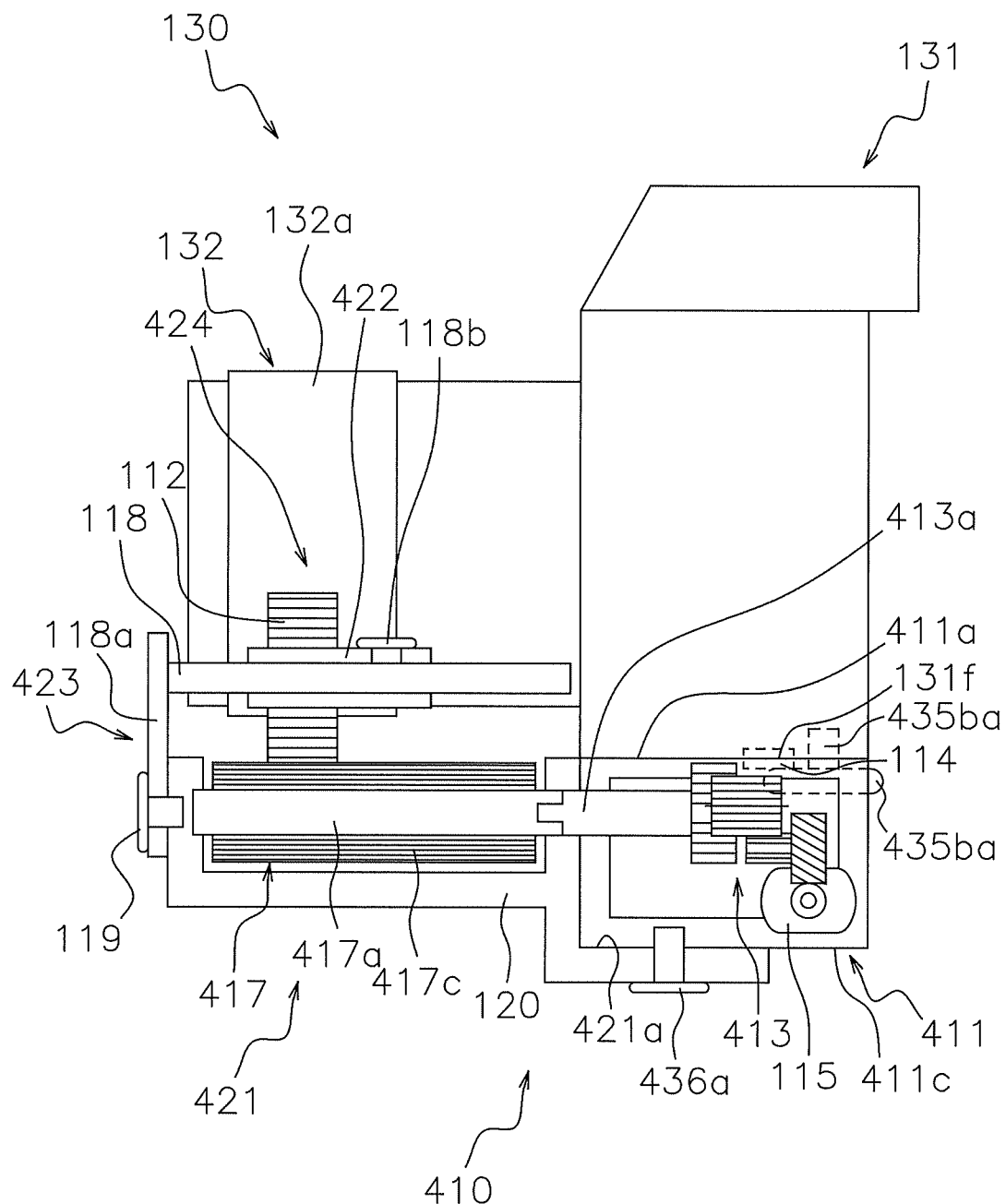
FIG. 30 is a cross-sectional view showing a cross section including the axis of the rotary gear when the camera has been set on the zoom ring drive device in FIG. 27.

As shown in FIG. 30, the base part 411 is a box-shaped member constituted by a plurality of surfaces including the upper surface 411a to which the camera body 131 is connected, and has in its internal space the motor 115, the reduction gear 413, and the second power supply unit 116 (second power supply unit (see FIG. 27)).

The base part 411 is formed as a three-dimensional structure made up of a plurality of surfaces, and has the upper surface 411a (third surface) to which the camera body 131 is connected and a rear surface 411c (fourth surface) to which the lateral part 421 (discussed below) is connected.

The upper surface 411a (third surface) includes a second mechanical connection portion 435ba that can be detached from the camera body 131, and a contact terminal 114 serving as a second electrical connection portion.

A third mechanical connection portion 436 that detachably connects the lateral part 421 and the base part 411 to each other is provided on the rear surface 411c (fourth surface).

The base part 411 is connected such that its position relative to the camera body 131 is substantially fixed by threading a fixing screw, which constitutes the second mechanical connection portion 435ba provided on the upper surface 411a (third surface) of the camera body 131, into a screw hole constituting the second mechanical connection portion 435ba provided on the bottom surface of the camera body 131.

The third surface here is termed the upper surface, but "upper surface" is used only for the sake of description, and the expression will vary depending on the position where the surface is disposed and the viewing direction, and may be the lower surface, a side, or the front surface instead of the upper surface. Here, the surface connected to the camera body 131 is termed the upper surface simply for the sake of description. Also, although the fourth surface is referred to as the rear surface, but this is also a term of convenience and may instead be termed the side surface, rear surface, upper surface, or bottom surface. Here, the surface to which the lateral part 421 is connected is termed the rear surface simply for the sake of description.

The camera body 131 may be mounted to a surface (such as a side surface) adjacent to the surface of the camera body 131 to which the lens barrel 132 is mounted, rather than being mounted to the upper surface 411a of the base part 411.

The contact terminal 114 (second electrical connection portion), which allows for electrical connection with the camera body 131, is provided to the base part 411, in substantially the same plane as the upper surface 411a (third surface) on which the fixing screw (second mechanical connection portion 435ba) is provided.

The base part 411 is fixed to the camera body 131 once the fixing screw (second mechanical connection portion 435ba) is screwed into the screw hole (second mechanical connection portion 435ba). As a result, the lateral part 421 (discussed below) and the zoom ring drive device 410 are also fixed with respect to the camera body 131, and the contact terminal 114 and the contact terminal 131f on the camera body 131 side are in a connected state.

The contact terminal 114 makes contact with the contact terminal 131f on the camera body 131 side, thereby establishing an electrical connection between the camera body 131 and the zoom ring drive device 410.

Consequently, power is supplied from the battery (first power supply unit 431a) of the camera body 131 to the zoom ring drive device 410 via the contact terminals 114 and 131f, for example. Alternatively, power is supplied from the second power supply unit 116 (second power supply unit) of the base part 411 to the camera body 131 side. Alternatively, two-way communication of information is performed between the first control unit 31d of the camera body 131 and the third control unit 124 of the zoom ring drive device 410 so as to enable mutual control.

The base part 411 is detachably connected to the lateral part 421 as shown in FIG. 29. The base part 411 includes the rear surface 411c (fourth surface) that connects the lateral part 421.

A screw hole 436b constituting the third mechanical connection portion 436 is provided in the rear surface 411c. The rear surface 411c connecting the lateral part 421 is a surface that is substantially parallel to the upper surface 411a (third surface) connecting the camera body 131.

The rear surface 411c of the base part 411 to which the lateral part 421 is connected need not be a surface that is substantially parallel to the upper surface 411a (third surface) to which the camera body 131 is connected, and may instead be a surface that is substantially parallel to the surface (first surface) to which the lens barrel 132 is connected, for example. Here again, the lateral part 421 is disposed to the side of the lens barrel 132 by being connected to the base part 411.

As shown in FIG. 30, the lateral part 421 is disposed to the side of the lens barrel 132 and in a state of extending from the base part 411 side to the object side in the rotation axis direction of the zoom ring 132a, that is, in the optical axis direction of the lenses that are the optical elements included in the lens barrel 132, and is detachably connected to the base part 411.

Figure 31:
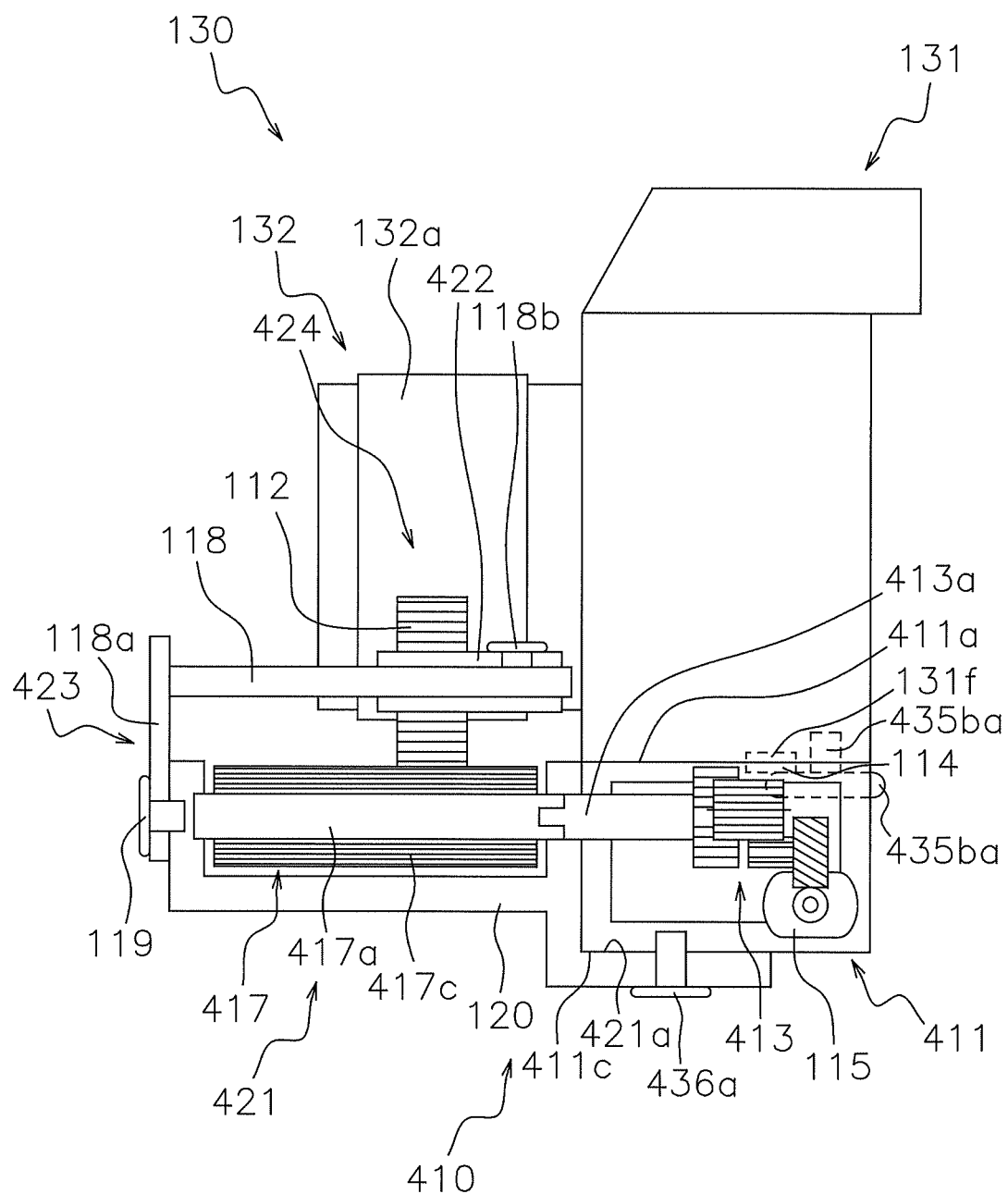
FIG. 31 is a cross-sectional view showing a cross-unit including the axis of the rotary gear in a state in which a camera to which a short lens barrel has been mounted is set in the zoom ring drive device in FIG. 30.

As shown in FIGS. 28, 30, and 31, the lateral part 421 allows the position of the drive gear 112 to be moved back and forth in the optical axis direction by adjustment with an adjustment unit (discussed below), and so can be compatible with lens barrels 132 having different positions or lengths of the zoom ring 132a in the optical axis direction.

As shown in FIG. 31, when a lens barrel 132 in which the position of the zoom ring 132a is on the opposite side from the object in the optical axis direction as compared to the state of FIG. 30 is mounted to the camera body 131, or when a lens barrel 132 having a shorter length than in FIG. 30 is mounted to the camera body 131, the guide member 422 is moved along the support member 118 to the opposite side from the object by the second adjustment unit 424. This allows the drive gear 112 rotatably held by the guide member 422 to be moved to the opposite side from the object in the axial direction of the support member 118. As a result, the position of the drive gear 112 can be adjusted to a position that is substantially opposite the zoom ring 132a, that is, where the drive gear 112 can directly or indirectly make contact with the zoom ring 132a.

Although not depicted in the drawings, when a lens barrel 132 in which the zoom ring 132a is positioned closer to the object in the optical axis direction than in the state shown in FIG. 30 is mounted to the camera body 131, or when a lens barrel 132 that is longer than in FIG. 30 is mounted to the camera body 131, the guide member 422 is moved along the support member 118 to the object side by the second adjustment unit 424. This allows the drive gear 112 rotatably held by the guide member 422 to be moved in the axial direction to the object side of the support member 118. As a result, the position of the drive gear 112 can be adjusted to a position that is substantially opposite the zoom ring 132a, that is, where the drive gear 112 can directly or indirectly make contact with the zoom ring 132a.

As shown in FIG. 27, the lateral part 421 is such that the position of the drive gear 112 can be moved in a direction substantially perpendicular to the optical axis by adjustment with an adjustment unit (discussed below), and so can be compatible with lens barrels 132 having different positions or outside diameters of the zoom ring 132a in a direction substantially perpendicular to the optical axis direction.

That is, as shown in FIGS. 33A1, 33A2, 33B1, 33B2, 33C1, and 33C2, the lateral part 421 can be compatible even when a camera 130 is installed in which a number of different types of lens barrel 132 having different outside diameters may be mounted to the camera body 131, by moving the drive gear 112 in a direction substantially perpendicular to the optical axis.

As shown in FIGS. 33B1 and 33B2, when a lens barrel 132 having a zoom ring 132a with a larger outside diameter than that shown in FIG. 33A1 is mounted on the camera body 131, the first adjustment unit 423 rotates the plate member (interaxial fixing portion) 118a, to which the support member 118 is fixed, around the rotational axis of the rotary gear 417 clockwise when the camera is viewed from the object side in the optical axis direction, that is, the clockwise direction in FIG. 33B2, or in a direction away from the optical axis. This allows the drive gear 112, which is rotatably attached to the guide member 422 with the support member 118 as the center of rotation, to be moved within a plane substantially perpendicular to the rotation axis of the zoom ring 132a and in a direction away from the optical axis or the rotational axis of the zoom ring 132a. As a result, the position of the drive gear 112 can be adjusted to a position that is substantially opposite the zoom ring 132a having a larger outside diameter, that is, where the drive gear 112 can directly or indirectly make contact with the zoom ring 132a.

As shown in FIGS. 33C1 and 33C2, when a lens barrel 132 having a zoom ring 132a with a smaller outside diameter than that shown in FIG. 33A1 is mounted to the camera body 131, the first adjustment unit 423 rotates the plate member (interaxial fixing portion) 118a, to which the support member 118 is fixed, around the rotational axis of the rotary gear 417 counter-clockwise when the camera is viewed from the object side in the optical axis direction, that is, the counter-clockwise direction in FIG. 33C2, or in a direction toward the optical axis. This allows the drive gear 112, which is rotatably attached to the guide member 422 with the support member 118 as the center of rotation, to be moved within a plane substantially perpendicular to the rotation axis of the zoom ring 132a and in a direction toward the optical axis or the rotational axis of the zoom ring 132a. As a result, the position of the drive gear 112 can be adjusted to a position that is substantially opposite the zoom ring 132a having a smaller outside diameter, that is, where the drive gear 112 can directly or indirectly make contact with the zoom ring 132a.

Figure 34:
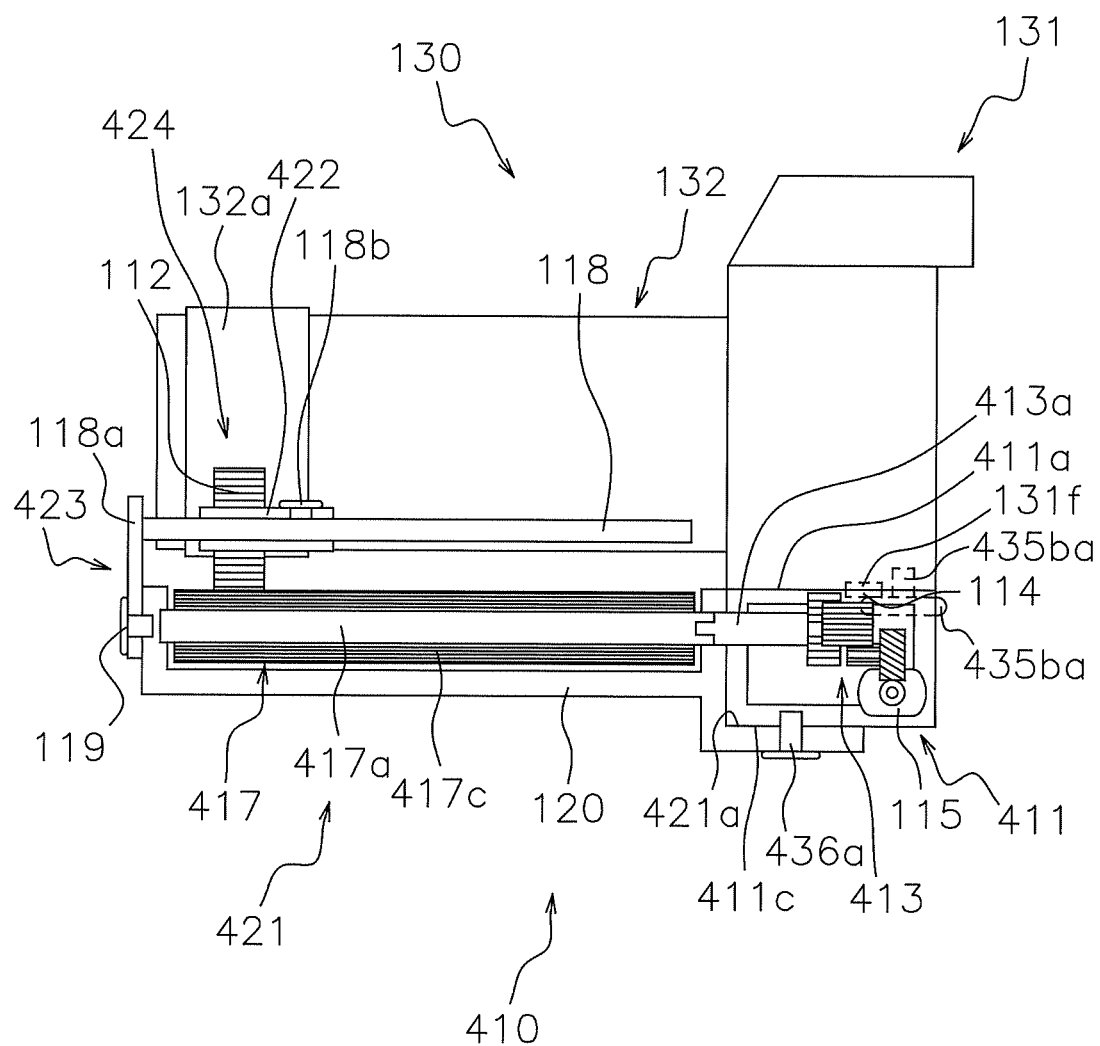
FIG. 34 is a cross-sectional view showing a cross section including the axis of the rotary gear in a type in which the side portion in the optical axis direction is longer than the side portion shown in FIG. 28.

The lateral part 421 can be compatible with many different kinds of lens barrel 132 by preparing a number of types having lengths in the optical axis direction different from that shown in FIGS. 28, 30, and 31. More specifically, as shown in FIG. 34, if a type having a longer length in the optical axis direction is prepared, it is possible to be compatible with a longer lens barrel 132 than using a single type of lateral part 421. The types of lateral part 421 having different lengths in the optical axis direction, that is, the lateral part 421 in FIG. 30 and the lateral part 421 in FIG. 34, have rotary gears 417 (discussed below), support members 118, and holding portions 120 whose lengths in the optical axis direction are different. The type of lateral part 421 having a longer length in the optical axis direction (FIG. 34) has a rotary gear 417, a support member 118, and a holding portion 120 whose lengths in the optical axis direction are longer than those of the type of lateral part 421 having a shorter length in the optical axis direction (FIGS. 30 and 31).

Although not depicted in the drawings, when types of lateral part 421 having different lengths in the optical axis direction are prepared, if a type with a shorter length is used, it can be compatible with a shorter lens barrel 132 compatible than using one type of lateral part 421. A type of lateral part 421 having a shorter length in the optical axis direction will have a rotary gear 417, a support member 118, and a holding portion 120 whose lengths in the optical axis direction are shorter than a type of lateral part 421 having a longer length in the optical axis direction.

The lateral part 421, by itself, has an adjustment unit that allows the position of the drive gear 112 to be changed with respect to the zoom ring 132a so that the drive gear 112 will engage or mesh with the zoom ring 132a at a plurality of positions in the rotational axis direction of the zoom ring 132a, or a plurality of outside diameters or lengths, as will be discussed below.

Here, it makes no sense for just one type of lateral part 421 to have to be compatible with lens barrels 132 of a plurality of sizes. For example, let us assume that there are four types of lens barrel 132 with total lengths of 300 mm, 200 mm, 100 mm, and 50 mm. If we try to make a single type of lateral part 421 compatible all four of these types of lens barrel 132, the lateral part 421 would have to be approximately 300 mm in length. This would mean that this lateral part 421 having a length of about 300 mm is used even when driving the zoom ring 132a of a 50-mm lens, so the zoom ring drive device 410 ends up being unnecessarily large, which is inconvenient when photographing or carrying the camera.

If we try to make two types of lateral part 421 compatible with the four types of lens barrels 132, we will need one lateral part 421 having a length of approximately 300 mm and one having a length of approximately 100 mm. Consequently, when driving the zoom rings 132a of the 300-mm and 200-mm lenses, the lateral part 421 having a length of about 300 mm can be used, and when driving the zoom rings 132a of the 100-mm and 50-mm lenses, the lateral part 421 having a length of about 100 mm can be used. Therefore, the zoom ring drive device 410 does not end up being unnecessarily large, which is more convenient when photographing or carrying the camera.

Thus, even if two types of lateral part 421 are required, since the lateral part 421 is detachably connected to the base part 411, just one type of base part 411 is needed. That is, two types of lateral part 421 can be used as needed for a single type of base part 411. The lateral part 421 on the base part 411 can be interchanged while the camera body 131 and the base part 411 are still connected, or after the base part 411 has been separated from the camera body 131.

In addition, in order to be compatible with more types of lens barrel 132, a plurality of lateral parts 421 of different lengths in the optical axis direction were prepared here, but this is not the only option.

The lateral part 421 can be made compatible with many different types of lens barrel 132 by preparing a plurality of types of lateral part 421, such as a plurality of types having different movement ranges of the drive gear 112 (discussed below) in a direction substantially perpendicular to the optical axis direction of the lateral part 421. Lateral parts 421 having different ranges of movement of the drive gear 112 in a direction substantially perpendicular to the optical axis direction will have different outside diameters or numbers of teeth of the rotary gear 417 or the drive gear 112 (discussed below). Or, the lengths from the bearing portion of the drive gear 112 of the plate member 118a to the mounting position of the support member 118 will be different.

The lateral part 421 includes the drive gear 112, the rotary gear 417, the support member 118, the plate member (interaxial fixing portion) 118a, the second set screw (axial positioning portion) 118b, a screw as the fixing member 119 (rotation direction positioning portion), the holding portion 120, the guide member 422, the rotary connection portions 417aa and 413aa, the first adjustment unit 423, the second adjustment unit 424, and the third mechanical connection portion 436.

The lateral part 421 has a surface 421a (fifth surface) to which the base part 411 is connected. The lateral part 421 is disposed to the side of the lens barrel 132 when connected to the base part 411.

The third mechanical connection portion 436 that allows the base part 411 and the lateral part 421 to be mounted and detached is provided to the surface 421a.

A fixing screw 436a (third mechanical connection portion 436) that is threaded into a screw hole 436b (third mechanical connection portion 436) provided on the rear surface 411c (fourth surface) of the base part 411 is provided on the surface 421a (fifth surface) of the lateral part 421.

As shown in FIGS. 28 and 29, the lateral part 421 is fixed such that its position relative to the base part 411 is fixed when the fixing screw 436a (third mechanical connection portion 436) provided on the surface 421a (fifth surface) is threaded into the screw hole 436b (third mechanical connection portion 436) provided on the rear surface 411c (fourth surface) of the base part 411. As a result, the lateral part 421 is connected such that its position relative to the camera body 131 and the lens barrel 132 is substantially fixed.

The lateral part 421 transmits to the zoom ring 132a the rotational drive force from the drive unit 127 on the base part 411 side. The rotational drive force of the motor 115 of the drive unit 127 disposed inside the base part 411 is transmitted via the reduction gear 413 to the rotary gear 417 disposed inside the lateral part 421, and is further transmitted via the drive gear 112 disposed inside the lateral part 421 to the zoom ring 132a disposed on the lens barrel 132.

The drive gear 112 has a rotation axis in the direction of the rotation axis of the zoom ring 132a, that is, in the optical axis direction of the lenses that are optical elements included in the lens barrel 132, and as shown in FIG. 27, is disposed in the lateral part 421 in a state of being rotatable around the rotation axis of the rotary gear 417 (see the one-dot chain line arrow A in the drawing) and also fixed, as a first adjustment (discussed below). The drive gear 112 receives the rotational drive force transmitted from the rotary gear 417 and directly or indirectly makes contact with the zoom ring 132a to transmit the rotational drive force.

The drive gear 112 is provided at a position that directly or indirectly makes contact with the zoom ring 132a that changes the focal length, which is one of the optical characteristics of the zoom lens included in the lens barrel 132. The drive gear 112 rotates while in contact with the zoom ring 132a, and thereby rotates the zoom ring 132a.

Instead of making direct contact with the zoom ring 132a, the drive gear 112 may be brought into contact with the ring gear 25 (see FIG. 9A, etc., described in the above embodiment) engaged with the zoom ring 132a to rotate the zoom ring 132a while in indirect contact via the ring gear 25.

Also, as shown in FIG. 28, as a second adjustment (discussed below), the drive gear 112 is rotationally driven in a state of being able to move back and forth in the optical axis direction along the support member 118 (see the solid line arrow B in the drawing), and as shown in FIGS. 30 and 31, of being positioned at an appropriate position according to the length of the lens barrel 132, etc.

The drive gear 112 is rotatably held by the guide member 422 disposed so as to be movable and fixable along the axis of the support member 118 substantially parallel to the rotation axis direction of the zoom ring 132a or to the optical axis direction. Consequently, the drive gear 112 is guided back and forth substantially in the optical axis direction of the lens barrel 132 or substantially in the rotation axis direction of the zoom ring 132a.

The drive gear 112 is a component constituting the first adjustment unit 423, and during the adjustment, its position in a direction substantially perpendicular to the rotation axis of the zoom ring 132a or in a direction substantially perpendicular to the optical axis moves by rotating around an axis substantially parallel to the rotation axis of the zoom ring 132a or an axis substantially parallel to the optical axis.

More specifically, the first adjustment unit 423 rotates the support member 118 around the axis of the rotary gear 417 to move the position of the drive gear 112 in a direction substantially perpendicular to the rotation axis of the zoom ring 132a or in a direction substantially perpendicular to the optical axis. The result of the first adjustment by the first adjustment unit 423 is that the drive gear 112 rotates around the axis of the rotary gear 417 in a plane substantially perpendicular to the rotation axis of the zoom ring 132a, as indicated by the arrow A shown in FIG. 27.

As shown in FIG. 30, etc., the rotary gear 417 is disposed in the lateral part 421 in a state in which its position relative to the camera body 131 or the base part 411 is fixed, and in a state of being substantially parallel to the rotation axis direction of the zoom ring 132a of the lens barrel 132, or a direction substantially parallel to the optical axis of the lenses that are optical elements included in the drive gear 112, or the rotation axis direction of the drive gear 112, with the camera 130 in place on the upper surface 411a of the base part 411.

One end of the rotary gear 417 on the object side in the optical axis direction is rotatably held by a bearing portion having a surface curved in an L shape on the distal end side of the holding portion 120 (discussed below), that is, on the object side. The other end (first end) of the rotary gear 417 on the opposite side from the object is also rotatably held by a bearing portion having a surface curved in an L shape, on the base part 411 side of the holding portion 120, that is, on the opposite side from the object.

The shaft 417a of the rotary gear 417 has a rotary connection portion 417aa on the lateral part 421 side, which has a negative shape when viewed from the front of the shaft

417*a* and is concave when viewed from the side surface of the shaft 417*a*, at the end (first end) of the zoom ring 132*a* on the opposite side from the object in the rotation axis direction.

The shaft 417*a* of the rotary gear 417 is detachably connected to the shaft 413*a* of the reduction final gear inside the base part 411 via the rotary connection portion 417*aa* on the lateral part 421 side and the rotary connection portion 413*aa* on the base part 411 side detachably connected thereto. Consequently, even though the base part 411 and the lateral part 421 are detachable, the rotational drive force from the motor 115 can be transmitted.

The rotary gear 417 transmits to the drive gear 112 the rotational drive force from the motor 115 serving as a drive source transmitted through the reduction gear 413.

The rotary gear 417 has a gear tooth portion 417*c* formed on the outer peripheral surface centered on the rotating shaft 417*a*.

The tooth width of the gear tooth portion 417*c* of the rotary gear 417, that is, the tooth length in the trace direction, is adjusted by the second adjustment performed by the second adjustment unit 424 (discussed below) to be equal to the amount of axial movement of the drive gear 112 required for the second adjustment, or to be a specific amount longer than this, so that the teeth of the drive gear 112 and the rotary gear 417 will not be disengaged. In other words, the rotary gear 417 has a gear tooth portion 417*c* that can mesh over a specific length in the rotation axis direction, that is, in an axial direction substantially parallel to the rotation axis of the zoom ring 132*a*, or in the optical axis direction.

The first adjustment made by the first adjustment unit 423 and the second adjustment made by the second adjustment unit 424 (discussed below) are performed in a state in which the rotary gear 417 is fixed to the base part 411 or the camera body 131. In other words, the position of the rotary gear 417 relative to the base part 411 or the camera body 131 does not change in the first adjustment and the second adjustment.

The gear tooth portion 417*c* is a concave-convex gear tooth portion formed on the outer peripheral surface of the rotary gear 417, and transmits to the drive gear 112 the rotational drive force of the motor 115 transmitted through the reduction gear 413. Also, the gear tooth portion 417*c* is formed such that the tooth width or tooth surface is longer in the tooth trace direction over a specific range substantially in the optical axis direction, so that the teeth can always mesh with each other even if the drive gear 112 moves substantially in the rotation axis direction of the zoom ring 132*a*, that is, substantially in the optical axis direction, due to the second adjustment made by the second adjustment unit 424.

The support member 118 is a rod-shaped member that rotatably supports the drive gear 112 as the rotation axis of the drive gear 112 over a specific length in the axial direction in a state in which the drive gear 112 is able to move within a specific range substantially in the optical axis direction. The support member 118 is supported from below by the holding portion 120. The support member 118 has the plate member 118*a* and the set screw (positioning member) 118*b*.

The support member 118 is fixed to the plate member (shaft fixing portion) 118*a* (discussed below), and is a component of the first adjustment unit 423 (discussed below). The support member 118 rotates the plate member 118*a* around the rotation axis of the rotary gear 417 (the arrow A in FIG. 27) when the first adjustment is made by the first adjustment unit 423 (discussed below). Consequently, the support member 118 can rotate around the rotation axis of the rotary gear 417 and can move in a direction substantially perpendicular to the rotation axis of the zoom ring 132*a*. As a result, as shown in FIG. 27, the position of the drive gear 112 attached rotatably around the support member 118 can be moved in a direction substantially perpendicular to the rotation axis of the zoom ring 132*a*. In other words, the first adjustment made by the first adjustment unit 423 causes the drive gear 112 to rotate around the rotary gear 417 in a plane substantially perpendicular to the rotation axis of the zoom ring 132*a*, along the arrow A shown in FIG. 27.

The support member 118 is one of the components of the second adjustment unit 424 (discussed below), and has a specific length in the optical axis direction. Consequently, when the second adjustment (discussed below) is performed, the guide member 422 is moved along the axis of the support member 118 extending in the optical axis direction (the arrow B in FIG. 28). This allows the guide member 422 to move in the rotational axis direction of the zoom ring 132*a* or in the optical axis direction. As a result, the position of the drive gear 112 attached rotatably with respect to the guide member 422 with the center of the support member 118 as the rotation axis, can be moved in the rotation axis direction of the zoom ring 132*a* or in the optical axis direction. In other words, the second adjustment made by the second adjustment unit 424 causes the drive gear 112 to move along the arrow B shown in FIG. 28, along the support member 118 substantially parallel to the rotation axis of the zoom ring 132*a*.

As shown in FIG. 28, etc., the plate member 118*a* is a plate-shaped member provided at the end of the lateral part 421 on the object side in the optical axis direction, and is fixed at the first end by the fixing member 119 to the holding portion 120. The support member 118 is attached to the second end side of the plate member 118*a*. The plate member 118*a* is one of the components of the first adjustment unit 423 (discussed below), and during the first adjustment made by the first adjustment unit 423, the plate member 118*a* is able to rotate around the rotation axis of the rotary gear 417, in a direction perpendicular to the optical axis direction. After completion of the first adjustment, the plate member 118*a* is fixed by the fixing member 119 (rotation direction positioning portion) disposed substantially coaxially with the rotation axis of the rotary gear 417.

The second set screw (axial direction positioning portion) 118*b* is provided to the guide member 422 (discussed below), is one of components of the second adjustment unit 424 (discussed below), and moves in the optical axis direction together with the guide member 422 that is movable along the central axis of the support member 118. The second set screw 118*b* fixes the guide member 422 to the side surface of the shaft of the support member 118. The second set screw 118*b* has a screw mechanism that is loosened during the second adjustment and tightened after the second adjustment is completed.

The tightening of the second set screw 118*b* is performed after the guide member 422 is moved to a position where the drive gear 112 and the zoom ring 132*a* come into contact, as the second adjustment. After the drive gear 112 is adjusted to a position where the drive gear 112 makes contact with the zoom ring 132*a* when viewed from the side of the rotation axis of the zoom ring 132*a* or in a direction substantially perpendicular to the rotation axis, the second set screw 118*b* is tightened so that the guide member 422 is fixed relative to support member 118. The drive gear 112 is held by the guide member 422 in a state of being rotatable around the axis of the support member 118 substantially parallel to the optical axis. The drive gear 112 is held by the guide member 422 in a state of being substantially fixed in the axial direction of the support member 118 or in the optical axis direction. Consequently, when the guide member 422 is fixed with respect to the support member 118, the drive gear 112 whose axial direction is substantially fixed by the guide member 422 is also substantially fixed in the axial direction in a state of being rotatable with respect to the support member 118.

That is, the set screw 118b is provided in order to position the drive gear 112 at a position where the drive gear 112, which is movable along the support member 118, makes contact with the zoom ring 132a of the lens barrel 132.

The fixing member 119 (rotational direction positioning portion) is provided on a substantially extended line of the rotational center axis of the rotary gear 417. The fixing member 119 is one of the components of the first adjustment unit (discussed below), and fixes the plate member (interaxial fixing portion) 118a, which is rotatable around the rotation axis of the rotary gear 417, with respect to the end face of the holding portion 120. The fixing member 119 has a screw mechanism, which is loosened during the first adjustment (discussed below) and tightened after the first adjustment is completed. The tightening of the fixing member 119 is performed as the first adjustment after the plate member 118a is rotated to the position where the drive gear 112 and the zoom ring 132a make contact. After the drive gear 112 is adjusted to a position where the drive gear 112 makes contact with the zoom ring 132a when viewed from the front of the rotation axis of the zoom ring 132a or in the direction of the rotation axis, the fixing member 119 is tightened so that the plate member (interaxial fixing portion) 118a is fixed with respect to the holding portion 120.

The holding portion 120 is one of the components of the lateral part 421 disposed substantially parallel to the rotation axis of the zoom ring 132a to the side of the lens barrel 132, and protrudes from the base part 411 toward the object side in the optical axis direction. The approximate distal end portion on the object side of the holding portion 120 and the approximate rear end portion on the opposite side from the object side are bent, and are provided with a shape having a surface substantially perpendicular to the optical axis. The holding portion 120 supports the rotary gear 417, the plate member 118a, the support member 118, the fixing member 119, etc., from below. The curved surfaces of the approximate front end portion on the object side of the holding portion 120 and the approximate rear end portion on the opposite side from the object side each have a bearing portion that rotationally holds the rotary gear 417.

The holding portion 120 has a surface 421a (fifth surface) that connects the base part 411 and is connected to the base part 411. Consequently, the lateral part 421 is disposed to the side of the lens barrel 132. The surface 421a is provided with a third mechanical connection portion 436 that detachably connects the lateral part 421 and the base part 411.

The shape of the holding portion 120 does not necessarily have to be an L shape. The holding portion 120 may have any shape so long as it has the surface 421a that connects the base part 411 with the bearing portion rotationally holding the rotary gear 417, and has a function of allowing the plate member 118a to be fixed with respect to the fixing member 119. Rather than being a single part, the holding portion 120 may have a structure that achieves the same function as described above by combining a plurality of parts.

As shown in FIG. 29, the surface 421a (fifth surface) of the lateral part 421 is provided with a fixing screw 436a (third mechanical connection portion 436) that is threaded into a screw hole 436b (third mechanical connection portion 436) provided in the rear surface 411c (fourth surface) of the base part 411.

The guide member 422 is disposed so as to hold the drive gear 112 substantially fixed in the rotation axis direction rotatably in the rotation direction, while allowing movement and fixing along the axis of the support member 118 (substantially parallel to the optical axis). The guide member 422 guides the drive gear 112 in the back and forth in the optical axis direction of the lens barrel 132. The guide member 422 can be moved and fixed with respect to the support member 118 by the second set screw (axial direction positioning portion) 118b (discussed below).

The second set screw (axial direction positioning portion) 118b is held by the guide member 422 and disposed so as to be movable in the optical axis direction together with the guide member 422. The second set screw 118b has a screw mechanism. When the screw mechanism is loosened, the guide member 422 can move relative to the support member 118, and when the screw mechanism is tightened, the guide member 422 can be fixed with respect to the support member 118.

Since the camera 130 is an interchangeable lens type, the zoom ring drive device 410 needs to be compatible with a plurality of lenses having different outside diameters of the lens barrel 132, outside diameters of the zoom ring 132a, outside diameters of the ring gear, and so on.

Here, in order to make the zoom ring drive device 410 compatible with interchangeable lenses of different specifications, the drive gear 112 is disposed movably in a substantially radial direction of the lens barrel 132, that is, a direction substantially perpendicular to the optical axis, and is configured so as to be fixed after being adjusted to an appropriate radial direction position, that is, a position that is opposite the zoom ring 132a and where the gear teeth can mesh together, or a position that is opposite the ring gear and where the gear teeth can mesh together. In other words, the drive gear 112 and the zoom ring 132a, or the ring gear, are adjusted to an appropriate center distance that allows the gears to mesh properly.

As shown in FIGS. 33A1, 33A2, 33B1, 33B2, 33C1, and 33C2, the zoom ring drive device (manually operated ring drive device) 410 must be compatible with lens barrels 132 of various sizes that are mounted on the camera body 131, and must rotate zoom rings of different sizes from the outside. Accordingly, the zoom ring drive device 410 needs to engage with zoom rings 132a of different sizes, such as different outside diameters.

More specifically, the first adjustment unit 423 is required to change the position of the drive gear 112 with respect to the zoom ring 132a in a direction substantially perpendicular to the rotation axis of the zoom ring 132a, to match the outside diameter of the zoom ring 132a, so that drive gears 112 and zoom rings 132a having a number of different outside diameters will engage or mesh with each other, that is, to change the distance between the rotation axis of the zoom ring 132a and the rotation axis of the drive gear 112.

The first adjustment unit 423 includes the drive gear 112, the support member 118, the plate member (interaxial fixing portion) 118a, and the fixing member 119.

The first adjustment unit 423 adjusts the position of the drive gear 112 in a direction substantially perpendicular to the rotation axis of the zoom ring 132a by rotating the drive gear 112 around an axis substantially parallel to the rotation axis of the zoom ring 132a. More specifically, the plate member (interaxial fixing portion) 118a to which the support member 118 is fixed is rotated around the rotation axis of the rotary gear 417, which moves the position of the drive gear 112 attached rotatably with respect to the guide member 422 around the plate member 118*a*, in a direction substantially perpendicular to the rotation axis of the zoom ring 132*a*.

When the position of the drive gear 112 is adjusted, as shown in FIGS. 33A1, 33B 1, and 33C1, the position of the drive gear 112 is moved by rotating the rotary gear 417 around the rotation axis. When the position of the drive gear 112 is adjusted by rotating around the rotation axis of the rotary gear 417, the rotation axis of the drive gear 112 and the rotation axis of the rotary gear 417 are kept substantially parallel.

At this point, the first adjustment unit 423 adjusts the position of the rotation axis of the drive gear 112 by rotating around the rotation axis of the rotary gear 417 so that the teeth of the drive gear 112 and the rotary gear 417 are not disengaged. Since the position of the rotation axis of the drive gear 112 is rotated around the rotation axis of the rotary gear 417, the distance between the drive gear 112 and the rotation axis of the rotary gear 417, that is, the interaxial distance, is kept substantially constant even if the first adjustment is performed. Therefore, it is possible to prevent the drive gear 112 and the rotary gear 417 from coming apart.

The interaxial distance between the drive gear 112 and the rotary gear 417 is kept substantially constant, that is, the teeth are kept engaged with each other while the distance between the axes is substantially fixed. As a result, even if the position of the drive gear 112 is adjusted, the engagement of the gear teeth between the drive gear 112 and the rotary gear 417 is maintained in the same state. That is, even if the rotation of the drive gear 112 is adjusted, disengagement of the teeth from the rotary gear 417 can be prevented.

As shown in FIGS. 33A2, 33B2, and 33C2, after the position of the drive gear 112 as seen from the rotation axis direction of the zoom ring 132*a* has been adjusted to a position where it makes contact with the zoom ring 132*a*, when the fixing member 119 is tightened, the plate member (interaxial fixing portion) 118*a* is fixed with respect to the end surface of the holding portion 120.

Consequently, the position of the drive gear 112 with respect to the zoom ring 132*a* in a direction substantially perpendicular to the rotation axis of the zoom ring 132*a*, that is, the position of the zoom ring 132*a* viewed from the rotation axis direction, can be changed to match the outside diameter of the zoom ring 132*a*. Consequently, the drive gear 112 can be engaged or meshed with zoom rings 132*a* of various outside diameters, and the rotational force from the motor 115, which is the drive source, can be transmitted to zoom rings 132*a* with various outside diameters.

Furthermore, the zoom ring drive device 410 needs to be compatible with lens barrels 132 of various sizes mounted to the camera body 131, and needs to be able to externally rotate zoom rings 132*a* of various sizes. Therefore, the zoom ring drive device 410 needs to engage with zoom rings 132*a* of different sizes, such as different lengths or different positions along the axis of rotation.

More specifically, the second adjustment unit 424 is required for changing the position of the drive gear 112 relative to the zoom ring 132*a* in a direction running along the rotation axis of the zoom ring 132*a*, to match the length of the zoom ring 132*a* or its position in the optical axis direction, that is, for changing the position of the drive gear 112 along the axial direction of the rotary gear 417, so that the drive gear 112 and the zoom ring 132*a* will engage or mesh at various positions in the rotation axis direction of the zoom ring 132*a*.

The second adjustment unit 424 includes the rotary gear 417, the drive gear 112, the support member 118, the second set screw (axial positioning unit) 118*b*, and the guide member 422.

The second adjustment unit 424 adjusts the position of the drive gear 112 in the rotation axis direction of the zoom ring 132*a* by moving the drive gear 112 along an axis substantially parallel to the rotation axis of the zoom ring 132*a*. More specifically, the second adjustment unit 424 moves the guide member 422 along the support member 118, thereby moving the position of the drive gear 112 rotatably held by the guide member 422 in the axial direction of the support member 118.

When the position of the drive gear 112 is adjusted, the position of the drive gear 112 is moved along the rotation axis of the rotary gear 417, that is, in parallel. When the position of the drive gear 112 is adjusted by moving along the rotation axis of the rotary gear 417, the rotation axes of the rotary gear 417 and the support member 118, which is the rotation center of the drive gear 112, are substantially parallel, so the rotation axis of the drive gear 112 and the rotation axis of the rotary gear 417 are kept substantially parallel.

At this point, the width of one of the teeth, that is, the length of the tooth in the trace direction, is adjusted by the second adjustment unit 424 so as to be equal to the amount of axial movement of the drive gear 112 required in the second adjustment, or is a specific amount longer than this, so that the teeth of the drive gear 112 and the rotary gear 417 will not be disengaged.

In this embodiment, the tooth width of the rotary gear 417 is particularly long. Therefore, the gears can be prevented from coming apart even when the position of the drive gear 112 is adjusted in the optical axis direction or in the rotation axis direction of the gear. The interaxial distance between the drive gear 112 and the rotary gear 417 is kept substantially constant because the rotation axes of the drive gear 112 and the rotary gear 417 are kept substantially parallel to each other, that is, the axial spacing is substantially fixed. Consequently, even if the position of the drive gear 112 is adjusted, the engagement between the teeth of the drive gear 112 and the rotary gear 417 will be maintained in the same state. That is, even if the rotation of the drive gear 112 is adjusted, disengagement of the teeth from the rotary gear 417 can be prevented.

After the position of the drive gear 112 as viewed in a direction substantially perpendicular to the rotation axis of the zoom ring 132*a* has been adjusted to a position that makes contact with the zoom ring 132*a*, the guide member 422 is fixed relative to the support member 118 when the second set screw 118*b* is tightened. The drive gear 112 is held by the guide member 422 rotatably around the axis of the support member 118 that is substantially parallel to the optical axis. The drive gear 112 is held by the guide member 422 in a state of being substantially fixed in the axial direction of the support member 118 or in the optical axis direction. Consequently, when the guide member 422 is fixed with respect to the support member 118, the drive gear 112, whose axial direction is substantially fixed to the guide member 422, is also substantially fixed in the axial direction with respect to the support member 118 in a rotatable state.

As a result, the position of the drive gear 112 relative to the zoom ring 132*a* in the direction of the rotation axis of the zoom ring 132*a*, that is, the position viewed in a direction substantially perpendicular to the rotation axis of the zoom ring 132*a*, can be adjusted to match the length of the zoom ring 132*a* or the direction of the optical axis. Consequently, the drive gear 112 can be engaged or meshed with zoom rings 132a of various lengths or at various positions in the rotation axis direction of the zoom ring 132a. As a result, the rotational force from the motor 115, which is the drive source, can be transmitted to the zoom ring 132a at various lengths or at various positions in the rotation axis direction of the zoom ring 132a.

With a conventional configuration, when the position of the drive gear with respect to the zoom ring is adjusted, electrical components that require electrical connection, such as the motor (the drive source), the rotational speed detection unit for controlling the rotation of the motor, the control unit for controlling the motor, the storage unit for controlling the motor, or the battery (power supply unit), will remain in a constant position relative to the drive gear.

In other words, at least some of the electrical components that require electrical connection may end up moving relative to the body camera or the lens barrel in conjunction with the movement of the drive gear during adjustment. If this happens, the electrical connection members that electrically connect the electrical components that require electrical connection to the camera body must be bent, stretched, deformed, or moved, so a deformable member such as a wire or a flexible substrate must be used. Furthermore, since the electrical connection members have to be bent, stretched, or otherwise deformed, there is a risk of poor electrical continuity, such as breakage or disconnection, or of deterioration in ease of adjustment.

In this embodiment, electrical components that require electrical connection, such as the motor 115, the rotational speed sensor 27, the third control unit 124, the third storage unit 428, or the second power supply unit 116 (second power supply unit), are disposed on the camera body 131 or on the base part 411 whose relative position to the camera body 131 is fixed. Therefore, even if the position of the drive gear 112 is adjusted with respect to the zoom ring 132a, there is no need to deform the electrical connection members. Accordingly, since the electrical connecting members can be fixed without moving and are not subjected to deformation such as bending or stretching, there is no need to use any deformable members such as wires or flexible substrates. Also, it is possible to avoid the occurrence of poor electrical continuity such as breakage or disconnection, or deterioration of ease of adjustment.

When the zoom ring drive device 410 is attached to the camera 130, communication is performed between the first control unit 31d of the camera body 131 and the third control unit 124 of the zoom ring drive device 410 via the contact terminal 114. Consequently, the first control unit 31d of the camera body 131 recognizes that the zoom ring drive device 410 has been mounted.

After this, information about the zoom lens transmitted from the lens barrel 132 is transmitted from the first control unit 31d of the camera body 131 to the third control unit 124 of the zoom ring drive device 410. The first control unit 31d of the camera body 131 and the third control unit 124 of the zoom ring drive device 410 execute a specific zoom ring drive operation on the basis of the transmitted information about the zoom lens.

When the lens barrel 132 is mounted to the camera body 131, information about the zoom lens is transmitted through the first electrical connections (contact terminals 114 and 131f) and through the body mount on the camera body 131 side and the lens mount 134 on the lens barrel 132 side.

Information about the zoom lens is stored ahead of time in the storage unit 32c of the lens barrel 132 as unique values about the zoom lens. Information about the characteristics of the movable lens to be moved when zooming, that is, when the focal length is changed (such as the focal length range, the movable range of the movable lens, the control unit change rate with respect to focal length change, or the change in the focal distance with respect to movable lens movement amount) is transmitted from the second control unit 32b of the lens barrel 132 to the first control unit 31d of the camera body 131.

In addition to what was discussed above, the information about the zoom lens includes information such as the current position and current speed of the movable lens when the zoom ring 132a is being operated. This information is transmitted from the second control unit 32b of the lens barrel 132 to the first control unit 31d of the camera body 131 by regular communication.

The third control unit 124 of the zoom ring drive device 410 rotates the motor 115 of the drive unit 127 on the basis of the transmitted zoom lens information, and transmits the rotational drive force of the motor 115 to the rotary gear 417 via the gear of the reduction gear 413. The rotary gear 417 rotates the zoom ring 132a via the drive gear 112, and can be operated and controlled from the outside.

As discussed above, the zoom ring drive device 410 of this embodiment has the motor 115, the reduction gear 413, etc., built into the base part 411 on which the camera body 131 is placed.

This makes it possible to reduce the size of the zoom ring drive device 410 while still allowing operation and control of the zoom ring 132a from the outside.

Also, with the zoom ring drive device 410 of this embodiment, two-way communication between the camera body 131 and the zoom ring drive device 410 is performed via the contact terminal 131f on the camera body 131 side, as shown in FIG. 32, etc.

Here, communication between the camera body 131 and the lens barrel 132 can be performed via the lens mount 134 when the lens barrel 132 is mounted to the camera body 131. Communication between the camera body 131 and the lens barrel 132 may also be performed wirelessly.

As shown in FIGS. 30 and 31, the contact terminal 131f on the camera body 131 side is provided on the bottom surface of the camera body 131. The contact terminal 114 of the zoom ring drive device 410, which is electrically connected to the contact terminal 131f, is provided on the upper surface 411a on which the camera body 131 is installed.

Consequently, when the camera 130 is placed on the zoom ring drive device 410, information about the zoom lens is transmitted from the camera body 131 side to the zoom ring drive device 410 side. If a drive error should occur while the zoom ring 132a is being rotated by the zoom ring drive device 410, information such as the generated drive error is transmitted from the zoom ring drive device 410 side to the camera body 131 side.

Power is supplied from the camera body 131 to the zoom ring drive device 410 via the contact terminal 131f provided on the bottom surface of the camera body 131, as shown in FIG. 32.

In this case, the camera body 131 is mounted to the zoom ring drive device 410 in a state in which the contact terminal 114 on the zoom ring drive device 410 side and the contact terminal 131f on the camera body 131 side are in contact with each other, which allows power to be supplied from the camera body 131 to the zoom ring drive device 410.

Power is supplied from the camera body 131 to the lens barrel 132 via the lens mount 134 when the lens barrel 132 is mounted to the camera body 131.

Power supply between the camera body 131 and the zoom ring drive device 410 may be performed in the opposite direction from the above. That is, when the zoom ring drive device 410 holds a power source such as a battery as in this embodiment, it is also possible to supply power from the zoom ring drive device 410 to the camera body 131.

Consequently, the camera body 131 is supplied with power from the zoom ring drive device 410 in addition to the built-in battery, so extended recording is possible, for example.

Main Feature 4

The zoom ring drive device 410 of this embodiment is a device for moving the zoom lens included in the lens barrel 132 mounted to the camera body 131 back and forth in the optical axis direction, and includes the drive gear 112, the motor 115, and the base part 411. The drive gear 112 is provided at a position in contact with the zoom ring 132*a* that changes the optical characteristics of the zoom lens included in the lens barrel 132, and rotates while in contact with the zoom ring 132*a* to rotate the zoom ring 132*a*. The motor 115 rotationally drives the drive gear 112. The base part 411 has the upper surface 411*a* on which the camera body 131 is placed, and the motor 115 is disposed thereon.

Consequently, since the motor 115 and the like are accommodated inside the foundational portion (base part 411) on which the camera body 131 is placed, the zoom ring drive device 410 that rotates the zoom ring 132*a* from the outside can smaller in size.

Other Embodiments

Embodiments of the present disclosure were described above, but the present disclosure is not limited to or by the above embodiments, and various modifications are possible without departing from the gist of the disclosure.

(A)

In the above embodiments, an example was given in which the zoom ring 33 was used as the manually operated ring driven by the zoom ring drive device (manually operated ring drive device) 10 of the present disclosure. However, the present disclosure is not limited to this.

For example, instead of a zoom ring, some other ring member such as a focus ring may be driven by the manually operated ring drive device of the present disclosure.

(B)

In the above embodiments, an example was given in which information such as the movable range of the zoom lens, or the current position in the direction of the optical axis was received by the zoom ring drive device 10 via the camera body 31 as information about the characteristics of the zoom lens (movable lens). However, the present disclosure is not limited to this.

For example, in addition to information about the movable range and current position of the zoom lens, the lens characteristics received by the zoom ring drive device may include information about the focal length at the wide-angle end and telephoto end of the lens barrel, information about the state of the aperture, information about the zoom speed that can be set, or other such information.

(C)

In the above embodiments, an example was given in which the zoom ring 33 was indirectly rotated via the ring gear 25 mounted non-rotatably on the outer peripheral surface of the zoom ring 33 of the lens barrel 32. However, the present disclosure is not limited to this.

For example, if the gear on the side of the manually operated ring drive device and the gear on the side of the manually operated ring of the lens barrel have shapes and sizes that allow them to mesh together, the zoom ring or the like may be rotated directly, without going through the ring gear.

(D)

In Embodiment 1 above, an example was given in which the outer peripheral surface of the lens barrel 32 was supported at three points. However, the present disclosure is not limited to this.

For example, the lens barrel including the manually operated ring to be driven may be supported at one point, at two points, or at four or more points.

(E)

In the above embodiments, an example was given in which one or more rollers 20*a*, 20*b*, and 20*c* that indirectly supported the outer peripheral surface of the lens barrel 32 were mounted rotatably around the rotation axis. However, the present disclosure is not limited to this.

For example, if the surface of each roller is made of a material with low frictional resistance, such as Teflon (registered trademark), and the frictional resistance between it and the outer peripheral surface of the manually operated ring can be reduced, then there is no need for all the rollers to be rotatable, and at least some of the rollers may be non-rotatable.

(F)

In Embodiment 1 above, an example was given in which one spring 17 was provided on the side surface of the guide portions 14 and 15 to exert a biasing force in the direction in which the guide portions 14 and 15 disposed to sandwich the lens barrel 32 are brought closer together. However, the present disclosure is not limited to this.

For example, spring members that exert a biasing force to the two guide portions may be provided on both side surfaces of the guide portions. Alternatively, springs may be provided at some other position, such as the bottom surface side of the two guide portions.

(G)

In the above embodiments, an example was given in which the guide portion 11 moved in the optical axis direction along the two guide shafts 12*a* and 12*b*. However, the present disclosure is not limited to this.

For example, one guide shaft may be used as the guide shaft that guides the first guide portion, or three or more guide shafts may be used.

(H)

In the above embodiments, an example was given in which the spring 17 was used as a biasing member that exerted a tensile force to move the guide portions 14 and 15 in the direction of sandwiching the lens barrel 32. However, the present disclosure is not limited to this.

For example, instead of a spring, a member that exerts a biasing force by magnetic force, air pressure, mechanical compression force (pressing force produced by rotation of a lead screw), or the like may be used as the biasing member.

(I)

In the above embodiments, an example was given in which the guide portion 11 pivoted up and down within the range of the slot 11*b* on the guide shaft 12*a* side, with the guide shaft 12*b* side as the center. However, the present disclosure is not limited to this.

For example, the guide portion (first guide portion) 11 may be configured to pivot up and down within the range of the slot 11*b* on the guide shaft 12*b* side, with the guide shaft 12*a* side as the center.

(J)

In the above embodiments, an example was given in which the zoom ring drive device 10 was used for recording video. However, the present disclosure is not limited to this.

For example, the manually operated ring drive device may be used not only for video recording, but also for still image photography, camera performance testing, and so forth.

(K)

In the above embodiments, an example was given in which the camera 30 whose lens barrel 32 was detachable with respect to the camera body 31 was driven. However, the present disclosure is not limited to this.

For example, a camera including a lens barrel mounted to the camera body in a non-detachable state may be driven.

(L)

In the Embodiment 1 above, an example was given in which the zoom ring drive device 10 had a built-in rechargeable second power supply unit 116 (second power supply unit). However, the present disclosure is not limited to this.

For example, when a configuration is employed in which power is supplied from the camera body, a manually operated ring drive device having no battery may be used.

A configuration in which the manually operated ring drive device has a built-in battery can be combined with a configuration in which power is supplied from the camera body, which is advantageous in terms of extended video recording and so forth, and as such is preferable from the standpoint of expandability.

(M)

In the above embodiments, an example was given in which the features of the present disclosure were applied to the zoom ring drive devices 10, 110, and 410. However, the present disclosure is not limited to this.

For example, the manually operated ring drive device may further include a release button that is provided to the base part and operates a shutter provided to the camera body.

This allows the manually operated ring drive to be used as a battery grip having the function of operating a shutter.

(N)

In Embodiment 1 above, an example was given in which the rotation of the zoom ring 132a was controlled by rotating in a state in which the drive gear 112 was in direct contact with the outer peripheral surface of the zoom ring 132a. However, the present disclosure is not limited to this.

For example, as in the first embodiment, a manually operated ring such as a zoom ring may be rotationally driven via a ring gear.

APPENDIX

A manually operated ring drive device according to the eighteenth disclosure is:
- a manually operated ring drive device configured to rotationally drive a manually operated ring that moves a movable lens included in a lens barrel mounted to a camera body back and forth in an optical axis direction, comprising:
- a drive gear that is provided at a position that makes direct or indirect contact with the manually operated ring configured to change an optical characteristics of the movable lens included in the lens barrel, and configured to rotate while in contact with the manually operated ring to rotate the manually operated ring;
- a drive unit configured to rotationally drive the drive gear;
- a communication unit configured to communicate with the camera body; and
- a control unit configured to receive information about the characteristics of the movable lens from the camera body in the communication unit and control the drive unit on the basis of a characteristics of the movable lens.

The manually operated ring drive device according to the nineteenth disclosure is the manually operated ring drive device according to the eighteenth disclosure,
- further comprising a base part on which the camera body is placed.

A manually operated ring drive device according to the twentieth disclosure is:
- a manually operated ring drive device configured to rotationally drive a manually operated ring that moves a movable lens included in a lens barrel mounted to a camera body back and forth in an optical axis direction, comprising:
- a drive gear that is provided at a position that makes direct or indirect contact with the manually operated ring configured to change an optical characteristics of the movable lens included in the lens barrel, and configured to rotate while in contact with the manually operated ring to rotate the manually operated ring;
- a drive unit configured to rotationally drive the drive gear; and
- a base part that has a surface to which the camera body is connected, and on which the drive unit is disposed.

The manually operated ring drive device according to the twenty-first disclosure is the manually operated ring drive device according to the twentieth disclosure,
- further comprising a rotary gear that is disposed along the optical axis direction and configured to transmit a rotational drive force from the drive unit to the drive gear.

The manually operated ring drive device according to the twenty-second disclosure is the manually operated ring drive device according to the twenty-first disclosure,
- further comprising a support portion configured to support the drive gear in a state of being able to move within a specific range in the optical axis direction,
- wherein the rotary gear has a gear portion formed to match the specific range in the optical axis direction.

The manually operated ring drive device according to the twenty-third disclosure is the manually operated ring drive device according to the twenty-second disclosure,
- further comprising a positioning portion configured to move in the optical axis direction together with the drive gear that is movable in the optical axis direction along the support portion, and positions the drive gear at the desired position to match a size of the lens barrel.

The manually operated ring drive device according to the twenty-fourth disclosure is the manually operated ring drive device according to the twentieth or twenty-first disclosure, comprising:
- an adjustment unit configured to adjust a position of the drive gear with respect to the manually operated ring; and
- a drive source that is provided to the base part and is configured to generate rotation for driving the drive gear.

The manually operated ring drive device according to the twenty-fifth disclosure is the manually operated ring drive device according to the twenty-fourth disclosure,
- wherein the adjustment unit includes a first adjustment unit configured to adjust a position of the drive gear in a direction substantially perpendicular to the rotation axis of the manually operated ring.

The manually operated ring drive device according to the twenty-sixth disclosure is the manually operated ring drive device according to the twenty-fifth disclosure,
wherein the adjustment unit includes a second adjustment unit configured to adjust a position of the drive gear in a rotation axis direction of the manually operated ring.

The manually operated ring drive device according to the twenty-seventh disclosure is the manually operated ring drive device according to the twenty-fifth disclosure,
wherein the first adjustment unit adjusts a position of the drive gear with respect to the manually operated ring in a direction of rotation around a first axis substantially parallel to the rotation axis of the manually operated ring.

The manually operated ring drive device according to the twenty-eighth disclosure is the manually operated ring drive device according to the twenty-seventh disclosure,
further comprising a rotary gear that is disposed along the optical axis direction and is configured to transmit a rotational drive force from the drive unit to the drive gear, wherein the first axis is a rotation axis of the rotary gear.

The manually operated ring drive device according to the twenty-ninth disclosure is the manually operated ring drive device according to the twenty-sixth disclosure,
wherein the second adjustment unit adjusts a position of the drive gear with respect to the manually operated ring in a direction running along a second axis substantially parallel to the rotation axis of the manually operated ring.

The manually operated ring drive device according to the thirtieth disclosure is the manually operated ring drive device according to the twenty-ninth disclosure,
wherein the second axis is a rotation axis of the drive gear.

The manually operated ring drive device according to the thirty-first disclosure is the manually operated ring drive device according to the twenty-sixth disclosure,
wherein the adjustment made by the first adjustment unit or the second adjustment unit is performed in a state in which the drive source is fixed to the base part.

The manually operated ring drive device according to the thirty-second disclosure is the manually operated ring drive device according to the twenty-fifth disclosure,
wherein the first adjustment unit comprises:
an interaxial fixing portion that is rotatable around a first axis substantially parallel to a rotation axis of the manually operated ring, and is capable of constraining the positional relation between the rotation axis of the drive gear and the first axis; and
and a rotation direction positioning portion configured to fix a position of an interaxial fixing portion rotated around the first axis.

The manually operated ring drive device according to the thirty-third disclosure is the manually operated ring drive device according to the twenty-sixth disclosure,
further comprising a rotary gear that is disposed along the optical axis direction and is configured to transmit a rotational drive force from the drive unit to the drive gear,
wherein the rotary gear has teeth configured to mesh over a specific length in a direction of a first axis substantially parallel to a rotation axis of the manually operated ring, and
the second adjustment unit comprises:
a support portion that is disposed around a second axis substantially parallel to the rotation axis of the manually operated ring, constitutes the rotation axis of the drive gear, and is configured to support the drive gear over a specific length in the direction of the second axis; and
an axial direction positioning portion configured to fix a position of the drive gear in a direction of the second axis.

The manually operated ring drive device according to the thirty-fourth disclosure is the manually operated ring drive device according to the thirty-third disclosure,
wherein the second adjustment unit includes a guide member configured to hold the drive gear substantially fixed in a rotation axis direction and rotatable in the rotation direction, and that is configured to be moved and fixed with respect to the support portion by the axial direction positioning portion.

The manually operated ring drive device according to the thirty-fifth disclosure is the manually operated ring drive device according to the twentieth or twenty-first disclosure,
further comprising a power supply unit that is provided to the base part and is configured to supply power to the camera body.

The manually operated ring drive device according to the thirty-sixth disclosure is the manually operated ring drive device according to the twentieth or twenty-first disclosure,
further comprising a release button that is provided to the base part and is configured to operate a shutter provided to the camera body.

A manually operated ring drive device according to the thirty-seventh disclosure is a ring drive device for rotating a manually operated ring included in a lens barrel mounted to a camera body, comprising:
a base part that is connected to the camera body so that its relative position is substantially fixed;
a lateral part that is connected to the base part and is disposed to a side of the lens barrel;
a drive gear that is provided to the lateral part and is provided at a position in direct or indirect contact with the manually operated ring, and that is configured to rotate in contact with the manually operated ring to rotate the manually operated ring;
a drive source that is provided to the base part and is configured to generate rotation for driving the drive gear; and
an adjustment unit that is provided to the lateral part and is configured to adjust a position of the drive gear with respect to the manually operated ring.

The manually operated ring drive device according to the thirty-eighth disclosure is the manually operated ring drive device according to the thirty-seventh disclosure,
wherein the adjustment unit includes a first adjustment unit configured to adjust a position of the drive gear in a direction substantially perpendicular to a rotation axis of the manually operated ring.

The manually operated ring drive device according to the thirty-ninth disclosure is the manually operated ring drive device according to the thirty-eighth disclosure,
wherein the adjustment unit includes a second adjustment unit configured to adjust a position of the drive gear in a rotation axis direction of the manually operated ring.

The manually operated ring drive device according to the fortieth disclosure is the manually operated ring drive device according to the thirty-eighth or thirty-ninth disclosure,
wherein the first adjustment unit adjusts the position of the drive gear with respect to the manually operated ring in a direction of rotation around a first axis substantially parallel to a rotation axis of the manually operated ring.

The manually operated ring drive device according to the forty-first disclosure is the manually operated ring drive device according to the fortieth disclosure,
wherein the lateral part comprises a rotary gear configured to transmit a drive force from the drive source as rotation to the drive gear, and
the first axis is a rotation axis of the rotary gear.

The manually operated ring drive device according to the forty-second disclosure is the manually operated ring drive device according to the thirty-ninth disclosure,
wherein the second adjustment unit adjusts a position of the drive gear with respect to the manually operated ring in a direction running along a second axis substantially parallel to a rotation axis of the manually operated ring.

The manually operated ring drive device according to the forty-third disclosure is the manually operated ring drive device according to the forty-second disclosure,
wherein the second axis is a rotation axis of the drive gear.

The manually operated ring drive device according to the forty-fourth disclosure is the manually operated ring drive device according to the thirty-ninth disclosure,
wherein an adjustment made by the first adjustment unit or the second adjustment unit is performed in a state in which the drive source is fixed to the base part.

The manually operated ring drive device according to the forty-fifth disclosure is the manually operated ring drive device according to the fortieth disclosure,
wherein the first adjustment unit comprises:
an interaxial fixing portion configured to rotate around the first axis, and constrain a positional relation between a rotation axis of the drive gear and the first axis; and
and a rotation direction positioning portion configured to fix a position of the interaxial fixing portion rotated around the first axis.

The manually operated ring drive device according to the forty-sixth disclosure is the manually operated ring drive device according to the forty-second disclosure,
further comprising a rotary gear that is disposed in an optical axis direction and configured to transmit to the drive gear a rotational drive force from a drive unit configured to rotationally drive the drive gear,
wherein the rotary gear has teeth configured to mesh over a specific length in a direction of a first axis substantially parallel to a rotation axis of the manually operated ring, and
the second adjustment unit comprises:
a support portion that is disposed around a second axis, constitutes a rotation axis of the drive gear, and is configured to support the drive gear over a specific length in a direction of the second axis; and
an axial direction positioning portion configured to fix a position of the drive gear in a direction of the second axis.

The manually operated ring drive device according to the forty-seventh disclosure is the manually operated ring drive device according to the forty-sixth disclosure,
wherein the second adjustment unit comprises a guide member configured to hold the drive gear substantially fixed in a rotation axis direction and rotate in a rotation direction, and be moved and fixed with respect to the support portion by the axial direction positioning portion.

The manually operated ring drive device according to the forty-eighth disclosure is a manually operated ring drive device according to the thirty-seventh or thirty-eighth disclosure,
wherein the base part is detachably connected to the camera body.

The manually operated ring drive device according to the forty-ninth disclosure is the manually operated ring drive device according to the thirty-seventh or thirty-eighth disclosure,
wherein the lateral part is detachably connected to the base part.

The manually operated ring drive device according to the fiftieth disclosure is the manually operated ring drive device according to the thirty-seventh disclosure,
wherein the base part is mechanically and electrically connected when mounted to the camera body, and
the lateral part is mechanically connected when mounted to the base part.

The manually operated ring drive device according to the fifty-first disclosure is the manually operated ring drive device according to the fiftieth disclosure,
further comprising a rotary gear that is disposed in an optical axis direction and is configured to transmit to the drive gear a rotational drive force from a drive unit configured to rotationally drive the drive gear,
wherein the mechanical connection portion configured to mechanically connect the lateral part and the base part includes a rotary connection portion configured to connect a rotation of the drive source to the rotary gear, and the rotary connection portion is detachably connected.

A manually operated ring drive device according to the fifty-second disclosure is a ring drive device that rotationally drives a manually operated ring included in a lens barrel mounted to a camera body, comprising:
a drive gear that is provided at a position in direct or indirect contact with the manually operated ring and is configured to rotate in contact with the manually operated ring to rotate the manually operated ring;
a drive source that is disposed so as to be substantially fixed relative to the camera body and is configured to generate rotation for rotationally driving the manually operated ring; and
an adjustment unit configured to adjust a position of the drive gear with respect to the manually operated ring, and transmit a rotation of the drive source to the drive gear.

The invention claimed is:
1. A camera system, comprising:
a camera body;
a lens barrel that is mounted on the camera body and includes at least one movable lens; and
a manually operated ring drive device mounted on the camera body,
wherein the camera body has an input unit configured to input at least one optical characteristic value for the lens barrel, and a first control unit configured to control the input unit,
the lens barrel has a manually operated ring configured to move the movable lens in an optical axis direction in order to vary an optical characteristics, a lens position sensor configured to sense a position of the movable lens, a storage unit configured to store information about a characteristics of the movable lens, and a second control unit configured to control the lens position sensor and the storage unit,
the manually operated ring drive device has a transmission part configured to transmit rotation to the manually operated ring, a drive unit configured to rotationally drive the transmission part, and a third control unit configured to control the drive unit, the camera body and the lens barrel each have a first mechanical connection portion configured to allow the two to be mechanically connected to each other and a first electrical connection portion configured to allow the two to be electrically connected to each other, the camera body and the manually operated ring drive device each have a second mechanical connection portion configured to allow the two to be mechanically connected to each other and a second electrical connection portion configured to allow the two to be electrically connected to each other, and the first control unit controls the second control unit and the third control unit such that the drive unit moves the movable lens on the basis of the optical characteristic value inputted to the input unit and information about the characteristics of the movable lens.

2. The camera system according to claim 1, wherein the at least one optical characteristic value is focal length.

3. The camera system according to claim 1, wherein the information about the characteristics of the movable lens is information about a relation between a rotation angle of the manually operated ring and the optical characteristic value.

4. The camera system according to claim 3, wherein the third control unit of the manually operated ring drive device controls the drive unit so that constituent parts of the lens barrel at an end of a movable range of the movable lens are not objected to a load exceeding a specific value.

5. The camera system according to claim 4, wherein the third control unit of the manually operated ring drive device receives information about a position of the movable lens included in the lens barrel from the first control unit of the camera body, and the third control unit of the manually operated ring drive device performs control to stop a drive of the drive unit when the movable lens moves to the end of the movable range of the movable lens.

6. The camera system according to claim 1, wherein the information about the characteristics of the movable lens is transmitted from the camera body to the manually operated ring drive device at an initial timing at which communication between the camera body and the manually operated ring drive device starts.

7. The camera system according to claim 1, wherein the lens barrel and the first control unit of the camera body continuously communicate information about the characteristics of the movable lens, and the first control unit of the camera body and the third control unit of the manually operated ring drive device continuously perform information communication related to a movement of the movable lens.

8. The camera system according to claim 1, wherein the manually operated ring drive device further comprises a power receiving unit configured to receive electric power supplied from the camera body.

9. The camera system according to claim 8, wherein the third control unit and the drive unit in the manually operated ring drive device are driven by electric power received by the power receiving unit.

10. The camera system according to claim 8, wherein the power receiving unit receives electric power from the camera body via a wired connection part of the camera body.

11. The camera system according to claim 10, wherein the wired connection part of the camera body is a hot shoe, a USB contact, or an expansion port.

12. The camera system according to claim 1, wherein the manually operated ring drive device has no electrical contacts to the lens barrel.

13. The camera system according to claim 1, wherein the manually operated ring drive device communicates with the camera body wirelessly.

14. The camera system according to claim 1, wherein the manually operated ring drive device further comprises a base part on which the camera body is placed.

15. A camera body on which a lens barrel is interchangeably mounted, the camera body comprising:

a communication unit configured to acquire information about the lens barrel when the lens barrel is mounted;

a storage unit configured to store information about the lens barrel received by the communication unit; and a control unit configured to control the communication unit to transmit information about the lens barrel stored in the storage unit to an external device other than the lens barrel.

16. The camera body according to claim 15, wherein the information about the lens barrel includes information about a characteristics of the lens included in the lens barrel.

17. The camera body according to claim 16, wherein the information about the characteristics of the lens includes information about a movable range, focal length, and aperture of a movable lens included in the lens barrel.

* * * * *